US012732917B2

(12) United States Patent
Huang et al.

(10) Patent No.: US 12,732,917 B2
(45) Date of Patent: Sep. 8, 2026

(54) UPLINK CHANNEL POWER CONTROL METHOD, APPARATUS, NETWORK DEVICE AND TERMINAL

(71) Applicant: DATANG MOBILE COMMUNICATIONS EQUIPMENT CO., LTD., Beijing (CN)

(72) Inventors: Qiuping Huang, Beijing (CN); Xin Su, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 305 days.

(21) Appl. No.: 18/553,495

(22) PCT Filed: Mar. 30, 2022

(86) PCT No.: PCT/CN2022/084157

§ 371 (c)(1),
(2) Date: Sep. 29, 2023

(87) PCT Pub. No.: WO2022/206855

PCT Pub. Date: Oct. 6, 2022

(65) Prior Publication Data

US 2024/0187996 A1 Jun. 6, 2024

(30) Foreign Application Priority Data

Apr. 2, 2021 (CN) ......................... 202110362891.5

(51) Int. Cl.
*H04W 52/14* (2009.01)
*H04W 52/54* (2009.01)

(52) U.S. Cl.
CPC ......... *H04W 52/146* (2013.01); *H04W 52/54* (2013.01)

(58) Field of Classification Search
CPC ... H04W 52/146; H04W 52/54; H04W 52/40; H04W 52/58
See application file for complete search history.

(56) References Cited

U.S. PATENT DOCUMENTS 11,902,910 B2 * 2/2024 Cozzo ................ H04W 52/346
2020/0322893 A1 10/2020 Yao et al.

(Continued)

FOREIGN PATENT DOCUMENTS

CN 108134659 A 6/2018
EP 3654704 A1 5/2020
WO 2020250404 A1 12/2020

OTHER PUBLICATIONS

Partial Supplementary European Search Report issued on Aug. 21, 2024 for European Patent Application No. 22779037.5.

(Continued)

*Primary Examiner* — Fayyaz Alam
(74) *Attorney, Agent, or Firm* — Ladas & Parry, LLP

(57) ABSTRACT

Embodiments of the present disclosure provide an uplink channel power control method, apparatus, network device and terminal, and relate to the field of communication technologies. The uplink channel power control method performed by a network device, includes: indicating information used to determine a transmission power of an uplink channel resource, by using a first target signaling, where the information, which is used to determine the transmission power of the uplink channel resource and is indicated by the first target signaling, includes at least one of power control parameter indication information and power control parameter set indication information; and transmitting the first target signaling to a terminal, where the first target signaling is used by the terminal to determine the transmission power of the uplink channel resource. The technical solution of the present disclosure can enable the network device and the (Continued)

terminal to have a consistent understanding of the transmission power of uplink channel resources, thereby improving performance of uplink channel transmission in the M-TRP scenario.

21 Claims, 4 Drawing Sheets

(56) References Cited

U.S. PATENT DOCUMENTS

2021/0029650 A1 1/2021 Cirik et al.
2022/0086772 A1* 3/2022 Cozzo ................ H04W 52/367
2022/0312338 A1 9/2022 Matsumura et al.
2023/0354205 A1* 11/2023 Khoshnevisan ...... H04W 52/10
2024/0137873 A1* 4/2024 Xiao .................. H04W 52/146
2025/0310899 A1* 10/2025 Khoshnevisan .... H04W 52/242

OTHER PUBLICATIONS

"3 Generation Partnership Project; Technical Specification Group Radio Access Network; Evolved Universal Terrestrial Radio Access (E-UTRA); Physical Layer Procedures (Release 11)" 3 GPP TS 36 213, v11. 10.0; Mar. 16, 2015.
International Search Report for International Patent Application No. PCT/CN2022/084157 issued by the International Patent Office on Jun. 20, 2022 and its English translation provided by WIPO.
Written Opinion for International Patent Application No. PCT/CN2022/084157 issued by the International Patent Office on Jun. 20, 2022 and its English translation provided by WIPO.
International Preliminary Report on Patentability for International Patent Application No. PCT/CN2022/084157 issued by the International Patent Office on Oct. 3, 2023 and its English translation provided by WIPO.
"Enhancements on Multi-TRP for PDCCH, PUCCH and PUSCH" 3GPP TSG RAN WG1 #104-e R1-2100422, e-Meeting, Jan. 25-Feb. 5, 2021, Source: vivo, Agenda Item: 8.1.2.1.

* cited by examiner indicating information used to determine a transmission power of an uplink channel resource, by using a first target signaling; where the information, which is used to determine the transmission power of the uplink channel resource and is indicated by the first target signaling, includes at least one of power control parameter indication information and power control parameter set indication information

101 transmitting the first target signaling to a terminal, where the first target signaling is used by the terminal to determine the transmission power of the uplink channel resource

Figures 1, 2:
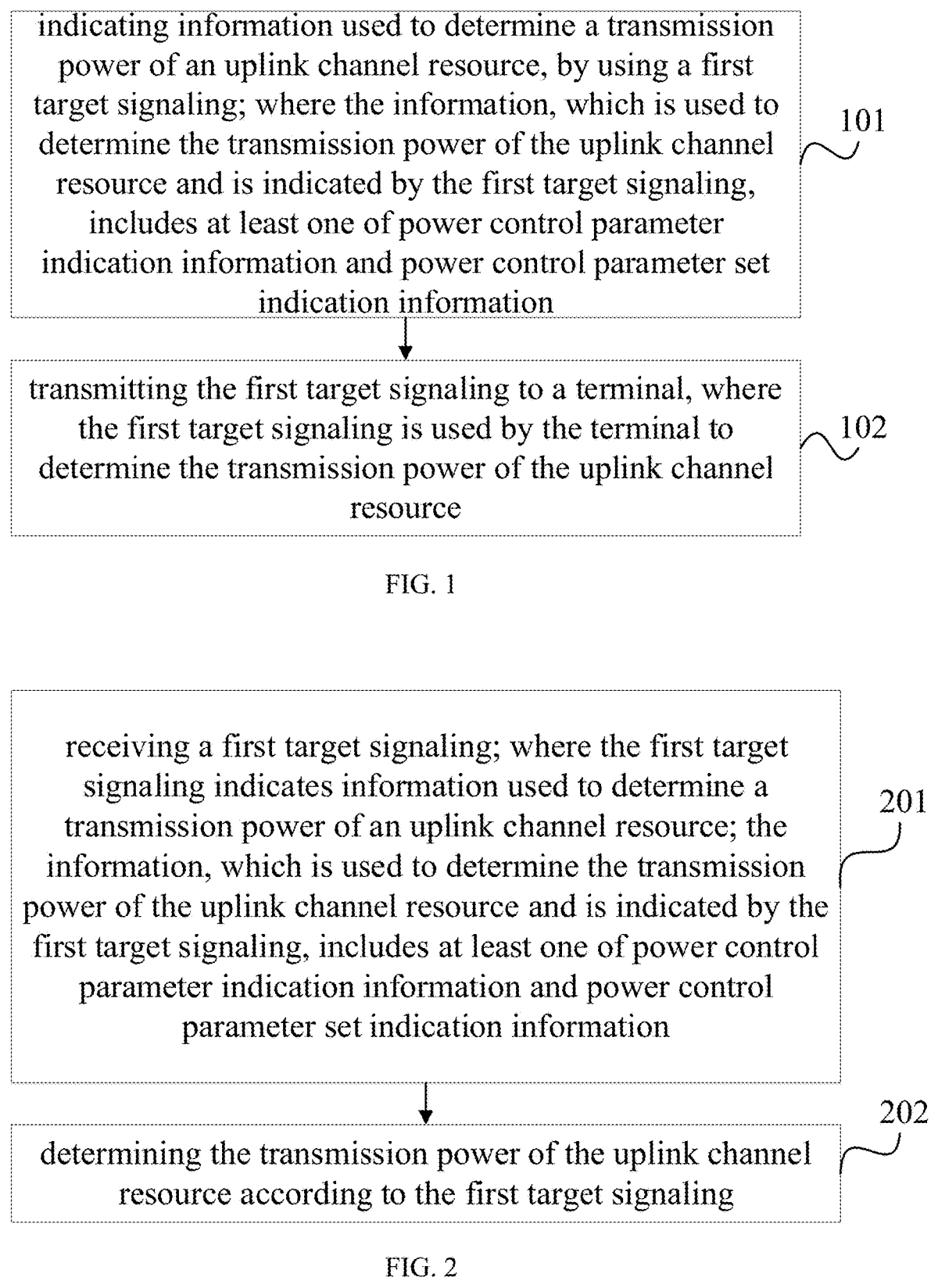

102

FIG. 1 receiving a first target signaling; where the first target signaling indicates information used to determine a transmission power of an uplink channel resource; the information, which is used to determine the transmission power of the uplink channel resource and is indicated by the first target signaling, includes at least one of power control parameter indication information and power control parameter set indication information

201 determining the transmission power of the uplink channel resource according to the first target signaling

UPLINK CHANNEL POWER CONTROL METHOD, APPARATUS, NETWORK DEVICE AND TERMINAL

CROSS-REFERENCE TO RELATED APPLICATIONS

The present disclosure is the U.S. national phase of PCT Application PCT/CN2022/084157 filed on Mar. 30, 2022, which claims the priority to the Chinese Patent Application No. 202110362891.5, entitled "Uplink channel power control method, apparatus, network device and terminal", filed on Apr. 2, 2021, the disclosures of which are incorporated in their entireties by reference herein.

TECHNICAL FIELD

The present disclosure relates to the field of communication technologies, and in particular to an uplink channel power control method, apparatus, network device and terminal.

BACKGROUND

In the NR system, a base station can configure, in a spatial setup signaling, association relationship between a spatial relation parameter and a power control parameter of an uplink channel resource, for a terminal; and the terminal uses the power control parameter associated with the spatial relation parameter to determine a transmission power of the uplink channel resource. If the base station does not configure the spatial setup signaling for the terminal, the terminal uses a specific power control parameter to determine the transmission power of the uplink channel resource.

In the new version of the NR system, an uplink channel transmission of multi-transmission/reception point (M-TRP) is introduced, which satisfies ultra-high-speed requirements to a certain extent, and which specifically includes the following method including realizing M-TRP transmission through repetition transmissions of an uplink channel, where each TRP is corresponding to a part of the repetition transmissions of the uplink channel, and repetition versions of the uplink channel corresponding to different TRPs are different.

In the M-TRP uplink channel transmission mode, in an FR1 frequency band, the base station usually does not configure the spatial setup signaling for the terminal; if the above method is still used to determine the transmission power, then power control parameters of multiple TRPs are the same. But in fact, due to different physical locations of multiple TRPs, path losses experienced by uplink channel resources, optimal target receiving powers, and closed-loop parameters may be different, thus it is unreasonable to use the same power control parameters. In face of such situation, there is no association scheme between uplink channel resources and power control parameters in the related art, which results in that the base station and terminal have no consistent understanding of the transmission power of the uplink channel, thereby causing the uplink channel transmission of M-TRP unable to work normally.

SUMMARY

Embodiments of the present disclosure provide an uplink channel power control method, apparatus, network device and terminal, which can solve the technical problem in the related art that when the base station does not configure the spatial setup signaling for the terminal, the base station and terminal have no consistent understanding of the transmission power of the uplink channel, thereby causing the uplink channel transmission of M-TRP unable to work normally.

In a first aspect, one embodiment of the present disclosure provides an uplink channel power control method, performed by a network device, including:

indicating information used to determine a transmission power of an uplink channel resource, by using a first target signaling; wherein the information, which is used to determine the transmission power of the uplink channel resource and is indicated by the first target signaling, includes at least one of power control parameter indication information and power control parameter set indication information; and transmitting the first target signaling to a terminal; wherein the first target signaling is used by the terminal to determine the transmission power of the uplink channel resource.

Optionally, wherein power control parameter indication information indicates at least one power control parameter through at least one of the following: identification information of power control parameters, the number of power control parameters and groups of power control parameters.

Optionally, the power control parameter set indication information indicates at least one power control parameter set through at least one of the following: identification information of power control parameter sets, the number of power control parameter sets and groups of power control parameter sets.

Optionally, a power control parameter used to determine a transmission power of a first repetition of the uplink channel resource is a first power control parameter, and the first power control parameter is a power control parameter determined based on first preset information.

Optionally, the first preset information includes any one of a default power control parameter, a value of an identifier of a power control parameter, a size of a value of an identifier of a power control parameter, an information field of a first target signaling, a sequence of power control parameters indicated by a first target signaling and a code sequence corresponding to power control parameters indicated by a first target signaling; and/or, a valid state of a power control parameter indicated by a first target signaling; and/or, sorting of groups of power control parameters; and/or, the first preset information includes any one of a default power control parameter set, a value of an identifier of a power control parameter set, a size of a value of an identifier of a power control parameter set, a sequence of power control parameter sets indicated by a first target signaling and a code sequence corresponding to power control parameter sets indicated by a first target signaling; and/or, a valid state of a power control parameter set indicated by a first target signaling; and/or, sorting of groups of power control parameter sets.

Optionally, the power control parameter indication information indicates multiple types of power control parameters, or, a power control parameter set indicated by the power control parameter set indication information is a power control parameter set including multiple types of power control parameters; first power control parameters, which are corresponding to different types of power control parameters, are determined by using the same or different first preset information.

Optionally, the method further includes any one of the following:

indicating through a second target signaling, information of a corresponding relationship between repetitions of the uplink channel resource and identification information or group of power control parameters;

indicating through a second target signaling, information of a corresponding relationship between repetitions of the uplink channel resource and identification information or group of power control parameter sets;

using the first target signaling to carry information of a corresponding relationship between repetitions of the uplink channel resource and identification information or group of power control parameters;

using the first target signaling to carry information of a corresponding relationship between repetitions of the uplink channel resource and identification information or group of power control parameter sets;

wherein the second target signaling is different from the first target signaling.

Optionally, the information, which is used to determine the transmission power of the uplink channel resource and is indicated by the first target signaling, includes power control parameter indication information; and the step of indicating information used to determine a transmission power of an uplink channel resource, by using a first target signaling, includes any one of the following:

using the first target signaling to indicate at least one power control parameter from a default power control parameter in a power control parameter configuration of the uplink channel resource;

using the first target signaling to indicate at least one power control parameter from at least one power control parameter at first N positions or last N positions in the power control parameter configuration of the uplink channel resource; wherein N is an integer greater than or equal to 1, and the power control parameters are sorted according to sizes of values of identifiers or according to configuration sequence;

using the first target signaling to indicate at least one power control parameter from a default power control parameter in a power control parameter set included in the power control parameter configuration;

using the first target signaling to indicate at least one power control parameter from at least one power control parameter at first M positions or last M positions in a power control parameter set included in the power control parameter configuration of the uplink channel resource; wherein M is an integer greater than or equal to 1, and the power control parameters are sorted according to sizes of values of identifiers or according to configuration sequence.

Optionally, the information, which is used to determine the transmission power of the uplink channel resource and is indicated by the first target signaling, includes power control parameter set indication information; and the step of indicating information used to determine a transmission power of an uplink channel resource, by using a first target signaling, includes any one of the following:

using the first target signaling to indicate at least one power control parameter set from a power control parameter set included in a power control parameter configuration of the uplink channel resource; wherein default power control parameters, which are in the power control parameter sets indicated by the first target signaling, are power control parameters used to determine the transmission power of the uplink channel resource;

using the first target signaling to indicate at least one power control parameter set from a power control parameter set included in the power control parameter configuration of the uplink channel resource; wherein power control parameters at first P positions or last P positions in the power control parameter sets indicated by the first target signaling are power control parameters used to determine the transmission power of the uplink channel resource, and P is an integer greater than or equal to 1, and the power control parameters are sorted according to sizes of values of identifiers or according to configuration sequence;

using the first target signaling to indicate at least one power control parameter set from a default power control parameter set included in the power control parameter configuration of the uplink channel resource; wherein default power control parameters in the at least one power control parameter set indicated by the first target signaling are power control parameters used to determine the transmission power of the uplink channel resource;

using the first target signaling to indicate at least one power control parameter set from power control parameter sets at first Q positions or last Q positions in the power control parameter configuration of the uplink channel resource; wherein default power control parameters, which are in the power control parameter sets indicated by the first target signaling, are power control parameters used to determine the transmission power of the uplink channel resource, and Q is an integer greater than or equal to 1, and the power control parameter sets are sorted according to sizes of values of identifiers or according to configuration sequence.

Optionally, the information, which is used to determine the transmission power of the uplink channel resource and is indicated by the first target signaling, includes power control parameter indication information; the power control parameter indication information indicates at least one power control parameter through the number of the power control parameters; the number of power control parameters used to determine the transmission power of the uplink channel resource is equal to the number indicated by the power control parameter indication information; or, the information, which is used to determine the transmission power of the uplink channel resource and is indicated by the first target signaling, includes power control parameter set indication information; the power control parameter set indication information indicates at least one power control parameter set through the number of the power control parameter sets; the number of power control parameter sets used to determine the transmission power of the uplink channel resource is equal to the number indicated by the power control parameter set indication information; or, the information, which is used to determine the transmission power of the uplink channel resource and is indicated by the first target signaling, includes power control parameter indication information; the power control parameter indication information indicates at least one group of power control parameters through the groups of the power control parameters; power control parameters used to determine the transmission power of the uplink channel resource are power control parameters in the groups of power control parameters indicated by the power control parameter indication information; or, the information, which is used to determine the transmission power of the uplink channel resource and is indicated by the first target signaling, includes power control parameter set indication information; the power control parameter set indication information indicates at least one group of power control parameter sets through the groups of the power control parameter sets; power control parameter sets used to determine the transmission power of the uplink channel resource are power control parameter sets in the groups of power control parameter sets indicated by the power control parameter set indication information.

Optionally, the first power control parameter includes any one of the following:

the first power control parameter is a power control parameter with an identifier whose value is a first preset value;

the first power control parameter is a power control parameter in a power control parameter set with an identifier whose value is a second preset value;

the first power control parameter is a power control parameter with an identifier whose value is of a size at a first preset level;

the first power control parameter is a power control parameter in a power control parameter set with an identifier whose value is of a size at a second preset level;

wherein the size of the value of the identifier at the first preset level or the size of the value of the identifier at the second preset level includes any one of the following: a size of a value of an identifier is the smallest, a size of a value of an identifier is the largest, a size of a value of an identifier is at an intermediate value.

Optionally, the first power control parameter is a power control parameter indicated by an information field at a first preset position according to sequence of multiple information fields for indicating power control parameters in the first target signaling; or, the first power control parameter is a power control parameter in a power control parameter set indicated by an information field at a second preset position according to sequence of multiple information fields for indicating power control parameter sets in the first target signaling;

wherein the information field at the first preset position or the information field at the second preset position includes any one of the following: a first information field, a last information field, and an information field at a middle position.

Optionally, the first power control parameter is a power control parameter at a third preset position according to sequence of valid power control parameters indicated by the first target signaling; or, the first power control parameter is a power control parameter in a power control parameter set at a fourth preset position according to sequence of valid power control parameter sets indicated by the first target signaling;

wherein the third preset position or the fourth preset position includes any one of the following: a first valid position, a last valid position, and a middle valid position.

Optionally, the first power control parameter is a power control parameter at a fifth preset position in power control parameters indicated by the first target signaling; or, the first power control parameter is a power control parameter in a power control parameter set at a sixth preset position in power control parameters indicated by the first target signaling;

wherein the fifth preset position or the sixth preset position includes any one of the following: a first position, a last position, and a position in the middle.

Optionally, the first power control parameter is a power control parameter corresponding to a code at a seventh preset position in a code sequence corresponding to the power control parameters indicated by the first target signaling; or, the first power control parameter is a power control parameter corresponding to a code at an eighth preset position in a code sequence corresponding to the power control parameter sets indicated by the first target signaling;

wherein the seventh preset position or the eighth preset position includes any one of the following: most significant bit (MSB) and least significant bit (LSB).

Optionally, the first power control parameter is a power control parameter in a group at a ninth preset position according to sequence of multiple groups of power control parameters of the uplink channel resource; or, the first power control parameter is a power control parameter in a group of power control parameter set at a tenth preset position according to sequence of multiple groups of power control parameter sets of the uplink channel resource;

wherein the group at the ninth preset position or the group at the tenth preset position includes any one of the following: a first group, a last group, and a group in a middle position.

Optionally, the first target signaling includes an information field used to indicate power control parameters and/or power control parameter sets, wherein the information field is greater than or equal to $\lceil \log_2(2^K-1) \rceil$ bit, and K is the number of power control parameters or power control parameter sets indicated by the first target signaling.

Optionally, the first target signaling includes an information field used to indicate power control parameters and/or power control parameter sets; the information field further indicates a sequence of the power control parameters and/or the power control parameter sets; the information field is greater than or equal to $$\left\lceil \log_2\left(\sum_{k=1}^{K} A_K^k\right) \right\rceil$$

bit, and K is the number of power control parameters or power control parameter sets indicated by the first target signaling, and $$A_K^k$$

represents the number of permutations and combination for selecting k numbers from K numbers.

Optionally, the first target signaling includes one or more information fields used to indicate power control parameters and/or power control parameter sets; at least part of the information fields are provided with indication information for indicating whether power control parameters and/or power control parameter sets corresponding to the information fields are valid.

Optionally, the method further includes:

configuring at least one group of common power control parameters applicable to all dedicated uplink channel resources; or, configuring at least one group of common power control parameters applicable to all dedicated uplink channel resources, and configuring, for the uplink channel resource, at least one group of dedicated power control parameters dedicated to the uplink channel resource.

Optionally, the first target signaling is medium access control-control element (MAC-CE) signaling or downlink control information (DCI).

Optionally, the MAC-CE is MAC-CE signaling used to indicate spatial relation information of the uplink channel resource; the MAC-CE includes information of whether a spatial reference signal indicated by the spatial relation information is invalid.

Optionally, the second target signaling is downlink control information (DCI); and a transmit power control (TPC) field of DCI is used to indicate information of a corresponding relationship between the repetition of the uplink channel resource and the identification information or group of power control parameters, or information of a corresponding relationship between the repetition of the uplink channel resource and the identification information or group of power control parameter sets.

Optionally, before indicating information used to determine a transmission power of an uplink channel resource, by using a first target signaling, the method further includes: grouping uplink channel resources of the terminal;

the step of indicating information used to determine a transmission power of an uplink channel resource, by using a first target signaling, includes:

for any group of uplink channel resources, indicating information used for determining transmission power of the uplink channel resources from a power control configuration pre-configured for the group of uplink channel resources, by using the first target signaling.

Optionally, the uplink channel resource is an uplink shared channel (PUSCH) resource, and the first repetition is a nominal repetition with an earliest transmission moment; or, the uplink channel resource is an uplink control channel (PUCCH) resource, and the first repetition is an actual repetition with an earliest transmission moment, or the first repetition is a repetition opportunity with an earliest transmission moment.

In a second aspect, one embodiment of the present disclosure further provides an uplink channel power control apparatus applied to a network device, including:

an indication module configured to indicate information used to determine a transmission power of an uplink channel resource, by using a first target signaling; wherein the information, which is used to determine the transmission power of the uplink channel resource and is indicated by the first target signaling, includes at least one of power control parameter indication information and power control parameter set indication information; and a transmission module configured to transmit the first target signaling to a terminal, wherein the first target signaling is used by the terminal to determine the transmission power of the uplink channel resource.

In a third aspect, one embodiment of the present disclosure further provides a network device, including: a memory, a transceiver, and a processor;

wherein the memory is configured to store a computer program; the transceiver is configured to transmit and receive data under the control of the processor; the processor is configured to read the computer program in the memory and perform the following steps:

indicating information used to determine a transmission power of an uplink channel resource, by using a first target signaling; wherein the information, which is used to determine the transmission power of the uplink channel resource and is indicated by the first target signaling, includes at least one of power control parameter indication information and power control parameter set indication information;

transmitting the first target signaling to a terminal, wherein the first target signaling is used by the terminal to determine the transmission power of the uplink channel resource.

In a fourth aspect, one embodiment of the present disclosure further provides an uplink channel power control method performed by a terminal, including:

receiving a first target signaling; wherein the first target signaling indicates information used to determine a transmission power of an uplink channel resource; the information, which is used to determine the transmission power of the uplink channel resource and is indicated by the first target signaling, includes at least one of power control parameter indication information and power control parameter set indication information; and determining the transmission power of the uplink channel resource according to the first target signaling.

Optionally, the power control parameter indication information indicates at least one power control parameter through at least one of the following:

identification information of power control parameters, the number of power control parameters and groups of power control parameters.

Optionally, the power control parameter set indication information indicates at least one power control parameter set through at least one of the following: identification information of power control parameter sets, the number of power control parameter sets and groups of power control parameter sets.

Optionally, the step of determining the transmission power of the uplink channel resource according to the first target signaling, includes:

determining a first power control parameter based on first preset information;

determining a transmission power of a first repetition of the uplink channel resource by using the first power control parameter.

Optionally, the first preset information includes any one of a default power control parameter, a value of an identifier of a power control parameter, a size of a value of an identifier of a power control parameter, an information field of a first target signaling, a sequence of power control parameters indicated by a first target signaling and a code sequence corresponding to power control parameters indicated by a first target signaling; and/or, a valid state of a power control parameter indicated by a first target signaling; and/or, sorting of groups of power control parameters; and/or, the first preset information includes any one of a default power control parameter set, a value of an identifier of a power control parameter set, a size of a value of an identifier of a power control parameter set, a sequence of power control parameter sets indicated by a first target signaling and a code sequence corresponding to power control parameter sets indicated by a first target signaling; and/or, a valid state of a power control parameter set indicated by a first target signaling; and/or, sorting of groups of power control parameter sets.

Optionally, the power control parameter indication information indicates multiple types of power control parameters, or, a power control parameter set indicated by the power control parameter set indication information is a power control parameter set including multiple types of power control parameters;

the step of determining a first power control parameter based on first preset information, includes:

using the same or different preset indicators to determine first power control parameters corresponding to different types of power control parameters.

Optionally, the step of determining the transmission power of the uplink channel resource according to the first target signaling, includes any one of the following:

according to information of a corresponding relationship between repetitions of the uplink channel resource and identification information or group of power control parameters, which is indicated by the first target signaling or a second target signaling, determining power control parameters used to determine the transmission power of the first repetition of the uplink channel resource;

according to information of a corresponding relationship between repetitions of the uplink channel resource and identification information or group of power control parameter sets, which is indicated by the first target signaling or the second target signaling, determining power control parameters used to determine the transmission power of the first repetition of the uplink channel resource;

wherein the second target signaling is different from the first target signaling.

Optionally, the information, which is used to determine the transmission power of the uplink channel resource and is indicated by the first target signaling, includes power control parameter indication information; the first target signaling indicates at least one power control parameter from any one of the following items:

default power control parameters in a power control parameter configuration of the uplink channel resource;

at least one power control parameter at first N positions or last N positions in the power control parameter configuration of the uplink channel resource;

wherein N is an integer greater than or equal to 1, and the power control parameters are sorted according to sizes of values of identifiers or according to configuration sequence;

default power control parameters in a power control parameter set included in the power control parameter configuration;

at least one power control parameter at first M positions or last M positions in a power control parameter set included in the power control parameter configuration of the uplink channel resource; wherein M is an integer greater than or equal to 1, and the power control parameters are sorted according to sizes of values of identifiers or according to configuration sequence.

Optionally, the information, which is used to determine the transmission power of the uplink channel resource and is indicated by the first target signaling, includes power control parameter set indication information, the first target signaling indicates at least one power control parameter set from a power control parameter set included in a power control parameter configuration of the uplink channel resource; and the step of determining the transmission power of the uplink channel resource according to the first target signaling, includes: determining the transmission power of the uplink channel resource according to the default power control parameters in the indicated power control parameter set; or, the first target signaling indicates at least one power control parameter set from a power control parameter set included in the power control parameter configuration of the uplink channel resource; and the step of determining the transmission power of the uplink channel resource according to the first target signaling, includes: determining the transmission power of the uplink channel resource according to power control parameters at first P positions or last P positions in the indicated power control parameter sets; wherein P is an integer greater than or equal to 1, and the power control parameters are sorted according to sizes of values of identifiers or according to configuration sequence; or, the first target signaling indicates at least one power control parameter set from a default power control parameter set included in the power control parameter configuration of the uplink channel resource; and the step of determining the transmission power of the uplink channel resource according to the first target signaling, includes: determining the transmission power of the uplink channel resource according to default power control parameters in the indicated power control parameter sets; or, the first target signaling indicates at least one power control parameter set from power control parameter sets at first Q positions or last Q positions in the power control parameter configuration of the uplink channel resource; and the step of determining the transmission power of the uplink channel resource according to the first target signaling, includes: determining the transmission power of the uplink channel resource according to default power control parameters in the indicated power control parameter sets; wherein Q is an integer greater than or equal to 1, and the power control parameter sets are sorted according to sizes of values of identifiers or according to configuration sequence.

Optionally, the information, which is used to determine the transmission power of the uplink channel resource and is indicated by the first target signaling, includes power control parameter indication information; the power control parameter indication information indicates at least one power control parameter through the number of the power control parameters; and the step of determining the transmission power of the uplink channel resource according to the first target signaling, includes: determining the number of power control parameters used to determine the transmission power of the uplink channel resource according to the number indicated by the power control parameter indication information; or, the information, which is used to determine the transmission power of the uplink channel resource and is indicated by the first target signaling, includes power control parameter set indication information; the power control parameter set indication information indicates at least one power control parameter set through the number of the power control parameter sets; and the step of determining the transmission power of the uplink channel resource according to the first target signaling, includes: determining the number of power control parameter sets used to determine the transmission power of the uplink channel resource according to the number indicated by the power control parameter set indication information; or, the information, which is used to determine the transmission power of the uplink channel resource and is indicated by the first target signaling, includes power control parameter indication information; the power control parameter indication information indicates at least one group of power control parameters through the groups of the power control parameters; and the step of determining the transmission power of the uplink channel resource according to the first target signaling, includes: determining power control parameters used to determine the transmission power of the uplink channel resource in the groups of power control parameters indicated by the power control parameter indication information; or, the information, which is used to determine the transmission power of the uplink channel resource and is indicated by the first target signaling, includes power control parameter set indication information; the power control parameter set indication information indicates at least one group of power control parameter sets through the groups of the power control parameter sets; and the step of determining the transmission power of the uplink channel resource according to the first target signaling, includes: determining power control parameter sets used to determine the transmission power of the uplink channel resource in the groups of power control parameter sets indicated by the power control parameter set indication information.

Optionally, the step of determining a first power control parameter based on first preset information, includes any one of the following:

determining the first power control parameter according to a power control parameter with an identifier whose value is a first preset value;

determining the first power control parameter according to power control parameters in a power control parameter set with an identifier whose value is a second preset value;

determining the first power control parameter according to a power control parameter with an identifier whose value is of a size at a first preset level;

determining the first power control parameter according to a power control parameter in a power control parameter set with an identifier whose value is of a size at a second preset level;

wherein the size of the value of the identifier at the first preset level or the size of the value of the identifier at the second preset level includes any one of the following: a size of a value of an identifier is the smallest, a size of a value of an identifier is the largest, a size of a value of an identifier is at an intermediate value.

Optionally, the step of determining a first power control parameter based on first preset information, includes any one of the following:

determining the first power control parameter according to a power control parameter indicated by an information field at a first preset position according to sequence of multiple information fields for indicating power control parameters in the first target signaling; or, determining the first power control parameter according to a power control parameter in a power control parameter set indicated by an information field at a second preset position according to sequence of multiple information fields for indicating power control parameter sets in the first target signaling;

wherein the information field at the first preset position or the information field at the second preset position includes any one of the following: a first information field, a last information field, and an information field at a middle position.

Optionally, the step of determining a first power control parameter based on first preset information, includes any one of the following:

determining the first power control parameter according to a power control parameter at a third preset position according to sequence of valid power control parameters indicated by the first target signaling; or, determining the first power control parameter according to a power control parameter in a power control parameter set at a fourth preset position according to sequence of valid power control parameter sets indicated by the first target signaling;

wherein the third preset position or the fourth preset position includes any one of the following: a first valid position, a last valid position, and a middle valid position.

Optionally, the step of determining a first power control parameter based on first preset information, includes any one of the following:

determining the first power control parameter according to a power control parameter at a fifth preset position in power control parameters indicated by the first target signaling; or, determining the first power control parameter according to a power control parameter in a power control parameter set at a sixth preset position in power control parameters indicated by the first target signaling;

wherein the fifth preset position or the sixth preset position includes any one of the following: a first position, a last position, and a position in the middle.

Optionally, the step of determining a first power control parameter based on first preset information, includes any one of the following:

determining the first power control parameter according to a power control parameter corresponding to a code at a seventh preset position in a code sequence corresponding to the power control parameters indicated by the first target signaling; or, determining the first power control parameter according to a power control parameter corresponding to a code at an eighth preset position in a code sequence corresponding to the power control parameter sets indicated by the first target signaling;

wherein the seventh preset position or the eighth preset position includes any one of the following: most significant bit (MSB) and least significant bit (LSB).

Optionally, the step of determining a first power control parameter based on first preset information, includes any one of the following:

determining the first power control parameter according to a power control parameter in a group at a ninth preset position according to sequence of multiple groups of power control parameters of the uplink channel resource; or, determining the first power control parameter according to a power control parameter in a group of power control parameter set at a tenth preset position according to sequence of multiple groups of power control parameter sets of the uplink channel resource;

wherein the group at a ninth preset position or the group at a tenth preset position includes any one of the following: a first group, a last group, and a group in a middle position.

Optionally, the first target signaling is medium access control-control element (MAC-CE) signaling or downlink control information (DCI).

Optionally, the MAC-CE is MAC-CE signaling used to indicate spatial relation information of the uplink channel resource; and the MAC-CE includes information of whether a spatial reference signal indicated by the spatial relation information is invalid.

Optionally, the second target signaling is downlink control information (DCI); and a transmit power control (TPC) field of DCI is used to indicate information of a corresponding relationship between the repetition of the uplink channel resource and the identification information or group of power control parameters, or information of a corresponding relationship between the repetition of the uplink channel resource and the identification information or group of power control parameter sets.

Optionally, the uplink channel resource is an uplink shared channel (PUSCH) resource, and the first repetition is a nominal repetition with an earliest transmission moment; or, the uplink channel resource is an uplink control channel (PUCCH) resource, and the first repetition is an actual repetition with an earliest transmission moment, or the first repetition is a repetition opportunity with an earliest transmission moment.

In a fifth aspect, one embodiment of the present disclosure further provides an uplink channel power control apparatus applied to a terminal, including:

a receiving module configured to receive a first target signaling; wherein the first target signaling indicates information used to determine a transmission power of an uplink channel resource; the information, which is used to determine the transmission power of the uplink channel resource and is indicated by the first target signaling, includes at least one of power control parameter indication information and power control parameter set indication information;

a determination module configured to determine the transmission power of the uplink channel resource according to the first target signaling.

In a sixth aspect, one embodiment of the present disclosure further provides a terminal, including: a memory, a transceiver, and a processor;

wherein the memory is configured to store a computer program; the transceiver is configured to transmit and receive data under the control of the processor; the processor is configured to read the computer program in the memory and perform the following operations:

receiving a first target signaling; wherein the first target signaling indicates information used to determine a transmission power of an uplink channel resource; the information, which is used to determine the transmission power of the uplink channel resource and is indicated by the first target signaling, includes at least one of power control parameter indication information and power control parameter set indication information;

determining the transmission power of the uplink channel resource according to the first target signaling.

In this embodiment of the present disclosure, the network device uses the first target signaling to dynamically indicate the information used to determine the transmission power of the uplink channel resource, where the information, which is used to determine the transmission power of the uplink channel resource and is indicated by the first target signaling, includes but not limited to power control parameter indication information and power control parameter set indication information. The network device transmits the first target signaling to the terminal. The terminal can determine the transmission power of the uplink channel resource based on the first target signaling. In this way, the network device dynamically indicates the information used to determine the transmission power of the uplink channel resource, so that in case that the network device does not configure the spatial setup signaling for the terminal, the network device and the terminal can also have a consistent understanding of the transmission power of uplink channel resources, thereby ensuring normal operation of M-TRP uplink channel transmission. The information used to determine the transmission power of the uplink channel resource may be indicated by the network device in various indication ways such as identification information, number and group of the power control parameters, and power control parameter set indication information, which are flexible and highly operable.

The above description is only an overview of the technical solution of the present disclosure. In order to better understand the technical solution of the present disclosure, it can be implemented according to contents of the description, and in order to make the above and other purposes, features and advantages of the present disclosure easily understood, the specific embodiments of the present disclosure are listed hereinafter.

BRIEF DESCRIPTION OF THE DRAWINGS

In order to illustrate technical solutions according to embodiments of the present disclosure or the related art more clearly, drawings to be used in the description of the embodiments or the related art will be described briefly hereinafter. Apparently, the drawings described hereinafter are only some embodiments of the present disclosure, and other drawings may be obtained by those skilled in the art according to those drawings without creative work.

FIG. 1 is a schematic flowchart of an uplink channel power control method performed by a network device according to an embodiment of the present disclosure;

FIG. 2 is a schematic flowchart of an uplink channel power control method performed by a terminal according to an embodiment of the present disclosure;

DETAILED DESCRIPTION

Figure 3:
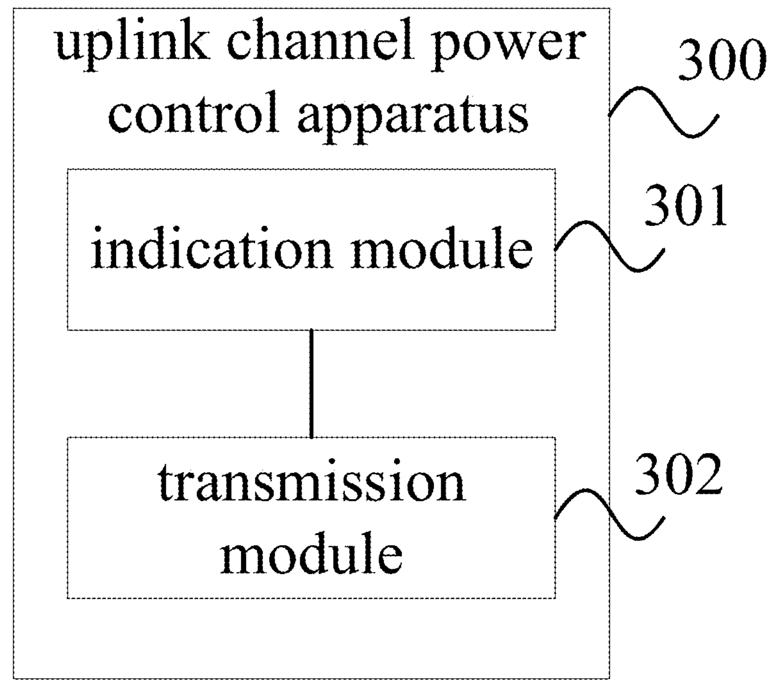
FIG. 3 is a schematic block diagram of an uplink channel power control apparatus applied to a network device according to an embodiment of the present disclosure.

In order to make objects, technical solutions and advantages of embodiments of the present disclosure more apparent, the technical solutions in the embodiments of the present disclosure will be described hereinafter in a clear and complete manner in conjunction with the accompanying drawings of the embodiments of the present disclosure. Obviously, the following embodiments are merely a part of, rather than all of, the embodiments of the present disclosure, and based on these embodiments, a person skilled in the art may obtain the other embodiments, which also fall within the scope of the present disclosure.

The terms "and/or" in the embodiments of the present disclosure are used to describe association relationship between associated objects, and indicate that there may be three relationships, for example, A and/or B means there are three situations, i.e., there is A alone, there are both of A and B, or, there is B alone. The character "/" generally means that relationship between associated objects before and after the character "/" is "or".

The term "plurality" in the embodiments of the present disclosure means two or more, and other quantifiers are similar.

Embodiments of the present disclosure provide an uplink channel power control method, apparatus, network device and terminal, to provide a dynamic indication method of an uplink channel resource power control parameter.

The method and the apparatus are based on the same concept. Since principles of the method and the apparatus for solving the problems are similar, implementation of the apparatus and the method can be referred to each other, and duplication is not repeated.

In addition, the technical solutions provided in the embodiments of the present disclosure may be applicable to various systems, especially the fifth generation communication (5G) system. For example, applicable systems may be global system of mobile communication (GSM) system, code division multiple access (CDMA) system, wideband code division multiple access (WCDMA) general packet wireless service (GPRS) system, long term evolution (LTE) system, LTE frequency division duplex (FDD) system, LTE time division duplex (TDD) system, long term evolution advanced (LTE-A) system, universal mobile telecommunication system (UMTS), worldwide interoperability for microwave access (WiMAX) system, 5G new radio (NR) system, etc. Each of the various systems includes a user equipment and a network device. The system may further include a core network part, such as an evolved packet system (EPS), a 5G system (5GS).

The terminal (device) involved in the embodiments of the present disclosure may be a device that provides voice and/or data connectivity to a user, a handheld device with a wireless connection function, or other processing device coupled to a wireless modem. In different systems, names of terminal devices may be different. For example, in the 5G system, the terminal device may be referred as user equipment (UE). A wireless terminal device may communicate with one or more core networks (CN) via a radio access network (RAN). The wireless terminal device may be a mobile terminal device such as a mobile phone (or referred as cell phone), or a computer with a mobile terminal device, such as a portable, pocket-sized, handheld, computer built-in or vehicle-mounted mobile device, which exchange language and/or data with wireless access networks, for example, a personal communication service (PCS) phone, a cordless phone, a session initiated protocol (SIP) phone, a wireless local loop (WLL) station, a personal digital assistant (PDA) and other device. The wireless terminal device may also be referred to as system, subscriber unit, subscriber station, mobile station, mobile, remote station, access point, remote terminal, access terminal, user terminal, user agent, or user device, which are not limited in the embodiments of the present disclosure.

The network device involved in the embodiments of the present disclosure may be a base station, and the base station may include a plurality of cells for providing services for the terminal. According to different specific application scenarios, the base station may also be referred as an access point, or the base station may be a device in an access network that communicates with wireless terminal devices through one or more sectors on air interfaces, or other names. The network device may be used to exchange received frames with internet protocol (IP) packets, and act as a router between the wireless terminal device and the rest of the access network, where the rest of the access network may include an internet protocol (IP) communication network. The network device may also coordinate attribute management for air interfaces. For example, the network device involved in the embodiments of the present disclosure may be a base transceiver station (BTS) in global system for mobile communications (GSM) or code division multiple access (CDMA), a NodeB in wide-band code division multiple access (WCDMA), an evolutional Node B (eNB or e-NodeB) in long term evolution (LTE) system, a 5G base station (gNB) in the 5G network architecture (next generation system), a home evolved Node B (HeNB), a relay node, a femto, or a pico, which are not limited in the embodiments of the present disclosure. In some network structures, the network device may include a centralized unit (CU) node and a distributed unit (DU) node; and the centralized unit and the distributed unit may also be geographically separated.

Each of the network device and the terminal can use one or more antennas for multi input multi output (MIMO) transmission between the network device and the terminal. The MIMO transmission may be single user MIMO (SU-MIMO), or multiple user MIMO (MU-MIMO). According to forms and numbers of antenna combinations, MIMO transmission may be two dimensional-MIMO (2D-MIMO), three dimensional-MIMO (3D-MIMO), full dimensional-MIMO (FD-MIMO), or massive-MIMO, or diversity transmission, precoding transmission, or beamforming transmission.

In order to facilitate understanding of the solutions of the present disclosure, relevant content involved in the embodiments of the present disclosure will be briefly introduced hereinafter.

The Rel-16 version of the NR system supports uplink channel transmission of single transmission and reception point (S-TRP). An open-loop parameter required for calculation of uplink channel resource transmission power may be determined according to a target receiving power P0, and a path loss parameter required for calculation of uplink channel resource transmission power may be determined according to a reference signal (a path loss reference signal) used to measure path loss. At a network device (taking a base station as an example), the base station may configure one or more target receiving powers P0 and one or more path loss reference signals (which may be configured through a path loss reference signal pathlossReferenceRS) for the terminal, and may configure closed-loop parameters, and such configurations can be used for all UE-specific uplink channel resources. For a cell-common uplink channel resource, the base station may configure one or more corresponding target receiving powers P0.

The base station may configure for the terminal, in a spatial relation information signaling SpatialRelationInfo, association relationship between a spatial relation information identifier SpatialRelationInfoId and a target receiving power P0, a path loss reference signal and a closed loop parameter of an uplink channel resource. In case that the base station indicates a spatial relation information identifier (SpatialRelationInfoId) for an uplink channel resource, the terminal needs to use a reference signal included in the spatial relation parameter to determine a spatial filter of the uplink channel resource, and takes the associated target receiving power P0, path loss reference signal and closed loop parameter included in the spatial relation parameter as a target receiving power P0, a path loss reference signal and a closed loop parameter corresponding to the uplink channel resource.

If the base station does not configure the spatial relation information signaling SpatialRelationInfo for the terminal but configures a path loss reference signal pathlossReferenceRS, the terminal uses specific target receiving power P0, path loss reference signal and closed-loop parameter to determine a transmission power of the uplink channel resource.

In the Rel-17 version of the NR system, an uplink channel transmission of multi-transmission/reception point (M-TRP) is introduced, which specifically includes the following method including realizing M-TRP transmission through repetition transmissions of an uplink channel, where each TRP is corresponding to a part of transmissions of repetition versions of the uplink channel (which is referred as uplink channel repetition hereinafter), and different TRPs are corresponding to different uplink channel repetitions.

In case that M-TRP transmission is supported in an uplink channel, in a lower frequency band (such as an FR1 frequency band), the base station does not need to indicate a spatial filtering value of an uplink channel resource, and the base station does not configure SpatialRelationInfo for the terminal. At this point, according to the foregoing introduction, the terminal determines a transmission power of the uplink channel resource by using a specific P0, path loss reference signal and closed-loop parameter.

In the M-TRP uplink channel transmission mode, if the above method is still used to determine the transmission power, then P0, path loss reference signal and closed-loop parameter of multiple TRPs are the same. But in fact, due to different physical locations of multiple TRPs, path losses experienced by uplink channel resources, optimal target receiving powers P0, and closed-loop parameters are all likely to be different. Thus, in order to obtain better M-TRP uplink channel transmission performance, it is necessary to consider a new uplink channel resource power control parameter determination scheme.

In order to support indication of M-TRP uplink channel resource power control parameters in the FR1 frequency band, one possible way is to, in case of performing repetition transmissions on uplink channel resources supporting M-TRP, allow the base station to configure a set of power control parameters for each of multiple TRPs in radio resource control (RRC) signaling; in case that the base station does not indicate SpatialRelationInfo to the terminal but configures pathlossReferenceRS, repetition corresponding to each of multiple TRPs are specific P0, path loss reference signal and closed loop parameter in a set of power control parameters corresponding to each of the multiple TRPs.

One possible manner is to introduce an indication signaling for indicating that an uplink channel resource is S-TRP transmission or M-TRP transmission.

One embodiment of the present disclosure provides a method for dynamically indicating an uplink channel resource power control parameter, which solves the power control problem of the uplink channel under M-TRP when the base station does not configure SpatialRelationInfo for the terminal.

Referring to FIG. 1, FIG. 1 is a schematic flowchart of an uplink channel power control method performed by a network device according to an embodiment of the present disclosure. The method includes the following steps.

Step 101: indicating information used to determine a transmission power of an uplink channel resource, by using a first target signaling; where the information, which is used to determine the transmission power of the uplink channel resource and is indicated by the first target signaling, includes at least one of power control parameter indication information and power control parameter set indication information.

Here, the network device uses the first target signaling to dynamically indicate the information used to determine the transmission power of the uplink channel resource, so that in case that the network device does not configure the spatial setup signaling for the terminal, the network device and the terminal can also have a consistent understanding of the transmission power of uplink channel resources, thereby ensuring normal operation of M-TRP uplink channel transmission. The information used to determine the transmission power of the uplink channel resource indicated by the first target signaling may include the power control parameter indication information and the power control parameter set indication information. The power control parameter indication information may indicate at least one power control parameter in various indication ways such as indicating identification information, number, and group of the power control parameters, and the indication ways are flexible and highly operable.

The network device may configure at least one power control parameter for an uplink channel resource through RRC signaling.

The power control parameter may include at least one of the following: a target receiving power P0, a path loss reference signal and a closed loop reference signal, which is not limited thereto.

The power control parameter configured by the network device for the uplink channel resources may include at least one group of power control parameters, and each group of power control parameters includes at least one power control parameter. The power control parameters configured by the network device for the uplink channel resources may also include at least one power control parameter set, and each power control parameter set includes at least one power control parameter. Multiple power control parameter sets may also be divided into different groups, and each group of power control parameter sets includes at least one power control parameter set.

For example, it is assumed that the network device configures A power control parameters and/or B power control parameter sets for uplink channel resources, and both A and B are integers greater than or equal to 1. The network device can indicate, through the power control parameter indication information, at least one power control parameter from power control parameters included in the A power control parameters and/or B power control parameter sets, so as to determine the transmission power of uplink channel resources. Alternatively, the network device may also indicate, through the power control parameter set indication information, at least one power control parameter set from the B power control parameter sets, so as to determine the transmission power of uplink channel resources.

Optionally, the power control parameter set indication information may indicate at least one power control parameter set through at least one of the following: identification information of a power control parameter set, the number of power control parameter sets and groups of power control parameter sets, which are not thereto.

At this point, the power control parameter set indication information may indicate at least one power control parameter set through a variety of indication ways such as the identification information, the number and the groups of the power control parameter sets, and the indication ways are flexible and changeable.

Step 102: transmitting the first target signaling to a terminal, where the first target signaling is used by the terminal to determine the transmission power of the uplink channel resource.

Here, the first target signaling is transmitted to the terminal, and the terminal determines the transmission power of the uplink channel resource according to the information used to determine the transmission power of the uplink channel resource indicated by the first target signaling, so that the network device and the terminal can have a consistent understanding of the transmission power of uplink channel resources, thereby ensuring normal operation of M-TRP uplink channel transmission.

In the uplink channel power control method according to the embodiment of the present disclosure, the network device uses the first target signaling to dynamically indicate the information used to determine the transmission power of the uplink channel resource, so that in case that the network device does not configure the spatial setup signaling for the terminal, the network device and the terminal can also have a consistent understanding of the transmission power of uplink channel resources, thereby ensuring normal operation of M-TRP uplink channel transmission. The information used to determine the transmission power of the uplink channel resource may be indicated by the network device in various indication ways such as identification information, number and group of the power control parameters, and power control parameter set indication information, which are flexible and highly operable.

The uplink channel resource involved in the embodiments of the present disclosure includes but is not limited to a physical uplink control channel (PUCCH) resource, a physical uplink shared channel (PUSCH) resource.

Optionally, the first target signaling is medium access control-control element (MAC-CE) signaling or downlink control information (DCI), which is not limited thereto.

At this point, the network device can indicate to the terminal, through MAC-CE or DCI, a power control parameter and/or a power control parameter set of an uplink channel resource triggered by the DCI; and the terminal receives the DCI and determines that transmission needs to be performed on the uplink channel resource. The terminal determines a transmission power of the uplink channel resource according to the power control parameter and/or power control parameter set indicated by the MAC-CE or DCI. In case that the network device does not configure the spatial setup signaling for the terminal, the network device and the terminal can also have a consistent understanding of the transmission power of the uplink channel resource, thereby ensuring normal operation of M-TRP uplink channel transmission.

In one embodiment of the present disclosure, the network device may indicate at least one power control parameter by indicating at least one of the identification information (such as ID) of power control parameters, the number of power control parameters, and groups of power control parameters. Similarly, the network device may indicate at least one power control parameter set by indicating at least one of identification information of power control parameter sets, the number of power control parameter sets, and groups of power control parameters. Such indication ways are described hereinafter.

Indication way 1.1: indicating identification information of a power control parameter.

Optionally, the information, which is used to determine the transmission power of the uplink channel resource and is indicated by the first target signaling, includes power control parameter indication information. The power control parameter indication information indicates at least one power control parameter through identification information of the power control parameters. The terminal determines the transmission power of the uplink channel resource according to power control parameters corresponding to a plurality of pieces of identification information indicated by the first target signaling.

For example, in case that the first target signaling (MAC-CE or DCI) indicates a power control parameter with ID of 1 and a power control parameter with ID of 2, the terminal determines the transmission power of the uplink channel resource according to these two power control parameters.

Indication way 1.2: indicating identification information of a power control parameter set.

Optionally, the information, which is used to determine the transmission power of the uplink channel resource and is indicated by the first target signaling, includes power control parameter set indication information. The power control parameter set indication information indicates at least one power control parameter set through identification information of the power control parameter sets. The terminal determines the transmission power of the uplink channel resource according to power control parameters in power control parameter sets corresponding to one or more pieces of identification information indicated by the first target signaling.

For example, in case that the first target signaling (MAC-CE or DCI) indicates a power control parameter set with ID of 1 and a power control parameter set with ID of 2, the terminal determines the transmission power of the uplink channel resource according to power control parameters in the two power control parameter sets.

In case that the network device indicates at least one power control parameter set, the terminal may determine the transmission power of the uplink channel resource according to all power control parameters in the at least one power control parameter set, or may also determine the transmission power of the uplink channel resources according to some power control parameters (such as a power control parameter with the smallest ID or a default power control parameter) which are selected, in accordance with a set rule, from the at least one power control parameter set.

Indication way 1.3: indicating the number of power control parameters.

Optionally, the information, which is used to determine the transmission power of the uplink channel resource and is indicated by the first target signaling, includes power control parameter indication information. The power control parameter indication information indicates at least one power control parameter through the number of the power control parameters. The number of power control parameters used to determine the transmission power of the uplink channel resource is equal to the number indicated by the power control parameter indication information.

At this point, based on the number of power control parameters indicated by the first target signaling, the terminal determines the number of power control parameters used to determine the transmission power of the uplink channel resource. Then, the terminal selects a corresponding number of power control parameters, from power control parameter configuration of the uplink channel resource, to determine the transmission power of the uplink channel resource.

When the network device indicates the number of power control parameters, the terminal can select a corresponding number of power control parameters according to a set rule (such as a power control parameter with the smallest ID or a default power control parameter) to determine the transmission power of the uplink channel resource.

For example, in case that the first target signaling (MAC-CE or DCI) indicates that the number of power control parameters is 1, the terminal determines that the number of power control parameters used to determine the transmission power of the uplink channel resource is 1. Then the terminal selects, according to the set rule, 1 power control parameter from power control parameter configuration of the uplink channel resource, to determine the transmission power of the uplink channel resource.

For another example, in case that the first target signaling (MAC-CE or DCI) indicates that the number of power control parameters is 2, the terminal determines that the number of power control parameters used to determine the transmission power of the uplink channel resource is 2. Then the terminal selects, according to the set rule, 2 power control parameter from power control parameter configuration of the uplink channel resource, to determine the transmission power of the uplink channel resource.

Indication way 1.4: indicating the number of power control parameter sets.

Optionally, the information, which is used to determine the transmission power of the uplink channel resource and is indicated by the first target signaling, includes power control parameter set indication information. The power control parameter set indication information indicates at least one power control parameter set through the number of the power control parameter sets. The number of power control parameter sets used to determine the transmission power of the uplink channel resource is equal to the number indicated by the power control parameter set indication information.

At this point, based on the number of power control parameter sets indicated by the first target signaling, the terminal determines the number of power control parameter sets used to determine the transmission power of the uplink channel resource. Then, the terminal selects a corresponding number of power control parameter sets, from power control parameter configuration of the uplink channel resource, and determines the transmission power of the uplink channel resource according to power control parameters in the selected power control parameter sets.

When the network device indicates the number of power control parameter sets, the terminal can select a corresponding number of power control parameter sets according to a set rule (such as a power control parameter with the smallest ID or a default power control parameter). After the terminal selects the corresponding number of power control parameter sets, the terminal may determine the transmission power of the uplink channel resource according to all power control parameters in the corresponding number of power control parameter sets, or, may also determine the transmission power of the uplink channel resource according to some power control parameters (such as a power control parameter with the smallest ID or a default power control parameter) which are selected, in accordance with a set rule, from the corresponding number of power control parameter sets.

For example, in case that the first target signaling (MAC-CE or DCI) indicates that the number of power control parameter sets is 1, the terminal determines that the number of power control parameter sets used to determine the transmission power of the uplink channel resource is 1. Then the terminal selects, according to the set rule, 1 power control parameter set from power control parameter configuration of the uplink channel resource, and determines the transmission power of the uplink channel resource according to power control parameters in the selected one power control parameter set.

Indication way 1.5: indicating groups of power control parameters.

Optionally, the information, which is used to determine the transmission power of the uplink channel resource and is indicated by the first target signaling, includes power control parameter indication information. The power control parameter indication information indicates at least one group of power control parameters through the groups of the power control parameters. Power control parameters used to determine the transmission power of the uplink channel resource are power control parameters in the groups of power control parameters indicated by the power control parameter indication information.

At this point, based on the groups of power control parameters indicated by the first target signaling, the terminal determines power control parameters used to determine the transmission power of the uplink channel resource, from power control parameters of the indicated groups of power control parameters. The terminal can select at least one power control parameter from the power control parameters of the indicated group to determine the transmission power of the uplink channel resource.

When the network device indicates the group of power control parameters, the terminal can select, according to a set rule (such as a power control parameter with the smallest ID or a default power control parameter), a power control parameter from power control parameters of the indicated group to determine the transmission power of the uplink channel resource.

For example, in case that the first target signaling (MAC-CE or DCI) indicates a first group of power control parameters, the terminal determines power control parameters used to determine the transmission power of the uplink channel resource, from power control parameters of the first group of power control parameters. The terminal may select, according to a set rule, at least one power control parameter from the first group of power control parameters, to determine the transmission power of the uplink channel resource.

For another example, in case that the first target signaling (MAC-CE or DCI) indicates a first group of power control parameters and a second group of power control parameters, the terminal determines power control parameters used to determine the transmission power of the uplink channel resource, from power control parameters of the first group of power control parameters and the second group of power control parameters. The terminal may select, according to a set rule, at least one power control parameter from the first group of power control parameters and the second group of power control parameters respectively, to determine the transmission power of the uplink channel resource.

Indication way 1.6: indicating groups of power control parameter sets.

Optionally, the information, which is used to determine the transmission power of the uplink channel resource and is indicated by the first target signaling, includes power control parameter set indication information. The power control parameter set indication information indicates at least one group of power control parameter sets through the groups of the power control parameter sets. Power control parameter sets used to determine the transmission power of the uplink channel resource are power control parameter sets in the groups of power control parameter sets indicated by the power control parameter set indication information.

At this point, based on the groups of power control parameter sets indicated by the first target signaling, the terminal determines power control parameter sets used to determine the transmission power of the uplink channel resource, from power control parameter sets of the indicated groups of power control parameter sets. Optionally, the terminal selects at least one power control parameter set from power control parameter sets of the indicated group, and determines the transmission power of the uplink channel resource according to power control parameters in the selected power control parameter sets. Optionally, the terminal determines the transmission power of the uplink channel resource by using power control parameter sets of all groups indicated by the first target signaling.

Optionally, when the network device indicates the group of power control parameter sets, the terminal can select, according to a set rule, at least one power control parameter set from power control parameter sets of the specified group. After the terminal selects at least one power control parameter set, the terminal may determine the transmission power of the uplink channel resource according to all power control parameters in the at least one power control parameter set, or may determine the transmission power of the uplink channel resource according to some power control parameters (such as a power control parameter with the smallest ID or a default power control parameter) which are selected, in accordance with a set rule, from the at least one power control parameter set.

For example, in case that the first target signaling (MAC-CE or DCI) indicates a first group of power control parameter sets, the terminal determines power control parameter sets used to determine the transmission power of the uplink channel resource, from power control parameter sets of the first group of power control parameter sets. The terminal may select, according to a set rule, at least one power control parameter set from the first group of power control parameter sets, and determines the transmission power of the uplink channel resource according to power control parameters in the selected power control parameter sets.

In the above indication ways 1.2 to 1.6, when the first target signaling indicates the number and group of power control parameters or the identification information, number and group of power control parameter sets, the terminal may select some power control parameters or power control parameter sets according to a certain method, and a method for selecting some power control parameters or power control parameter sets is described hereinafter.

Optionally, the information, which is used to determine the transmission power of the uplink channel resource and is indicated by the first target signaling, includes power control parameter indication information, and the above step 101 includes any one of the following steps.

Optionally, the at least one power control parameter are default power control parameters in the power control parameter configuration of the uplink channel resource.

Step 1011: indicating at least one power control parameter from a default power control parameter in the power control parameter configuration of the uplink channel resource, by using the first target signaling.

Optionally, when the first target signaling indicates identification information of the power control parameters, the first target signaling may indicate identification information of at least one power control parameter from a default power control parameter in the power control parameter configuration of the uplink channel resource. The terminal uses the default power control parameters corresponding to the indicated identification information to determine the transmission power of the uplink channel resource.

Optionally, when the first target signaling indicates the number of power control parameters, the terminal may select a corresponding number of default power control parameters from the default power control parameters in the power control parameter configuration of the uplink channel resource, to determine the transmission power of the uplink channel resource.

If the number of power control parameters indicated by the first target signaling is smaller than the number of default power control parameters included in the power control parameter configuration of the uplink channel resource, it may be agreed in the agreement that a default power control parameter with a smaller identifier is preferable.

For example, in case that the first target signaling (MAC-CE or DCI) indicates that the number of power control parameter sets is 1, the terminal selects one default power control parameter with a smallest identifier from the default power control parameters in the power control parameter configuration of the uplink channel resource to determine the transmission power of the uplink channel resource.

If the number of power control parameters indicated by the first target signaling is greater than the number of default power control parameters included in the power control parameter configuration of the uplink channel resource, it may be agreed in the agreement to reuse one or more default power control parameters, or add other specific power control parameter (such as a power control parameter with a smallest identifier or a power control parameter with an identifier of a specific value).

Optionally, when the first target signaling indicates a group of power control parameters, the terminal may select at least one default power control parameter from a default power control parameter in the indicated group of power control parameters to determine the transmission power of the uplink channel resource.

If the number of default power control parameters included in the group of power control parameters indicated by the first target signaling, is greater than the number of power control parameters used to determine the transmission power of the uplink channel resource, it may be agreed in the agreement that a default power control parameter with a smaller identifier is preferable.

For example, if the first target signaling (MAC-CE or DCI) indicates a first group of power control parameters, the terminal selects two default power control parameters with smaller identifiers from default power control parameters in the first group of power control parameters, to determine the transmission power of the uplink channel resource.

If the number of default power control parameters included in the group of power control parameters indicated by the first target signaling, is smaller than the number of power control parameters used to determine the transmission power of the uplink channel resource, it may be agreed in the agreement to reuse one or more default power control parameters, or add other specific power control parameter (such as a power control parameter with a smallest identifier or a power control parameter with an identifier of a specific value).

The default power control parameter may be configured by the network side, or may be specified in the agreement.

The default power control parameter may be a power control parameter with the smallest identifier, but is not limited thereto.

Optionally, the at least one power control parameter are power control parameters from at least one power control parameter at first N positions or last N positions in the power control parameter configuration of the uplink channel resource.

Step 1012: indicating at least one power control parameter from at least one power control parameter at first N positions or last N positions in the power control parameter configuration of the uplink channel resource, by using the first target signaling; where N is an integer greater than or equal to 1, and the power control parameters are sorted according to sizes of values of identifiers or according to configuration sequence.

Optionally, when the first target signaling indicates identification information of power control parameters, the first target signaling indicates identification information of at least one power control parameters from at least one power control parameter at first N positions or last N positions in the power control parameter configuration of the uplink channel resource. Then the terminal uses the power control parameters corresponding to the indicated identification information to determine the transmission power of the uplink channel resource.

Optionally, when the first target signaling indicates the number of power control parameters, the terminal may select a corresponding number of power control parameters from at least one power control parameter at first N positions or last N positions in the power control parameter configuration of the uplink channel resource, to determine the transmission power of the uplink channel resource.

If the number of power control parameters indicated by the first target signaling is smaller than N, it may be agreed in the agreement that a power control parameter with a smaller identifier or a default power control parameter is preferable.

For example, in case that the first target signaling (MAC-CE or DCI) indicates that the number of power control parameters is 1, the terminal selects the first power control parameter with the smallest identifier from the first two power control parameters (N is equal to 2, and the power control parameters are sorted according to sizes of values of identifiers from small to large) in the power control parameter configuration of the uplink channel resource to determine the transmission power of the uplink channel resource.

If the number of power control parameters indicated by the first target signaling is greater than N, it may be agreed in the agreement to reuse at least one power control parameter, or add other specific power control parameter (such as a power control parameter with a smallest identifier or a power control parameter with an identifier of a specific value).

Optionally, when the first target signaling indicates a group of power control parameters, the terminal may select at least one power control parameter from power control parameters at first N positions or last N positions in the indicated group of power control parameters, to determine the transmission power of the uplink channel resource.

When the first target signaling indicates the group of power control parameters, if N is greater than the number of power control parameters used to determine the transmission power of the uplink channel resource, it may be agreed in the agreement that a power control parameter with a smaller identifier or a default power control parameter is preferable.

For example, if the first target signaling (MAC-CE or DCI) indicates the first group of power control parameters, the terminal may select the first power control parameter with the smallest identifier from the first two power control parameters (N is equal to 2, and the power control parameters are sorted according to sizes of values of identifiers from small to large) in the first group of power control parameters, to determine the transmission power of the uplink channel resource.

When the first target signaling indicates the group of power control parameters, if N is smaller than the number of power control parameters used to determine the transmission power of the uplink channel resource, it may be agreed in the agreement to reuse at least one power control parameter, or add other specific power control parameter (such as a power control parameter with a smallest identifier or a power control parameter with an identifier of a specific value).

Optionally, the at least one power control parameter are default power control parameters in a power control parameter set included in the power control parameter configuration of the uplink channel resource.

Step 1013: indicating at least one power control parameter from a default power control parameter in a power control parameter set included in the power control parameter configuration of the uplink channel resource, by using the first target signaling.

Optionally, when the first target signaling indicates identification information of the power control parameters, the first target signaling may indicate identification information of at least one power control parameter from a default power control parameter in a power control parameter set included in the power control parameter configuration of the uplink channel resource. The terminal uses the default power control parameters corresponding to the indicated identification information to determine the transmission power of the uplink channel resource.

Optionally, when the first target signaling indicates the number of power control parameters, the terminal may select a corresponding number of default power control parameters from default power control parameters in a power control parameter set included in the power control parameter configuration of the uplink channel resource, to determine the transmission power of the uplink channel resource.

If the number of power control parameters indicated by the first target signaling is smaller than the number of default power control parameters in a power control parameter set included in the power control parameter configuration of the uplink channel resource, it may be agreed in the agreement that a power control parameter with a smaller identifier is preferable.

For example, if the first target signaling (MAC-CE or DCI) indicates that the number of power control parameters is 2, the terminal selects two default power control parameters with smaller identifiers from default power control parameters in a power control parameter set included in the power control parameter configuration of the uplink channel resource, to determine the transmission power of the uplink channel resource.

If the number of power control parameters indicated by the first target signaling is greater than the number of default power control parameters in a power control parameter set included in the power control parameter configuration of the uplink channel resource, it may be agreed in the agreement to reuse at least one power control parameter, or add other specific power control parameter (such as a power control parameter with a smallest identifier or a power control parameter with an identifier of a specific value).

Optionally, the at least one power control parameter are power control parameters from at least one power control parameter at first M positions or last M positions in a power control parameter set included in the power control parameter configuration of the uplink channel resource.

Step 1014: indicating at least one power control parameter from at least one power control parameter at first M positions or last M positions in a power control parameter set included in the power control parameter configuration of the uplink channel resource, by using the first target signaling; where M is an integer greater than or equal to 1, and the power control parameters are sorted according to sizes of values of identifiers or according to configuration sequence.

Optionally, when the first target signaling indicates identification information of power control parameters, the first target signaling indicates identification information of at least one power control parameters from at least one power control parameter at first M positions or last M positions in a power control parameter set included in the power control parameter configuration of the uplink channel resource. Then the terminal uses default power control parameters corresponding to the indicated identification information to determine the transmission power of the uplink channel resource.

Optionally, when the first target signaling indicates the number of power control parameters, the terminal may select a corresponding number of power control parameters from at least one power control parameter at first M positions or last M positions in a power control parameter set included in the power control parameter configuration of the uplink channel resource, to determine the transmission power of the uplink channel resource.

If the number of power control parameters indicated by the first target signaling is smaller than M, it may be agreed in the agreement that a power control parameter with a smaller identifier or a default power control parameter is preferable.

For example, in case that the first target signaling (MAC-CE or DCI) indicates that the number of power control parameters is 2, the terminal selects first two power control parameters with smaller identifiers from first four power control parameters (M is equal to 4, and the power control parameters are sorted according to identifiers from small to large) in a power control parameter set included in the power control parameter configuration of the uplink channel resource to determine the transmission power of the uplink channel resource.

If the number of power control parameters indicated by the first target signaling is greater than M, it may be agreed in the agreement to reuse at least one power control parameter, or add other specific power control parameter (such as a power control parameter with a smallest identifier or a power control parameter with an identifier of a specific value).

Optionally, the information, which is used to determine the transmission power of the uplink channel resource and is indicated by the first target signaling, includes power control parameter set indication information, and the above step 101 includes any one of the following steps.

Step 1015: indicating at least one power control parameter set from a power control parameter set included in the power control parameter configuration of the uplink channel resource, by using the first target signaling; where default power control parameters, which are in the power control parameter sets indicated by the first target signaling, are power control parameters used to determine the transmission power of the uplink channel resource.

Optionally, when the first target signaling indicates identification information of the power control parameter sets, the first target signaling may indicate identification information of at least one power control parameter set from a power control parameter set included in the power control parameter configuration of the uplink channel resource. The terminal uses default power control parameters in the indicated at least one power control parameter set to determine the transmission power of the uplink channel resource.

Optionally, when the first target signaling indicates the number of power control parameter sets, the terminal may select a corresponding number of power control parameter sets from the power control parameter sets included in the power control parameter configuration of the uplink channel resource. Default power control parameters in the corresponding number of power control parameter sets are used to determine the transmission power of the uplink channel resource.

If the number of power control parameters indicated by the first target signaling is smaller than the number of power control parameter sets included in the power control parameter configuration of the uplink channel resource, it may be agreed in the agreement that a power control parameter set with a smaller identifier or a default power control parameter set is preferable.

For example, in case that the first target signaling (MAC-CE or DCI) indicates that the number of power control parameter sets is 1, the terminal selects one power control parameter set with a smallest identifier from the power control parameter sets included in the power control parameter configuration of the uplink channel resource, and uses default power control parameters in the selected power control parameter set to determine the transmission power of the uplink channel resource.

If the number of power control parameters indicated by the first target signaling is greater than the number of power control parameter sets included in the power control parameter configuration of the uplink channel resource, it may be agreed in the agreement to reuse at least one power control parameter set, or add other specific power control parameter set (such as a power control parameter set with a smallest identifier or a power control parameter set with an identifier of a specific value).

Optionally, when the first target signaling indicates a group of power control parameter sets, the terminal selects at least one power control parameter set from power control parameter sets in the indicated group of power control parameter sets, and uses default power control parameters in the at least one power control parameter set to determine the transmission power of the uplink channel resource.

When the first target signaling indicates a group of power control parameter sets, if the number of power control parameter sets included in the indicated group of power control parameter sets, is greater than the number of power control parameter sets used to determine the transmission power of the uplink channel resource, it may be agreed in the agreement that a power control parameter set with a smaller identifier or a default power control parameter set is preferable.

For example, if the first target signaling (MAC-CE or DCI) indicates a first group of power control parameter sets, the terminal selects a power control parameter set with a smallest identifier from the first group of power control parameter sets, and uses one or more default power control parameters in the one selected power control parameter set to determine the transmission power of the uplink channel resource.

When the first target signaling indicates a group of power control parameter sets, if the number of power control parameter sets included in the indicated group of power control parameter sets, is smaller than the number of power control parameter sets used to determine the transmission power of the uplink channel resource, it may be agreed in the agreement to reuse at least one power control parameter set, or add other specific power control parameter set (such as a power control parameter set with a smallest identifier or a power control parameter set with an identifier of a specific value).

The default power control parameter set may be configured by the network side, or may be specified in the agreement.

The default power control parameter set may be a power control parameter set with the smallest identifier, but is not limited thereto.

Step 1016: indicating at least one power control parameter set from a power control parameter set included in the power control parameter configuration of the uplink channel resource, by using the first target signaling; where power control parameters at first P positions or last P positions in the power control parameter sets indicated by the first target signaling are power control parameters used to determine the transmission power of the uplink channel resource, and P is an integer greater than or equal to 1, and the power control parameters are sorted according to sizes of values of identifiers or according to configuration sequence.

Optionally, when the first target signaling indicates identification information of power control parameter sets, the first target signaling indicates identification information of at least one power control parameter set from a power control parameter set included in the power control parameter configuration of the uplink channel resource. Then the terminal uses power control parameters at first P positions or last P positions in the indicated at least one power control parameter set to determine the transmission power of the uplink channel resource.

Optionally, when the first target signaling indicates the number of power control parameter sets, the terminal selects a corresponding number of power control parameter sets from power control parameter sets included in the power control parameter configuration of the uplink channel resource, and uses power control parameters at first P positions or last P positions in the corresponding number of power control parameter sets to determine the transmission power of the uplink channel resource.

If the number of power control parameter sets indicated by the first target signaling is smaller than the number of power control parameter sets included in the power control parameter configuration of the uplink channel resource, it may be agreed in the agreement that a power control parameter with a smaller identifier or a default power control parameter is preferable.

For example, in case that the first target signaling (MAC-CE or DCI) indicates that the number of power control parameter set is 1, the terminal selects one power control parameter set with the smallest identifier from the power control parameter sets included in the power control parameter configuration of the uplink channel resource, and uses first two power control parameters with smaller identifiers in the one selected power control parameter set (P is equal to 2, and power control parameters are sorted according to identifiers from small to large) to determine the transmission power of the uplink channel resource.

If the number of power control parameter sets indicated by the first target signaling is greater than the number of power control parameter sets included in the power control parameter configuration of the uplink channel resource, it may be agreed in the agreement to reuse at least one power control parameter set, or add other specific power control parameter set (such as a power control parameter set with a smallest identifier or a power control parameter set with an identifier of a specific value).

Optionally, when the first target signaling indicates a group of power control parameter sets, the terminal may select at least one power control parameter set from the indicated group of power control parameter sets, and use power control parameters at first P positions or last P positions in the at least one power control parameter set to determine the transmission power of the uplink channel resource.

When the first target signaling indicates the group of power control parameter sets, if the number of power control parameter sets included in the indicated group of power control parameter sets, is greater than the number of power control parameter sets used to determine the transmission power of the uplink channel resource, it may be agreed in the agreement that a power control parameter set with a smaller identifier or a default power control parameter is preferable.

For example, if the first target signaling (MAC-CE or DCI) indicates the first group of power control parameter sets, the terminal selects a power control parameter set with a smallest identifier in the first group of power control parameter sets, and uses a first power control parameter with a smallest identifier (P is equal to 1, and the power control parameters are sorted according to identifiers from small to large) in the one selected power control parameter set to determine the transmission power of the uplink channel resource.

When the first target signaling indicates the group of power control parameter sets, if the number of power control parameter sets included in the indicated group of power control parameter sets, is smaller than the number of power control parameter sets used to determine the transmission power of the uplink channel resource, it may be agreed in the agreement to reuse at least one power control parameter set, or add other specific power control parameter set (such as a power control parameter set with a smallest identifier or a power control parameter set with an identifier of a specific value).

Step 1017: indicating at least one power control parameter set from a default power control parameter set included in the power control parameter configuration of the uplink channel resource, by using the first target signaling; where default power control parameters in the at least one power control parameter set indicated by the first target signaling are power control parameters used to determine the transmission power of the uplink channel resource.

Optionally, when the first target signaling indicates identification information of power control parameter sets, the first target signaling indicates identification information of at least one power control parameter set from a default power control parameter set included in the power control parameter configuration of the uplink channel resource. Then the terminal uses default power control parameters in the at least one power control parameter set corresponding to the identification information to determine the transmission power of the uplink channel resource.

Optionally, when the first target signaling indicates the number of power control parameter sets, the terminal selects a corresponding number of power control parameter sets from default power control parameter sets included in the power control parameter configuration of the uplink channel resource, and uses default power control parameters in the corresponding number of power control parameter sets to determine the transmission power of the uplink channel resource.

If the number of power control parameter sets indicated by the first target signaling is smaller than the number of default power control parameter sets included in the power control parameter configuration of the uplink channel resource, it may be agreed in the agreement that a power control parameter set with a smaller identifier is preferable.

For example, in case that the first target signaling (MAC-CE or DCI) indicates that the number of power control parameter set is 1, the terminal selects one default power control parameter set with the smallest identifier from default power control parameter sets included in the power control parameter configuration of the uplink channel resource, and uses default power control parameters in the one selected default power control parameter set to determine the transmission power of the uplink channel resource.

If the number of power control parameter sets indicated by the first target signaling is greater than the number of power control parameter sets included in the power control parameter configuration of the uplink channel resource, it may be agreed in the agreement to reuse at least one power control parameter set, or add other specific power control parameter set (such as a power control parameter set with a smallest identifier or a power control parameter set with an identifier of a specific value).

Optionally, when the first target signaling indicates a group of power control parameter sets, the terminal may select at least one power control parameter set from default power control parameter sets in the indicated group of power control parameter sets, and use default power control parameters in the at least one power control parameter set to determine the transmission power of the uplink channel resource.

When the first target signaling indicates the group of power control parameter sets, if the number of default power control parameter sets included in the indicated group of power control parameter sets, is greater than the number of power control parameter sets used to determine the transmission power of the uplink channel resource, it may be agreed in the agreement that a power control parameter set with a smaller identifier is preferable.

For example, if the first target signaling (MAC-CE or DCI) indicates a first group of power control parameter sets, the terminal selects first two default power control parameter sets from default power control parameter sets which are sorted according to identifiers from small to large in the first group of power control parameter sets, and uses default power control parameters in the two power control parameter sets to determine the transmission power of the uplink channel resource.

When the first target signaling indicates the group of power control parameter sets, if the number of power control parameter sets included in the indicated group of power control parameter sets, is smaller than the number of power control parameter sets used to determine the transmission power of the uplink channel resource, it may be agreed in the agreement to reuse at least one power control parameter set, or add other specific power control parameter set (such as a power control parameter set with a smallest identifier or a power control parameter set with an identifier of a specific value).

Step 1018: indicating at least one power control parameter set from power control parameter sets at first Q positions or last Q positions in the power control parameter configuration of the uplink channel resource, by using the first target signaling; where default power control parameters, which are in the power control parameter sets indicated by the first target signaling, are power control parameters used to determine the transmission power of the uplink channel resource, and Q is an integer greater than or equal to 1, and the power control parameter sets are sorted according to sizes of values of identifiers or according to configuration sequence.

Optionally, when the first target signaling indicates identification information of the power control parameter sets, the first target signaling may indicate identification information of at least one power control parameter set from power control parameter sets at first Q positions or last Q positions in the power control parameter configuration of the uplink channel resource. The terminal uses default power control parameters in the at least one power control parameter set corresponding to the identification information to determine the transmission power of the uplink channel resource.

Optionally, when the first target signaling indicates the number of power control parameter sets, the terminal may select a corresponding number of power control parameter sets from the power control parameter sets at first Q positions or last Q positions in the power control parameter configuration of the uplink channel resource. Default power control parameters in the corresponding number of power control parameter sets are used to determine the transmission power of the uplink channel resource.

If the number of power control parameter sets indicated by the first target signaling is smaller than Q, it may be agreed in the agreement that a power control parameter set with a smaller identifier or a default power control parameter set is preferable.

For example, in case that the first target signaling (MAC-CE or DCI) indicates that the number of power control parameter sets is 1, the terminal selects one power control parameter set with a smallest identifier from the first four power control parameter sets (Q is equal to 4 and the power control parameter sets are sorted according to sizes of values of identifiers) included in the power control parameter configuration of the uplink channel resource, and uses default power control parameters in the selected one power control parameter set to determine the transmission power of the uplink channel resource.

If the number of power control parameter sets indicated by the first target signaling is greater than Q, it may be agreed in the agreement to reuse at least one power control parameter set, or add other specific power control parameter set (such as a power control parameter set with a smallest identifier or a power control parameter set with an identifier of a specific value).

Optionally, when the first target signaling indicates a group of power control parameter sets, the terminal may select at least one power control parameter set from the power control parameter sets at first Q positions or last Q positions in the power control parameter configuration of the uplink channel resource. Default power control parameters in the at least one power control parameter set are used to determine the transmission power of the uplink channel resource.

When the first target signaling indicates the group of power control parameter sets, if the number of power control parameter sets included in the indicated group of power control parameter sets, is greater than Q, it may be agreed in the agreement that a power control parameter set with a smaller identifier or a default power control parameter set is preferable.

For example, if the first target signaling (MAC-CE or DCI) indicates a first group of power control parameter sets, the terminal selects one power control parameter set with a smallest identifier from first two power control parameter sets (Q is equal to 2 and the power control parameter sets are sorted according to sizes of values of identifiers) included in the first group of power control parameter sets, and uses default power control parameters in the selected one power control parameter set to determine the transmission power of the uplink channel resource.

When the first target signaling indicates the group of power control parameter sets, if the number of power control parameter sets included in the indicated group of power control parameter sets, is smaller than Q, it may be agreed in the agreement to reuse at least one power control parameter set, or add other specific power control parameter set (such as a power control parameter set with a smallest identifier or a power control parameter set with an identifier of a specific value).

In the embodiments of the present disclosure, the power control parameter or the power control parameter set used to determine the transmission power of the uplink channel resource may be flexibly indicated through the above various indication ways.

In the embodiment of the present disclosure, when determining the transmission power of uplink channel resources under M-TRP, it is also necessary to provide corresponding relationship between repetitions of uplink channel resources and power control parameters or power control parameter sets. This corresponding relationship may be indicated by the network device, or may be specified in the agreement. The following describes how to provide the corresponding relationship between repetitions of uplink channel resources and power control parameters or power control parameter sets.

Optionally, a power control parameter used to determine a transmission power of a first repetition of the uplink channel resource is a first power control parameter, and the first power control parameter is a power control parameter determined based on first preset information.

Here, the terminal may determine the first power control parameter based on the first preset information, and use the first power control parameter to determine the transmission power of the first repetition of the uplink channel resource.

When the corresponding relationship between repetitions of uplink channel resources and power control parameters or power control parameter sets is specified in an agreement, it may be agreed in the agreement that the terminal determines the first power control parameter based on the first preset information. When the corresponding relationship between repetitions of uplink channel resources and power control parameters or power control parameter sets is indicated by the network device, if the network device indicates a corresponding relationship between groups of power control parameters and repetitions of uplink channel resources, or the network device indicates a corresponding relationship between repetitions of uplink channel resources and identification information and groups of power control parameter sets, it may also be agreed in the agreement that the terminal determines the first power control parameter based on the first preset information. The foregoing will be introduced hereinafter respectively.

When the corresponding relationship between repetitions of uplink channel resources and power control parameters or power control parameter sets is specified in an agreement, it includes but not limited to the following agreed manners.

Manner 2.1: in case that the network device indicates identification information of power control parameters through the first target signaling, it may be agreed in the agreement that based on first preset information, the terminal determines a first power control parameter in power control parameters corresponding to the identification information.

Manner 2.2: in case that the network device indicates the number of power control parameters through the first target signaling, after the terminal selects a corresponding number of power control parameters in the foregoing ways, it may be agreed in the agreement that based on first preset information, the terminal determines a first power control parameter in the corresponding number of power control parameters.

Manner 2.3: in case that the network device indicates a group of power control parameters through the first target signaling, it may be agreed in the agreement that based on first preset information, the terminal determines a first power control parameter in the indicated group of power control parameters.

Manner 2.4: in case that the network device indicates multiple groups of power control parameters through the first target signaling, it may be agreed in the agreement that based on first preset information, the terminal selects one group of power control parameters from the indicated multiple groups of power control parameters, and determines a first power control parameter in the selected one group of power control parameters based on first preset information, where the first preset information used twice may be the same or different indicators.

Manner 2.5: in case that the network device indicates identification information of one power control parameter set through the first target signaling, it may be agreed in the agreement that based on first preset information, the terminal selects at least one power control parameters in the one power control parameter set as a first power control parameter; or, it may be agreed in the agreement that the terminal uses all power control parameters in the one power control parameter set as the first power control parameter.

Manner 2.6: in case that the network device indicates identification information of multiple power control parameter sets through the first target signaling, it may be agreed in the agreement that based on first preset information, the terminal selects at least one power control parameter set from the multiple power control parameter sets, and continues to select, based on first preset information, at least one power control parameter from the at least one power control parameter set as the first power control parameter, where the first preset information used twice may be the same or different indicators; or, it may be agreed in the agreement that after the terminal selects at least one power control parameter set from the multiple power control parameter sets based on first preset information, the terminal uses all power control parameters in the at least one power control parameter set as the first power control parameter.

Manner 2.7: in case that the network device indicates the number of power control parameter sets is 1 through the first target signaling, after the terminal selects one power control parameter set according to the foregoing indication ways, it may be agreed in the agreement that based on first preset information, the terminal selects at least one power control parameters in the one power control parameter set as a first power control parameter; or, it may be agreed in the agreement that the terminal uses all power control parameters in the one power control parameter set as the first power control parameter.

Manner 2.8: in case that the network device indicates the number of power control parameter sets is multiple through the first target signaling, after the terminal selects multiple power control parameter sets according to the foregoing indication ways, it may be agreed in the agreement that based on first preset information, the terminal selects at least one power control parameter set from the multiple power control parameter sets, and continues to select, based on first preset information, at least one power control parameter from the at least one power control parameter set as the first power control parameter, where the first preset information used twice may be the same or different indicators; or, it may be agreed in the agreement that after the terminal selects at least one power control parameter set from the multiple power control parameter sets based on first preset information, the terminal uses all power control parameters in the at least one power control parameter set as the first power control parameter.

Manner 2.9: in case that the network device indicates a group of power control parameter sets through the first target signaling, it may be agreed in the agreement that based on first preset information, the terminal selects at least one power control parameter set from the group of power control parameter sets, and continues to select, based on first preset information, at least one power control parameter from the at least one power control parameter set as the first power control parameter, where the first preset information used twice may be the same or different indicators; or, it may be agreed in the agreement that the terminal selects at least one power control parameter set from the group of power control parameter sets based on first preset information, and uses all power control parameters in the at least one power control parameter set as the first power control parameter.

Manner 2.10: in case that the network device indicates multiple groups of power control parameter sets through the first target signaling, it may be agreed in the agreement that based on first preset information, the terminal selects one group of power control parameter sets from the multiple groups of power control parameter sets, and then continues to select, based on first preset information, at least one power control parameter set from the one group of power control parameter sets, and then continues to select, based on first preset information, at least one power control parameter in the at least one power control parameter set as the first power control parameter, where the first preset information used three times may be the same or different indicators; or, it may be agreed in the agreement that based on first preset information, the terminal selects one group of power control parameter sets from the multiple groups of power control parameter sets, then continues to select, based on first preset information, at least one power control parameter set in the one group of power control parameter sets, and then uses all power control parameters in the at least one power control parameter set as the first power control parameter, where the first preset information used twice may be the same or different indicators.

When the corresponding relationship between repetitions of uplink channel resources and power control parameters or power control parameter sets is indicated by the network device, it includes but not limited to the following agreed manners.

Manner 3.1: in case that the network device indicates a corresponding relationship between a group of power control parameters and a first repetition of an uplink channel resource, after the terminal determines a group of power control parameters corresponding to the first repetition according to the corresponding relationship, it may be agreed in the agreement that based on first preset information, the terminal selects at least one power control parameter from the group of power control parameters corresponding to the first repetition as the first power control parameter.

Manner 3.2: in case that the network device indicates a corresponding relationship between identification information of power control parameter sets and a first repetition of an uplink channel resource, after the terminal determines a power control parameter set corresponding to the first repetition according to the corresponding relationship, it may be agreed in the agreement that based on first preset information, the terminal selects at least one power control parameter from the power control parameter set corresponding to the first repetition, as the first power control parameter; or, it may be agreed in the agreement that the terminal uses all power control parameters in the power control parameter set corresponding to the first repetition as the first power control parameter.

Manner 3.3: in case that the network device indicates a corresponding relationship between a group of power control parameter sets and a first repetition of an uplink channel resource, after the terminal determines a group of power control parameter sets corresponding to the first repetition according to the corresponding relationship, it may be agreed in the agreement that based on first preset information, the terminal selects at least one power control parameter set from the group of power control parameter sets corresponding to the first repetition, and continues to select, based on first preset information, at least one power control parameter from the at least one power control parameter set as the first power control parameter, where the first preset information used twice may be the same or different indicators; or, it may be agreed in the agreement that based on first preset information, the terminal selects at least one power control parameter set from the group of power control parameter sets corresponding to the first repetition, and uses all power control parameters in the at least one power control parameter set as the first power control parameter.

In the embodiment of the present disclosure, the first power control parameter corresponding to the first repetition of the uplink channel resource may be determined through the above-mentioned various manners. Optionally, for other repetitions of the uplink channel resource, one repetition belonging to the same group as the first repetition can use the same power control parameters as the first repetition; one repetition that does not belong to the same group as the first repetition can use power control parameters different from those of the first repetition.

The first repetition of the uplink channel resource refers to an initial transmission repetition of the uplink channel resource.

In the embodiments of the present disclosure, the network device may indicate to the terminal, through the first target signaling or a second target signaling, the corresponding relationship between the power control parameter or the power control parameter set and the repetition of the uplink channel resource. Optionally, the method further includes any one of the following:

indicating through a second target signaling, information of a corresponding relationship between repetitions of the uplink channel resource and identification information or group of power control parameters;

indicating through a second target signaling, information of a corresponding relationship between repetitions of the uplink channel resource and identification information or group of power control parameter sets;

using the first target signaling to carry information of a corresponding relationship between repetitions of the uplink channel resource and identification information or group of power control parameters;

using the first target signaling to carry information of a corresponding relationship between repetitions of the uplink channel resource and identification information or group of power control parameter sets;

where the second target signaling is different from the first target signaling.

At this point, the network device may use the second target signaling to indicate information of a corresponding relationship between identification information or group of power control parameters or power control parameter sets and repetitions of the uplink channel resource; or the network device may also use the first target signaling to carry information of a corresponding relationship between identification information or group of power control parameters or power control parameter sets and repetitions of the uplink channel resource; and the terminal determines power control parameters corresponding to the repetition of the uplink channel resource, according to the information of the corresponding relationship between identification information or group of power control parameters or power control parameter sets and repetitions of the uplink channel resource indicated by the first target signaling or the second target signaling.

In case that the first target signaling or the second target signaling indicates information of a corresponding relationship between identification information of power control parameters and a first repetition of the uplink channel resource, the terminal can directly use the power control parameters corresponding to the identification information corresponding to the first repetition of the uplink channel resource as the first power control parameter for determining a transmission power of the uplink channel resource. For other repetitions, one repetition belonging to the same group as the first repetition can use the same power control parameters as the first repetition; one repetition that does not belong to the same group as the first repetition can use power control parameters different from those of the first repetition.

For example, the network device uses the first target signaling to indicate a power control parameter with an identifier (ID) of 3 and a power control parameter with an ID of 4, and uses the first target signaling to indicate information of a corresponding relationship between the power control parameter with the identifier of 3 and a first repetition of the uplink channel resource, the terminal uses the power control parameter with the ID of 3 to determine transmission power of the first repetition and repetitions belonging to the same group as the first repetition; and the terminal uses the power control parameter with the ID of 4 to determine transmission power of repetitions that do not belong to the same group as the first repetition.

Of course, the first target signaling or the second target signaling may also indicate information of a corresponding relationship between identification information of power control parameters and multiple repetitions of the uplink channel resource. When the corresponding relationship of multiple repetitions is indicated, each repetition uses power control parameters in the power control parameters corresponding to the identification information corresponding to the each repetition, to determine its transmission power.

When the first target signaling or the second target signaling indicates information of a corresponding relationship between a first repetition of the uplink channel resource and a group of power control parameters or identification information or group of power control parameter sets, a first power control parameter used for the first repetition of the uplink channel resource can be determined based on first preset information according to the above manners 3.1-3.3.

Of course, the first target signaling or the second target signaling may also simultaneously indicate information of corresponding relationship between multiple repetitions of the uplink channel resource and a group of power control parameters or identification information or group of power control parameter sets. When the corresponding relationship of multiple repetitions is indicated, each repetition uses its corresponding power control parameters or power control parameter sets, to determine its transmission power according to the above manners 3.1-3.3, which will not be repeated here.

As discussed above, the first target signaling may be MAC-CE or DCI.

The second target signaling may be downlink control information (DCI); and a transmit power control (TPC) field of DCI can be used to indicate information of a corresponding relationship between the repetition of the uplink channel resource and the identification information or group of power control parameters, or information of a corresponding relationship between the repetition of the uplink channel resource and the identification information or group of power control parameter sets.

At this point, the network device uses the TPC field in the DCI to indicate information of a corresponding relationship between the repetition of the uplink channel resource and the identification information or group of power control parameters, or information of a corresponding relationship between the repetition of the uplink channel resource and the identification information or group of power control parameter sets.

For example, the network device uses MAC-CE to indicate that the number of power control parameter sets of the uplink channel resource is 1, and uses TPC field in DCI to indicate that a power control parameter set corresponding to the repetition (which applies to all repetitions by default when no repetition is specified) of the uplink channel resource is a first power control parameter set (the first power control parameter set may be any one in power control parameter set configuration of the uplink channel resource, or the first power control parameter set is a first one of power control parameter sets arranged according to configuration sequence in the power control parameter set configuration of the uplink channel resource), and the terminal uses power control parameters in the first power control parameter set to determine a transmission power of the repetition of the uplink channel resource.

For another example, the network device uses MAC-CE to indicate that the number of power control parameter sets of the uplink channel resource is 2, and uses TPC field in DCI to indicate that a power control parameter set corresponding to the repetition (which applies to all repetitions by default when no repetition is specified) of the uplink channel resource is a first power control parameter set (the first power control parameter set may be any one in power control parameter set configuration of the uplink channel resource, or the first power control parameter set is a first one of power control parameter sets arranged according to configuration sequence in the power control parameter set configuration of the uplink channel resource); at this point, when the number of power control parameter sets indicated by the MAC-CE is different from the number of power control parameter sets indicated by the TPC field in the DCI, the terminal may determine an open-loop power control parameter (P0, path loss reference signal, closed-loop power control parameters, etc.) of the uplink channel resource according to the two power control parameter sets, and perform closed-loop power control adjustment, according to the first power control parameter set, on a repetition of the uplink channel resource corresponding to the first power control parameter set.

The first preset information in the embodiments of the present disclosure will be introduced hereinafter.

Optionally, the first preset information includes, but is not limited to, any one of a default power control parameter, a value of an identifier of a power control parameter, a size of a value of an identifier of a power control parameter, sorting of groups of power control parameters, an information field of a first target signaling, a sequence of power control parameters indicated by a first target signaling and a code sequence corresponding to power control parameters indicated by a first target signaling; and/or, a valid state of a power control parameter indicated by a first target signaling; and/or, the first preset information includes, but is not limited to, any one of a default power control parameter set, a value of an identifier of a power control parameter set, a size of a value of an identifier of a power control parameter set, sorting of groups of power control parameter sets, a sequence of power control parameter sets indicated by a first target signaling and a code sequence corresponding to power control parameter sets indicated by a first target signaling; and/or, a valid state of a power control parameter set indicated by a first target signaling.

The default power control parameter or power control parameter set may be configured by the network side, or may be specified in the agreement. The default power control parameter or power control parameter set may be a power control parameter or power control parameter set with the smallest identifier (ID).

At this point, the terminal may use the default power control parameter or power control parameter set as an indicator for selecting the first power control parameter.

For example, the network device indicates a first group of power control parameters through a first target signaling, and the terminal may select a default power control parameter in the first group of power control parameters as a first power control parameter used for the first repetition.

The value of the identifier (such as ID) itself represents a value defined by the identifier, while the size of the identifier represents the size compared with other identifiers. For example, for a power control parameter with an ID equal to 5, its value of the ID itself is 5; compared with a power control parameter with an ID equal to 0, the power control parameter with the ID equal to 5 has a larger identifier; and compared with a power control parameter with an ID equal to 7, the power control parameter with the ID equal to 5 has a smaller identifier.

Optionally, the first power control parameter includes any one of the following:

the first power control parameter is a power control parameter with an identifier whose value is a first preset value;

the first power control parameter is a power control parameter in a power control parameter set with an identifier whose value is a second preset value;

the first power control parameter is a power control parameter with an identifier whose value is of a size at a first preset level;

the first power control parameter is a power control parameter in a power control parameter set with an identifier whose value is of a size at a second preset level;

where the size of the value of the identifier at the first preset level or the size of the value of the identifier at the second preset level includes any one of the following: a size of a value of an identifier is the smallest, a size of a value of an identifier is the largest, a size of a value of an identifier is at an intermediate value, which are not limited thereto.

The first preset value and the second preset value may be set according to needs, and may be arbitrary values.

At this point, it may be agreed in the agreement that in the power control parameters or power control parameter sets indicated by the first target signaling, the terminal determines the first power control parameter used for the first repetition according to the value of the identifier (a power control parameter with an identifier whose value is a first preset value, or a power control parameter set with an identifier whose value is a second preset value) or sizes of values of identifiers (a power control parameter or power control parameter set with a smallest identifier, or with a largest identifier or with an identifier which is at an intermediate value).

For example, the network device uses the first target signaling to indicate a power control parameter with ID of 1 and a power control parameter with ID of 2; based on the sizes of values of identifiers, the terminal selects the power control parameter with the smallest ID, i.e., the power control parameter with ID of 1, as the first power control parameter used for the first repetition.

For another example, the network device uses the first target signaling to indicate that the number of power control parameters is 2; the terminal selects 2 power control parameters through the aforementioned method, and then, based on sizes of values of identifiers, the terminal selects one power control parameter with the smallest ID from the 2 power control parameters as the first power control parameter used for the first repetition.

For another example, the network device uses the first target signaling to indicate that a first group of power control parameters. The first group of power control parameters includes multiple power control parameters. Based on sizes of values of identifiers, the terminal selects one power control parameter with the smallest ID from the first group of power control parameters as the first power control parameter used for the first repetition.

For another example, the network device uses the first target signaling to indicate a power control parameter set with ID of 1 and a power control parameter set with ID of 2; and the terminal may use all power control parameters in the power control parameter set with ID of 1 as the first power control parameter used for the first repetition; or, the terminal may use a power control parameter with the smallest ID or a default power control parameter in the power control parameter set with ID of 1 as the first power control parameter used for the first repetition.

For another example, the network device uses the first target signaling to indicate that the number of power control parameter sets is 1, and the terminal may use power control parameters in a power control parameter set with a smallest ID as the first power control parameter used for the first repetition.

For another example, the network device uses the first target signaling to indicate a first group of power control parameter sets; and the terminal may use all power control parameters or default power control parameters in a power control parameter set with a smallest ID in the first group of power control parameter sets as the first power control parameter used for the first repetition.

Optionally, the first target signaling includes one or more information fields used to indicate power control parameters and/or power control parameter sets. At least part of the information fields are provided with indication information for indicating whether power control parameters and/or power control parameter sets corresponding to the information fields are valid.

For example, at least part of the information fields includes 1-bit indication information for indicating whether power control parameters and/or power control parameter sets corresponding to the information fields are valid. If indicating it is valid, power control parameters and/or power control parameter sets corresponding to the information field can be used to determine the transmission power of the uplink channel resource; if indicating it is invalid, power control parameters and/or power control parameter sets corresponding to the information field are not used to determine the transmission power of the uplink channel resource.

As mentioned above, the first target signaling may be MAC-CE or DCI. Optionally, the MAC-CE is MAC-CE signaling used to indicate spatial relation information SpatialRelationInfo of the uplink channel resource. The MAC-CE includes information of whether a spatial reference signal indicated by the spatial relation information SpatialRelationInfo is invalid. The spatial reference signal is a reference signal for determining a spatial filter coefficient of an uplink channel resource. When indicating that the spatial reference signal indicated by SpatialRelationInfo is invalid, the terminal does not use the spatial reference signal indicated by SpatialRelationInfo to determine the spatial filter coefficient of the uplink channel resource.

Optionally, the first target signaling is DCI and includes 1 bit which is used to indicate whether the uplink channel resource is associated with one group of power control parameters or associated with two groups of power control parameters.

Optionally, the first target signaling is DCI and includes 1 bit which is used to indicate whether the uplink channel resource is associated with one group of power control parameter sets or associated with two groups of power control parameter sets.

Optionally, the first target signaling is DCI and includes 2 bits which are used to indicate whether the uplink channel resource is associated with one group of power control parameters or associated with two groups of power control parameters, and to simultaneously indicate which group of power control parameters is associated with the first repetition in case of indicating that the uplink channel resource is associated with one group of power control parameters.

Optionally, the first target signaling is DCI and includes 1 bit which is used to indicate whether the uplink channel resource is associated with one group of power control parameter sets or associated with two groups of power control parameter sets, and to simultaneously indicate which group of power control parameters is associated with the first repetition in case of indicating that the uplink channel resource is associated with one group of power control parameter sets.

Optionally, the first power control parameter is a power control parameter indicated by an information field at a first preset position according to sequence of multiple information fields for indicating power control parameters in the first target signaling; or, the first power control parameter is a power control parameter in a power control parameter set indicated by an information field at a second preset position according to sequence of multiple information fields for indicating power control parameter sets in the first target signaling;

where the information field at the first preset position or the information field at the second preset position includes any one of the following: a first information field, a last information field, and an information field at a middle position, which are not limited to thereto.

For example, the network device uses 4 information fields to indicate 4 power control parameters; based on the sequence of information fields, the terminal may select a power control parameter indicated by the first information field as a first power control parameter; or, based on the sequence of information fields and valid states of the power control parameters, the terminal selects a power control parameter indicated by a first information field when valid power control parameters are arranged in the order of the information fields.

The sequence of the power control parameters/power control parameter sets indicated by the first target signaling means a sequence of simultaneously indicating multiple power control parameters/power control parameter sets when the first target signaling indicates multiple power control parameters/power control parameter sets.

Optionally, the first power control parameter is a power control parameter at a fifth preset position in power control parameters indicated by the first target signaling; or, the first power control parameter is a power control parameter in a power control parameter set at a sixth preset position in power control parameters indicated by the first target signaling;

where the fifth preset position or the sixth preset position includes any one of the following: a first position, a last position, and a position in the middle, which are not limited thereto.

For example, the first target signaling indicates a power control parameter with ID of 1 and a power control parameter with ID of 2; meanwhile, the power control parameter with ID of 1 is ranked first and the power control parameter with ID of 2 is ranked last (or, the power control parameter with ID of 2 is ranked first and the power control parameter with ID of 1 is ranked last), the terminal may use the power control parameter whose ID is at a first position as the first power control parameter; or, based on the sequence of power control parameters and valid states of the power control parameters, the terminal selects a first valid power control parameter from indicated power control parameters as the first power control parameter.

Optionally, the first target signaling includes an information field used to indicate power control parameters and/or power control parameter sets, where the information field is greater than or equal to $\lceil \log_2(2^K-1) \rceil$ bit, and K is the number of power control parameters or power control parameter sets indicated by the first target signaling.

Optionally, the first target signaling includes an information field used to indicate power control parameters and/or power control parameter sets. The information field also indicates a sequence of the power control parameters and/or the power control parameter sets. The information field is greater than or equal to $$\left\lceil \log_2\left(\sum_{k=1}^{K} A_K^k\right) \right\rceil$$

bit, and K is the number of power control parameters or power control parameter sets indicated by the first target signaling, and $$A_K^k$$

represents the number of permutations and combination for selecting k numbers from K numbers.

A code sequence corresponding to power control parameters/power control parameter sets indicated by the first target signaling means a code bit sequence of the power control parameters/power control parameter sets indicated by the first target signaling. The terminal may use power control parameters/power control parameter sets corresponding to a specific bit to determine the first power control parameter.

Optionally, the first power control parameter is a power control parameter corresponding to a code at a seventh preset position in a code sequence corresponding to the power control parameters indicated by the first target signaling; or, the first power control parameter is a power control parameter corresponding to a code at an eighth preset position in a code sequence corresponding to the power control parameter sets indicated by the first target signaling;

where the seventh preset position or the eighth preset position includes any one of the following: most significant bit (MSB) and least significant bit (LSB), which are not limited thereto.

For example, in a code sequence corresponding to power control parameter sets indicated by the first target signaling, the most significant bit is corresponding to a power control parameter with an ID of 2, and the terminal may use the power control parameter with then ID of 2 as the first power control parameter.

The valid state of the power control parameter/power control parameter set indicated by the first target signaling refers to a valid state determined by the indication information, which is in the information field of the first target signaling and is used for indicating whether power control parameters and/or power control parameter sets corresponding to the information field are valid; or, a valid state directly indicated by the first target signaling. The valid state of the power control parameter/power control parameter set indicated by the first target signaling may be judged in combination with any of indicators mentioned above.

Optionally, the first power control parameter is a power control parameter at a third preset position according to sequence of valid power control parameters indicated by the first target signaling; or, the first power control parameter is a power control parameter in a power control parameter set at a fourth preset position according to sequence of valid power control parameter sets indicated by the first target signaling;

where the third preset position or the fourth preset position includes any one of the following: a first valid position, a last valid position, and a middle valid position, which are not limited thereto.

For example, the first target signaling indicates a power control parameter with an ID of 1 and a power control parameter with an ID of 2, and meanwhile, indicates that the power control parameter with then ID of 1 is invalid and the power control parameter with the ID 2 of is valid; then, the terminal can use a first valid power control parameter, i.e., the power control parameter with the ID of 2, as the first power control parameter.

The sorting of groups of power control parameters means that multiple groups of power control parameters are sorted according to specific rules (such as group number sizes); and the sorting of groups of power control parameter sets means that multiple groups of power control parameter sets are sorted according to specific rules (such as group number sizes). The terminal may determine the first power control parameter based on the sorting of groups of power control parameters or power control parameter sets in combination with any of the aforementioned indicators; or, the terminal may determine the first power control parameter only based on the sorting of groups of power control parameters or power control parameter sets.

Optionally, the first power control parameter is a power control parameter in a group at a ninth preset position according to sequence of multiple groups of power control parameters of the uplink channel resource; or, the first power control parameter is a power control parameter in a group of power control parameter set at a tenth preset position according to sequence of multiple groups of power control parameter sets of the uplink channel resource;

where the group at a ninth preset position or the group at a tenth preset position includes any one of the following: a first group, a last group, and a group in a middle position, which are not limited thereto.

For example, the first target signaling indicates a first group of power control parameters and a second group of power control parameters; the terminal may select the first group of power control parameters based on the sorting of groups of power control parameters, and select, based on sizes of values of identifiers, a power control parameter with a smallest identifier from the first group of power control parameters as the first power control parameter used for the first repetition.

In the embodiments of the present disclosure, the terminal may determine a first power control parameter based on any one of the following: a default power control parameter or power control parameter set, a value of an identifier of a power control parameter or power control parameter set, sizes of values of identifiers, information field of a first target signaling, a sequence of power control parameters or power control parameter sets indicated by a first target signaling and a code sequence corresponding to power control parameters or power control parameter sets indicated by a first target signaling; or, the terminal may determine a first power control parameter based on a valid state of a power control parameter or power control parameter set indicated by a first target signaling; or, the terminal may determine a first power control parameter based on sorting of multiple groups of power control parameters or groups of power control parameter sets indicated by a first target signaling; or, the terminal may determine a first power control parameter based on combination of multiple ones of the above parameters. The ways for determining the first power control parameter are flexible and highly operable.

Optionally, the power control parameter indication information indicates multiple types of power control parameters, or, the power control parameter set indicated by the power control parameter set indication information is a power control parameter set including multiple types of power control parameters. The first power control parameters, which are corresponding to different types of power control parameters, are determined by using the same or different first preset information.

At this point, in case that the first target signaling indicates multiple types of power control parameters, or indicates a power control parameter set including multiple types of power control parameters, first power control parameters corresponding to different types of power control parameters may be determined by using the same or different first preset information.

For example, the first target signaling indicates two reference signals including P0 and path loss reference signal. P0 can use sizes of values of identifiers to determine power control parameters used for the first repetition of the uplink channel resource. The path loss reference signal can use the value of the identifier to determine power control parameters used for the first repetition of the uplink channel resource.

Optionally, the network device uses other signaling to indicate closed-loop power control parameters.

Optionally, the method further includes:

configuring at least one group of common power control parameters applicable to all dedicated uplink channel resources; or, configuring at least one group of common power control parameters applicable to all dedicated uplink channel resources, and configuring, for the uplink channel resources, at least one group of dedicated power control parameters dedicated to the uplink channel resources.

Here, the network device may configure at least one group of power control parameters for the uplink channel resources through RRC signaling. One possible configuration mode is that the network device configures multiple groups of power control parameters in a dedicated uplink channel resource configuration, and the configured power control parameters are applicable to all dedicated uplink channel resources. Another possible configuration mode is that the network device configures one group of uplink channel resource power control parameters in a dedicated uplink channel resource configuration, and the configured power control parameters are applicable to all dedicated uplink channel resources; and the network device configures at least one group of power control parameters in uplink channel resource configuration information, and the power control parameters are applicable to uplink channel resources that are only available for scheduling.

Optionally, when configuring at least one group of common power control parameters and configuring at least one group of dedicated power control parameters, the foregoing step 101 includes:

using the first target signaling to indicate information for determining the transmission power of the uplink channel resource from the common power control parameters and the dedicated power control parameters.

At this point, for an uplink channel resource, if the network device does not configure a dedicated power control parameter for the uplink channel resource, the common power control parameter is used to determine the transmission power of the uplink channel resource. For an uplink channel resource, if the network device configures a dedicated power control parameter for the uplink channel resource, the common power control parameter and dedicated power control parameter are used jointly to determine the transmission power of the uplink channel resource.

Optionally, one uplink channel resource is configured with multiple repetitions, some of the repetitions use common power control parameters to determine their transmission powers; and the rest of the repetitions use dedicated power control parameters to determine their transmission powers.

Optionally, each group of power control parameters configured by the RRC signaling includes at least one power control parameter. A power control parameter with the smallest ID in each group of power control parameters is a default power control parameter.

Optionally, the power control parameters include but are not limited to at least one of the following: P0, a path loss reference signal, and a closed-loop parameter (closeloopIndex).

Optionally, before transmitting the first target signaling to the terminal, the method further includes:

using the first target signaling to carry identifiers of one or more uplink channel resources, where the information used for determining the transmission power of the uplink channel resource indicated in the first target signaling is applicable to any uplink channel resource whose identifier is carried in the first target signaling.

At this point, the network device may simultaneously indicate power control parameters or power control parameter sets available for multiple uplink channel resources.

In addition to using MAC-CE/DCI to configure power control parameters or power control parameter sets used to determine the transmission power of uplink channel resources, optionally, the network device may also use RRC signaling to independently indicate for each uplink channel resource, an association relationship between the uplink channel resource and power control parameters or power control parameter sets, which, for example, is indicated in PUCCH-resource.

Optionally, before the foregoing step 101, the method further includes: grouping uplink channel resources of the terminal.

The foregoing step 101 includes:

for any group of uplink channel resources, indicating information used for determining transmission power of the uplink channel resources from power control configuration pre-configured for the group of uplink channel resources, by using the first target signaling.

Here, the network device may divide the uplink channel resources into some groups, and indicate for each group respectively, an association relationship between the uplink channel resource group and the power control parameters or power control parameter sets, and the association relationship is available for all uplink channel resources in the uplink channel resource group. The specific way may refer to the ways described above, where the "group of uplink channel resources" is replaced with "uplink channel resource group".

Embodiments of the present disclosure are applicable to PUCCH and PUSCH, but are not limited thereto.

Optionally, the uplink channel resource is an uplink shared channel (PUSCH) resource, and the first repetition is a nominal repetition with an earliest transmission moment.

Here, when PUSCH repetition type is Type B, the repetition is a nominal repetition.

Optionally, the uplink channel resource is an uplink control channel (PUCCH) resource, and the first repetition is an actual repetition with an earliest transmission moment, or the first repetition is a repetition opportunity with an earliest transmission moment.

Here, for repetition opportunities of the uplink channel resources, if some repetition opportunities of the uplink channel resources cannot be transmitted due to conflict with DL symbols, some repetition opportunities of the uplink channel resources are discarded.

Optionally, this embodiment of the present disclosure may be used when the network device does not configure spatial relation information (that is, PUCCH-SpatialRelationInfo) for the terminal but configures pathlossReferenceRS.

Optionally, when the network device does not configure pathlossReferenceRS for the terminal, the terminal can use a reference signal obtained through an SS/PBCH block with the same index number as an SS/PBCH block through which the terminal obtains MIB, as a path loss reference signal for all repetitions of uplink channel resources.

Optionally, before the terminal is configured with power control parameters, the terminal uses a reference signal obtained through an SS/PBCH block with the same index number as an SS/PBCH block through which the terminal obtains MIB, as a path loss reference signal for all repetitions of uplink channel resources.

In the embodiments of the present disclosure, for uplink channel resources dedicated to the terminal and cell-common uplink channel resources, there is slight difference.

When the uplink channel resource is configured as an uplink channel resource dedicated to the terminal, the power control parameters may include P0, a path loss reference signal parameter, and a closed-loop parameter.

When the uplink channel resource is configured as a cell-common uplink channel resource, the power control parameters may include P0.

Taking PUCCH as an example (applicable to PUSCH as well), two specific application examples of the embodiments of the present disclosure are illustrated hereinafter.

Application Example 1

S1: the network device configures a group of power control parameters for PUCCH resources through RRC signaling.

Here, one possible configuration manner is that a base station configures a group of PUCCH power control parameters in a dedicated PUCCH configuration, and the configured power control parameters are applicable to all dedicated PUCCH resources. One group of PUCCH power control parameters may include one or more PUCCH power control parameters.

Optionally, the configured power control parameters include but are not limited to at least one of the following: P0, a path loss reference signal, and a closed-loop parameter (closeloopIndex). When configuring multiple power control parameters, in this embodiment, these multiple power control parameters may be packaged into one power control parameter set.

Optionally, when power control parameters are sorted according to sizes of ID, at least one power control parameter ranked first are default power control parameters. For example, the first two power control parameters with smaller IDs are default power control parameters.

S2: the network device uses MAC-CE/DCI to indicate to the terminal, a power control parameter of a PUCCH resource, from power control parameters configured by RRC signaling.

Optionally, the MAC-CE/DCI may indicate a power control parameter used to calculate a transmission power of the PUCCH resource from multiple default power control parameters in the configured power control parameters.

Optionally, the MAC-CE/DCI may indicate a power control parameter used to calculate a transmission power of the PUCCH resource from at least one power control parameter ranked first among the configured power control parameters which are sorted according to ID sizes.

Optionally, the MAC-CE/DCI may use multiple information fields to indicate multiple power control parameters. The first power control parameter is a power control parameter indicated by a first information field.

For example, the MAC-CE/DCI includes multiple information fields, and at least part of the information fields includes 1-bit for indicating whether a default power control parameter corresponding to the information field is valid. If indicating it is valid, the power control parameter corresponding to the information field is used to determine the transmission power of PUCCH; if indicating it is invalid, the power control parameter corresponding to the information field is not used to determine the transmission power of the PUCCH. At this point, the first power control parameter may be a first valid power control parameter indicated by the MAC-CE.

Optionally, the MAC-CE is MAC-CE signaling used to indicate spatial relation information SpatialRelationInfo of the PUCCH resource. The MAC-CE includes information of whether a spatial reference signal indicated by the spatial relation information SpatialRelationInfo is invalid. The spatial reference signal is a reference signal for determining a spatial filter coefficient of the PUCCH resource. When indicating that the spatial reference signal indicated by SpatialRelationInfo is invalid, the terminal does not use the spatial reference signal indicated by SpatialRelationInfo to determine the spatial filter coefficient of the PUCCH resource. Optionally, the MAC-CE includes multiple SpatialRelationInfo indication fields, and at least part of the information fields includes 1-bit for indicating whether a power control parameter corresponding to the information field is valid. If indicating it is valid, the power control parameter is used to determine the transmission power of PUCCH; if indicating it is invalid, the power control parameter is not used to determine the transmission power of the PUCCH. At this point, optionally, the first power control parameter may be a first valid power control parameter indicated by the MAC-CE.

Optionally, the MAC-CE/DCI may indicate power control parameters corresponding to the PUCCH resource by indicating the number of power control parameters corresponding to the PUCCH resource.

For example, in case that the MAC-CE/DCI indicates that the number of power control parameters corresponding to PUCCH is 1, the terminal uses a power control parameter with the smallest ID or a default power control parameter to determine a transmission power of PUCCH. In case that MAC-CE/DCI indicates that the number of power control parameters corresponding to PUCCH is 2, the terminal uses two power control parameters with the smallest IDs or two default power control parameters to determine the transmission power of the PUCCH. Optionally, the first power control parameter is the power control parameter with the smallest ID.

For another example, in case that the MAC-CE/DCI indicates that the number of power control parameters corresponding to the PUCCH is 1, the terminal uses a power control parameter with the smallest ID in a first group of power control parameters configured by RRC, to determine the transmission power of the PUCCH. In case that the MAC-CE/DCI indicates that the number of power control parameters corresponding to the PUCCH is 2, the terminal uses a power control parameter with the smallest ID in each of two groups of power control parameters configured by RRC, to determine the transmission power of the PUCCH.

Optionally, the MAC-CE/DCI may include indication information of corresponding relationship between PUCCH resource repetitions and power control parameters. For example, the MAC-CE includes an information field for indicating the corresponding relationship.

Optionally, the first target signaling is DCI and includes 1 bit which is used to indicate whether the uplink channel resource is associated with one group of power control parameters or associated with two groups of power control parameters.

Optionally, the first target signaling is DCI and includes 1 bit which is used to indicate whether the uplink channel resource is associated with one group of power control parameter sets or associated with two groups of power control parameter sets.

Optionally, the first target signaling is DCI and includes 2 bits which are used to indicate whether the uplink channel resource is associated with one group of power control parameters or associated with two groups of power control parameters, and to simultaneously indicate which group of power control parameters is associated with the first repetition in case of indicating that the uplink channel resource is associated with one group of power control parameters.

Optionally, the first target signaling is DCI and includes 1 bit which is used to indicate whether the uplink channel resource is associated with one group of power control parameter sets or associated with two groups of power control parameter sets, and to simultaneously indicate which group of power control parameters is associated with the first repetition in case of indicating that the uplink channel resource is associated with one group of power control parameter sets.

S3: the terminal receives the DCI and determines that the PUCCH needs to be transmitted.

S4: the terminal determines a transmission power of the PUCCH resource according to the power control parameters indicated by the MAC-CE/DCI, and uses the first power control parameter indicated by the MAC-CE/DCI to determine a transmission power of a first repetition of the PUCCH resource.

Optionally, when the MAC-CE/DCI indicates IDs of multiple power control parameters, the terminal may determine the first power control parameter according to orders of the IDs. The terminal may also determine the first power control parameter according to a code sequence corresponding to the information field of the MAC-CE for indicating the power control parameters; or the terminal may determine the first power control parameter from valid power control parameters indicated by the MAC-CE; or the terminal may determine the first power control parameter according to IDs of the power control parameters.

Application Example 2

S1: the network device configures multiple groups of power control parameters for PUCCH resources through RRC signaling.

Here, one possible configuration manner is that the network device configures multiple groups of PUCCH power control parameters in a dedicated PUCCH configuration, and the configured power control parameters are applicable to all dedicated PUCCH resources.

Another possible configuration manner is that the network device configures one group of PUCCH power control parameters in dedicated PUCCH configuration, and the configured power control parameters are applicable to all dedicated PUCCH resources. The network device configures at least one group of PUCCH power control parameters in PUCCH resource configuration information, and the power control parameters are applicable only to the PUCCH resource.

Optionally, for a PUCCH resource, if the network device does not configure a dedicated power control parameter for the PUCCH resource, the common power control parameter is used to determine the transmission power of the uplink channel resource. If the network device configures a dedicated power control parameter for the PUCCH resource, the common power control parameter and dedicated power control parameter are used jointly to determine the transmission power of the PUCCH resource. Optionally, one PUCCH resource is configured with multiple repetitions, some of the repetitions use common power control parameters to determine their transmission powers; and the rest of the repetitions use dedicated power control parameters to determine their transmission powers.

Optionally, one group of PUCCH power control parameters may include one or more PUCCH power control parameters.

Optionally, the configured power control parameters include but are not limited to at least one of the following: P0, a path loss reference signal, and a closed-loop parameter (closeloopIndex). When configuring multiple power control parameters, in this embodiment, these multiple power control parameters may be packaged into one power control parameter set.

Optionally, each group of power control parameters configured by the RRC signaling includes at least one power control parameter. A power control parameter with the smallest ID in each group of power control parameters is a default power control parameter.

Optionally, the first target signaling is DCI and includes 1 bit which is used to indicate whether the uplink channel resource is associated with one group of power control parameters or associated with two groups of power control parameters.

Optionally, the first target signaling is DCI and includes 1 bit which is used to indicate whether the uplink channel resource is associated with one group of power control parameter sets or associated with two groups of power control parameter sets.

Optionally, the first target signaling is DCI and includes 2 bits which are used to indicate whether the uplink channel resource is associated with one group of power control parameters or associated with two groups of power control parameters, and to simultaneously indicate which group of power control parameters is associated with the first repetition in case of indicating that the uplink channel resource is associated with one group of power control parameters.

Optionally, the first target signaling is DCI and includes 1 bit which is used to indicate whether the uplink channel resource is associated with one group of power control parameter sets or associated with two groups of power control parameter sets, and to simultaneously indicate which group of power control parameters is associated with the first repetition in case of indicating that the uplink channel resource is associated with one group of power control parameter sets.

S2: the network device uses MAC-CE/DCI to indicate to the terminal, a power control parameter of a PUCCH resource, from power control parameters configured by RRC signaling.

This step includes all schemes of the application example 1. In addition to this, this step includes the following schemes.

Optionally, the MAC-CE may indicate a group in which a power control parameter used to calculate the transmission power of the PUCCH resource is located; and the terminal uses a power control parameter with the smallest ID in the group indicated by the MAC-CE to determine the transmission power of the PUCCH, and a power control parameter with the smallest ID in a first group is used to determine a transmission power of a first repetition of the PUCCH.

Optionally, the MAC-CE may also indicate a group in which a power control parameter used to calculate the transmission power of the PUCCH resource is located; and the terminal uses a default power control parameter in the group indicated by the MAC-CE to determine the transmission power of the PUCCH, and a default power control parameter in a first group is used to determine a transmission power of a first repetition of the PUCCH.

Optionally, the MAC-CE may also indicate power control parameters corresponding to the PUCCH resource by indicating the number of the power control parameters corresponding to the PUCCH resource.

For example, in case that the MAC-CE indicates that the number of power control parameters corresponding to PUCCH is 1, the terminal uses a power control parameter with the smallest ID or a default power control parameter in a preset group (such as a first group, or power control parameters configured in dedicated PUCCH parameters) to determine the transmission power of the PUCCH. In case that the MAC-CE indicates that the number of power control parameters corresponding to PUCCH is 2, the terminal uses a power control parameter with the smallest ID or a default power control parameter in each of two groups of power control parameters, to determine the transmission power of the PUCCH. Optionally, the first power control parameter is a power control parameter with the smallest ID.

For example 1, the information field of MAC-CE for indicating power control parameters includes 2 bits of information, and groups of power control parameters and power control parameters indicated by each state are shown in Table 1 or Table 2.

TABLE 1

| coding status | power control parameters corresponding to PUCCH resource |
|---|---|
| 00 | first group of power control parameters |
| 01 | second group of power control parameters |
| 10 | first group of power control parameters and second group of power control parameters |
| 11 | reserved status |

TABLE 2

| coding status | power control parameters corresponding to PUCCH resource |
|---|---|
| 00 | power control parameters corresponding to SS/PBCH block through which the terminal obtains MIB |
| 01 | first group of power control parameters |
| 10 | second group of power control parameters |
| 11 | first group of power control parameters and second group of power control parameters |

Optionally, the terminal determines the transmission power of the PUCCH according to P0 with the smallest ID, a path loss reference signal with the smallest ID, and a closed-loop indexed 0 in each of groups of power control parameters indicated by the MAC-CE signaling.

Taking the table 1 as an example, if a status 00 is received, the terminal determines the transmission power of the PUCCH (or the transmission power of the first repetition of PUCCH) according to P0 with the smallest ID, a path loss reference signal with the smallest ID, and a closed-loop indexed 0 in the first group of power control parameters. If the terminal does not receive spatial relation parameter indication of PUCCH resources but receives the above MAC-CE, when the above MAC-CE signaling indicates two groups of power control parameters, the terminal uses P0 with the smallest ID, a path loss reference signal with the smallest ID and a closed-loop indexed 0 in each of two groups of power control parameters to jointly determine the transmission power of the PUCCH. Taking the table 1 as an example, if a status 10 is received, the terminal determines transmission powers of a first repetition of PUCCH and repetitions of a group where the first transmission copy belongs to, according to P0 with the smallest ID, a path loss reference signal with the smallest ID, and a closed-loop indexed 0 in the first group of power control parameters; and the terminal determines transmission powers of other repetitions of PUCCH according to P0 with the smallest ID, a path loss reference signal with the smallest ID, and a closed-loop indexed 0 in the second group of power control parameters.

Optionally, the MAC-CE may include information for indicating corresponding relationship between the first repetition of the PUCCH resource and groups of power control parameters configured by the RRC signaling.

Optionally, the MAC-CE may include information for indicating groups of multiple groups of power control parameters configured by the network device for the PUCCH resource through RRC signaling, and information of corresponding relationship between repetitions of the PUCCH resource and the multiple groups of power control parameters. The two pieces of information may be indicated independently by two parameters, or jointly indicated by the same parameter. For example, it is assumed that an information field of MAC-CE for indicating PUCCH resource power control parameters is 2-bit information, and groups of power control parameters and corresponding relationship between repetitions of the PUCCH resource and the multiple groups of power control parameters indicated by each state are shown in the following tables.

TABLE 3

| coding status | power control parameters corresponding to repetitions of PUCCH resource |
|---|---|
| 00 | first group of power control parameters |
| 01 | second group of power control parameters |
| 10 | first group of power control parameters and second group of power control parameters; first repetition of the PUCCH resource is corresponding to a first group of power control parameters |
| 11 | first group of power control parameters and second group of power control parameters; first repetition of the PUCCH resource is corresponding to a second group of power control parameters |

Optionally, the terminal may determine a transmission power of each repetition of the PUCCH resource according to power control parameters corresponding to a group corresponding to group indication information in the MAC-CE and corresponding relationship between repetitions of the PUCCH resource and the multiple groups of power control parameters. In the example shown in the table 3, if a status 10 is received, the terminal determines transmission powers of repetitions (for example, pointing to TRP 1) of a group which the first repetition of the PUCCH resource belongs to, according to P0 with the smallest ID, a path loss reference signal with the smallest ID, and a closed-loop indexed 0 in the first group of power control parameters. The terminal determines transmission powers of repetitions (for example, pointing to TRP 2) of the PUCCH resource that are not in the same group as the first repetition, according to P0 with the smallest ID, a path loss reference signal with the smallest ID, and a closed-loop indexed 0 in the second group of power control parameters.

Optionally, the MAC-CE signaling includes identifiers of multiple PUCCH resources and a piece of power control parameter related information (the information in the above table), then the power control parameter related information is applicable to all PUCCH resources indicated by the MAC-CE signaling.

In addition to using the MAC-CE to configure the association relationship between the PUCCH resource and the power control parameters, optionally, the network device may also use RRC signaling to independently indicate for each PUCCH resource, an association relationship between the PUCCH resource and power control parameters, which, for example, is indicated in PUCCH-resource.

Optionally, the network device may divide the PUCCH resources into some groups, and indicate for each group respectively, an association relationship between the PUCCH resource group and the power control parameters, and the association relationship is available for all PUCCH resource in the PUCCH resource group. The specific way may refer to the ways described above, where the “PUCCH resource” is replaced with “PUCCH resource group”.

S3: the terminal receives the DCI and determines that the PUCCH needs to be transmitted.

S4: the terminal determines a transmission power of the PUCCH resource according to the power control parameters indicated by the MAC-CE/DCI, and uses the first power control parameter indicated by the MAC-CE/DCI to determine a transmission power of a first repetition of the PUCCH resource.

The content is similar to the application example 1.

This step includes all schemes of the application example 1. In addition to this, this step includes the following schemes.

Optionally, when multiple groups of power control parameters are configured in the RRC signaling, the terminal determines the first power control parameter according to the groups of power control parameters.

Application Example 3

S1: the network device configures a group of power control parameter sets for PUCCH resources through RRC signaling.

Here, one possible configuration manner is that a base station configures a group of PUCCH power control parameter sets in a dedicated PUCCH configuration, and the configured power control parameter sets are applicable to all dedicated PUCCH resources. One group of PUCCH power control parameter sets may include one or more PUCCH power control parameters.

Optionally, power control parameters in the configured power control parameter sets include but are not limited to at least one of the following: P0, a path loss reference signal, and a closed-loop parameter (closeloopIndex).

Optionally, when power control parameter sets are sorted according to sizes of ID, at least one power control parameter set ranked first are default power control parameter sets.

Optionally, power control parameters in the power control parameter set are sorted according to sizes of ID, at least one power control parameter ranked first are default power control parameters. For example, the first two power control parameters with smaller IDs are default power control parameters.

S2: the network device uses MAC-CE/DCI to indicate to the terminal, a power control parameter of a PUCCH resource, from power control parameter sets configured by RRC signaling, or the network device uses MAC-CE/DCI to indicate to the terminal, a power control parameter set of a PUCCH resource, from power control parameter sets configured by RRC signaling.

Optionally, the MAC-CE/DCI may indicate power control parameters used to calculate a transmission power of the PUCCH resource from default power control parameters in power control parameter seta included in the power control parameter configuration.

Optionally, the MAC-CE/DCI may indicate power control parameters used to calculate a transmission power of the PUCCH resource from multiple power control parameters ranked first when power control parameters included in the power control parameter configuration are sorted according to sizes of IDs.

Optionally, the MAC-CE/DCI uses multiple information fields to indicate multiple power control parameters from power control parameter sets included in the power control parameter configuration, and the first power control parameter is a power control parameter indicated by the first information field.

For example, the MAC-CE/DCI includes multiple information fields, and at least part of the information fields includes 1-bit for indicating whether a default power control parameter corresponding to the information field is valid. If indicating it is valid, the power control parameter corresponding to the information field is used to determine the transmission power of PUCCH; if indicating it is invalid, the power control parameter corresponding to the information field is not used to determine the transmission power of the PUCCH. At this point, the first power control parameter may be a first valid power control parameter indicated by the MAC-CE.

Optionally, the MAC-CE is MAC-CE signaling used to indicate spatial relation information SpatialRelationInfo of the PUCCH resource. The MAC-CE includes information of whether a spatial reference signal indicated by the spatial relation information SpatialRelationInfo is invalid. The spatial reference signal is a reference signal for determining a spatial filter coefficient of the PUCCH resource. When indicating that the spatial reference signal indicated by SpatialRelationInfo is invalid, the terminal does not use the spatial reference signal indicated by SpatialRelationInfo to determine the spatial filter coefficient of the PUCCH resource. Optionally, the MAC-CE includes multiple SpatialRelationInfo indication fields, and at least part of the information fields includes 1-bit for indicating whether a power control parameter corresponding to the information field is valid. If indicating it is valid, the power control parameter is used to determine the transmission power of PUCCH; if indicating it is invalid, the power control parameter is not used to determine the transmission power of the PUCCH. At this point, optionally, the first power control parameter may be a first valid power control parameter indicated by the MAC-CE.

Optionally, the MAC-CE/DCI may indicate power control parameters corresponding to the PUCCH resource by indicating the number of power control parameters corresponding to the PUCCH resource.

For example, in case that the MAC-CE/DCI indicates that the number of power control parameters corresponding to PUCCH is 1, the terminal uses a power control parameter with the smallest ID or a default power control parameter, in a default power control parameter set, to determine a transmission power of PUCCH. In case that the MAC-CE/DCI indicates that the number of power control parameters corresponding to PUCCH is 2, the terminal uses a power control parameter with the smallest ID or a default power control parameter in each of two default power control parameter sets to determine the transmission power of the PUCCH. Optionally, the first power control parameter is the power control parameter with the smallest ID.

For another example, in case that the MAC-CE/DCI indicates that the number of power control parameter sets corresponding to the PUCCH is 1, the terminal uses a power control parameter with the smallest ID in a power control parameter set ranked first when the power control parameter sets configured by RRC are arranged in orders of configuration, to determine the transmission power of PUCCH. In case that the MAC-CE/DCI indicates that the number of power control parameters corresponding to the PUCCH is 2, the terminal uses a power control parameter with the smallest ID in each of first two power control parameter sets when the power control parameter sets configured by RRC are arranged in orders of configuration, to determine the transmission power of the PUCCH.

Optionally, the MAC-CE/DCI may include indication information of corresponding relationship between PUCCH resource repetitions and power control parameters. For example, the MAC-CE includes an information field for indicating the corresponding relationship.

Optionally, the first target signaling is DCI and includes 1 bit which is used to indicate whether the uplink channel resource is associated with one group of power control parameters or associated with two groups of power control parameters.

Optionally, the first target signaling is DCI and includes 1 bit which is used to indicate whether the uplink channel resource is associated with one group of power control parameter sets or associated with two groups of power control parameter sets.

Optionally, the first target signaling is DCI and includes 2 bits which are used to indicate whether the uplink channel resource is associated with one group of power control parameters or associated with two groups of power control parameters, and to simultaneously indicate which group of power control parameters is associated with the first repetition in case of indicating that the uplink channel resource is associated with one group of power control parameters.

Optionally, the first target signaling is DCI and includes 1 bit which is used to indicate whether the uplink channel resource is associated with one group of power control parameter sets or associated with two groups of power control parameter sets, and to simultaneously indicate which group of power control parameters is associated with the first repetition in case of indicating that the uplink channel resource is associated with one group of power control parameter sets.

S3: the terminal receives the DCI and determines that the PUCCH needs to be transmitted.

S4: the terminal determines a transmission power of the PUCCH resource according to the power control parameters in the power control parameter sets indicated by the MAC-CE/DCI, and uses the power control parameter with the smallest ID or the default power control parameter in the power control parameter sets indicated by the MAC-CE/DCI to determine the transmission power of the first repetition of the PUCCH resource.

Optionally, when the MAC-CE/DCI indicates IDs of multiple power control parameter sets, the terminal may determine power control parameter sets used for the first repetition according to orders of the IDs. The terminal may also determine the power control parameter sets used for the first repetition according to a code sequence corresponding to the information field of the MAC-CE for indicating the power control parameter sets; or, the terminal may determine the power control parameter sets used for the first repetition from valid power control parameter sets indicated by the MAC-CE; or the terminal may determine the power control parameter sets used for the first repetition according to IDs of the power control parameter sets.

The above application examples can be used when the network device does not configure spatial relation information (i.e., PUCCH-SpatialRelationInfo) for the terminal but configures pathlossReferenceRS. When the network device does not configure pathlossReferenceRS for the terminal, the terminal can use a reference signal obtained through an SS/PBCH block with the same index number as an SS/PBCH block through which the terminal obtains MIB, as a path loss reference signal for all PUCCH repetitions of the PUCCH resource. Before the terminal is configured with power control parameters, the terminal may also use a reference signal obtained through an SS/PBCH block with the same index number as an SS/PBCH block through which the terminal obtains MIB, as a path loss reference signal for all PUCCH repetitions of the PUCCH resource.

According to the uplink channel power control method of the embodiment of the present disclosure, the network device uses the first target signaling to dynamically indicate the information used to determine the transmission power of the uplink channel resource, so that in case that the network device does not configure the spatial setup signaling for the terminal, the network device and the terminal can also have a consistent understanding of the transmission power of uplink channel resources, thereby ensuring normal operation of M-TRP uplink channel transmission. The information used to determine the transmission power of the uplink channel resource may be indicated by the network device in various indication ways such as identification information, number and group of the power control parameters, and power control parameter set indication information, and the indication ways are flexible and highly operable.

Referring to FIG. 2, one embodiment of the present disclosure further provides an uplink channel power control method, performed by a terminal. The uplink channel power control method performed by the terminal, and the uplink channel power control method performed by the network device, are based on the same application concept; since the two methods are similar in the uplink channel power control process, the embodiments may refer to each other, and repeated descriptions will not be repeated.

The uplink channel power control method in this embodiment of the present disclosure includes:

Step 201: receiving a first target signaling; where the first target signaling indicates information used to determine a transmission power of an uplink channel resource; the information, which is used to determine the transmission power of the uplink channel resource and is indicated by the first target signaling, includes at least one of power control parameter indication information and power control parameter set indication information.

The power control parameter indication information indicates at least one power control parameter through at least one of the following: identification information of power control parameters, the number of power control parameters, and groups of power control parameters.

Here, the terminal receives the first target signaling, and the network device uses the first target signaling to dynamically indicate the information used to determine the transmission power of the uplink channel resource. The terminal can determine the transmission power of the uplink channel resource based on the information dynamically indicated by the first target signaling, so that in case that the network device does not configure the spatial setup signaling for the terminal, the network device and the terminal can also have a consistent understanding of the transmission power of uplink channel resources, thereby ensuring normal operation of M-TRP uplink channel transmission. The information used to determine the transmission power of the uplink channel resource indicated by the first target signaling may include the power control parameter indication information and the power control parameter set indication information. The power control parameter indication information may indicate at least one power control parameter in various indication ways such as indicating identification information, number, and group of the power control parameters, so that the terminal can determine the transmission power based on various ways such as the identification information, number, group of the power control parameters, and indication information of the power control parameter set, which is flexible and highly operable.

The network device may configure at least one power control parameter for an uplink channel resource through RRC signaling. The configured power control parameter may include at least one of the following: a target receiving power P0, a path loss reference signal and a closed loop reference signal, which is not limited thereto.

The power control parameter configuration of the uplink channel resources may include at least one group of power control parameters, and each group of power control parameters includes at least one power control parameter. The power control parameter configuration of the uplink channel resources may also include at least one power control parameter set, and each power control parameter set includes at least one power control parameter. Multiple power control parameter sets may also be divided into different groups, and each group of power control parameter sets includes at least one power control parameter set.

For example, it is assumed that the power control parameter configuration of the uplink channel resources includes A power control parameters and/or B power control parameter sets, and both A and B are integers greater than or equal to 1. The network device can indicate, through the power control parameter indication information, at least one power control parameter from power control parameters included in the A power control parameters and/or B power control parameter sets. The terminal receives the power control parameter indication information, and determines the transmission power of uplink channel resources based on the indicated at least one power control parameter. Alternatively, the network device may also indicate, through the power control parameter set indication information, at least one power control parameter set from the B power control parameter sets. The terminal receives the power control parameter indication information, and determines the transmission power of uplink channel resources based on the indicated at least one power control parameter.

Optionally, the power control parameter set indication information may indicate at least one power control parameter set through at least one of the following: identification information of a power control parameter set, the number of power control parameter sets and groups of power control parameter sets, which are not thereto.

At this point, the power control parameter set indication information may indicate at least one power control parameter set through a variety of indication ways such as the identification information, the number and the groups of the power control parameter sets, and the terminal can determine the transmission power in a variety of ways such as based on the identification information, number, groups of the power control parameters and power control parameter set indication information, which are flexible and changeable.

Step 202: determining the transmission power of the uplink channel resource according to the first target signaling.

Here, the terminal determines the transmission power of the uplink channel resource according to the information used to determine the transmission power of the uplink channel resource indicated by the first target signaling, so that the network device and the terminal can have a consistent understanding of the transmission power of uplink channel resources, thereby ensuring normal operation of M-TRP uplink channel transmission.

In the uplink channel power control method according to the embodiment of the present disclosure, the network device uses the first target signaling to dynamically indicate the information used to determine the transmission power of the uplink channel resource, and the terminal can determine the transmission power of the uplink channel resource based on the information dynamically indicated by the first target signaling, so that in case that the network device does not configure the spatial setup signaling for the terminal, the network device and the terminal can also have a consistent understanding of the transmission power of uplink channel resources, thereby ensuring normal operation of M-TRP uplink channel transmission. The terminal can determine the transmission power in a variety of ways such as based on the identification information, number, groups of the power control parameters and power control parameter set indication information, which are flexible and changeable.

The uplink channel resource involved in the embodiments of the present disclosure includes but is not limited to a physical uplink control channel (PUCCH) resource, a physical uplink shared channel (PUSCH) resource.

Optionally, the first target signaling is medium access control-control element (MAC-CE) signaling or downlink control information (DCI), which is not limited thereto.

At this point, the network device can indicate to the terminal, through MAC-CE or DCI, a power control parameter and/or a power control parameter set of an uplink channel resource triggered by the DCI; and the terminal receives the DCI and determines that transmission needs to be performed on the uplink channel resource. The terminal determines a transmission power of the uplink channel resource according to the power control parameter and/or power control parameter set indicated by the MAC-CE or DCI. In case that the network device does not configure the spatial setup signaling for the terminal, the network device and the terminal can also have a consistent understanding of the transmission power of the uplink channel resource, thereby ensuring normal operation of M-TRP uplink channel transmission.

In one embodiment of the present disclosure, the terminal can determine at least one power control parameter used for the transmission power of the uplink channel resource according to at least one of the identification information (such as ID) of power control parameters, the number of power control parameters, and groups of power control parameters, which are indicated by the network device. Similarly, the terminal can determine at least one power control parameter used for the transmission power of the uplink channel resource according to at least one of the identification information of power control parameter sets, the number of power control parameter sets, and groups of power control parameter sets, which are indicated by the network device. Such manners are described hereinafter.

Manner 1.1: the terminal determines the transmission power of the uplink channel resource according to power control parameters corresponding to the identification information of power control parameters indicated by the network device.

Optionally, the information, which is used to determine the transmission power of the uplink channel resource and is indicated by the first target signaling, includes power control parameter indication information. The power control parameter indication information indicates at least one power control parameter through identification information of the power control parameters. The above step 202 includes: determining, by the terminal, the transmission power of the uplink channel resource according to power control parameters corresponding to a plurality of pieces of identification information indicated by the first target signaling.

For example, in case that the first target signaling (MAC-CE or DCI) indicates a power control parameter with ID of 1 and a power control parameter with ID of 2, the terminal determines the transmission power of the uplink channel resource according to these two power control parameters.

Manner 1.2: the terminal determines the transmission power of the uplink channel resource according to power control parameters in power control parameter sets corresponding to the identification information of power control parameter sets indicated by the network device.

Optionally, the information, which is used to determine the transmission power of the uplink channel resource and is indicated by the first target signaling, includes power control parameter set indication information. The power control parameter set indication information indicates at least one power control parameter set through identification information of the power control parameter sets. The above step 202 includes: determining, by the terminal, the transmission power of the uplink channel resource according to power control parameters in power control parameter sets corresponding to one or more pieces of identification information indicated by the first target signaling.

For example, in case that the first target signaling (MAC-CE or DCI) indicates a power control parameter set with ID of 1 and a power control parameter set with ID of 2, the terminal determines the transmission power of the uplink channel resource according to power control parameters in the two power control parameter sets.

In case that the network device indicates at least one power control parameter set, the terminal may determine the transmission power of the uplink channel resource according to all power control parameters in the at least one power control parameter set, or may also determine the transmission power of the uplink channel resources according to some power control parameters (such as a power control parameter with the smallest ID or a default power control parameter) which are selected, in accordance with a set rule, from the at least one power control parameter set.

Manner 1.3: the terminal determines the number of power control parameters used for the transmission power of the uplink channel resource according to the number of power control parameters indicated by the network device.

Optionally, the information, which is used to determine the transmission power of the uplink channel resource and is indicated by the first target signaling, includes power control parameter indication information. The power control parameter indication information indicates at least one power control parameter through the number of the power control parameters. The above step 202 includes: determining the number of power control parameters used for the transmission power of the uplink channel resource according to the number indicated by the power control parameter indication information.

At this point, based on the number of power control parameters indicated by the first target signaling, the terminal determines the number of power control parameters used to determine the transmission power of the uplink channel resource. Then, the terminal selects a corresponding number of power control parameters, from power control parameter configuration of the uplink channel resource, to determine the transmission power of the uplink channel resource.

When the network device indicates the number of power control parameters, the terminal can select a corresponding number of power control parameters according to a set rule (such as a power control parameter with the smallest ID or a default power control parameter) to determine the transmission power of the uplink channel resource.

For example, in case that the first target signaling (MAC-CE or DCI) indicates that the number of power control parameters is 1, the terminal determines that the number of power control parameters used to determine the transmission power of the uplink channel resource is 1. Then the terminal selects, according to the set rule, 1 power control parameter from power control parameter configuration of the uplink channel resource, to determine the transmission power of the uplink channel resource.

For another example, in case that the first target signaling (MAC-CE or DCI) indicates that the number of power control parameters is 2, the terminal determines that the number of power control parameters used to determine the transmission power of the uplink channel resource is 2. Then the terminal selects, according to the set rule, 2 power control parameter from power control parameter configuration of the uplink channel resource, to determine the transmission power of the uplink channel resource.

Manner 1.4: the terminal determines the number of power control parameter sets used to determine the transmission power of the uplink channel resource according to the number of power control parameter sets indicated by the network device.

Optionally, the information, which is used to determine the transmission power of the uplink channel resource and is indicated by the first target signaling, includes power control parameter set indication information. The power control parameter set indication information indicates at least one power control parameter set through the number of the power control parameter sets. The above step 202 includes: according to the number indicated by the power control parameter set indication information, determining the number of power control parameter sets used to determine the transmission power of the uplink channel resource.

At this point, based on the number of power control parameter sets indicated by the first target signaling, the terminal determines the number of power control parameter sets used to determine the transmission power of the uplink channel resource. Then, the terminal selects a corresponding number of power control parameter sets, from power control parameter configuration of the uplink channel resource, and determines the transmission power of the uplink channel resource according to power control parameters in the selected power control parameter sets.

When the network device indicates the number of power control parameter sets, the terminal can select a corresponding number of power control parameter sets according to a set rule (such as a power control parameter with the smallest ID or a default power control parameter). After the terminal selects the corresponding number of power control parameter sets, the terminal may determine the transmission power of the uplink channel resource according to all power control parameters in the corresponding number of power control parameter sets, or, may also determine the transmission power of the uplink channel resource according to some power control parameters (such as a power control parameter with the smallest ID or a default power control parameter) which are selected, in accordance with a set rule, from the corresponding number of power control parameter sets.

For example, in case that the first target signaling (MAC-CE or DCI) indicates that the number of power control parameter sets is 1, the terminal determines that the number of power control parameter sets used to determine the transmission power of the uplink channel resource is 1. Then the terminal selects, according to the set rule, 1 power control parameter set from power control parameter configuration of the uplink channel resource, and determines the transmission power of the uplink channel resource according to power control parameters in the selected one power control parameter set.

Manner 1.5: the terminal determines power control parameters used to determine the transmission power of the uplink channel resource according to groups of power control parameters indicated by the network device.

Optionally, the information, which is used to determine the transmission power of the uplink channel resource and is indicated by the first target signaling, includes power control parameter indication information. The power control parameter indication information indicates at least one group of power control parameters through the groups of the power control parameters. The above step 202 includes: determining power control parameters used to determine the transmission power of the uplink channel resource, in the groups of power control parameters indicated by the power control parameter indication information.

At this point, based on the groups of power control parameters indicated by the first target signaling, the terminal determines power control parameters used to determine the transmission power of the uplink channel resource, from the indicated groups of power control parameters. The terminal can select at least one power control parameter from the power control parameters of the indicated group to determine the transmission power of the uplink channel resource.

When the network device indicates the group of power control parameters, the terminal can select, according to a set rule (such as a power control parameter with the smallest ID or a default power control parameter), a power control parameter from power control parameters of the indicated group to determine the transmission power of the uplink channel resource.

For example, in case that the first target signaling (MAC-CE or DCI) indicates a first group of power control parameters, the terminal determines power control parameters used to determine the transmission power of the uplink channel resource, in the first group of power control parameters. The terminal may select, according to a set rule, at least one power control parameter from the first group of power control parameters, to determine the transmission power of the uplink channel resource.

For another example, in case that the first target signaling (MAC-CE or DCI) indicates a first group of power control parameters and a second group of power control parameters, the terminal determines power control parameters used to determine the transmission power of the uplink channel resource, in the first group of power control parameters and the second group of power control parameters. The terminal may select, according to a set rule, at least one power control parameter from the first group of power control parameters and the second group of power control parameters respectively, to determine the transmission power of the uplink channel resource.

Manner 1.6: the terminal determines power control parameter sets used to determine the transmission power of the uplink channel resource according to groups of power control parameter sets indicated by the network device.

Optionally, the information, which is used to determine the transmission power of the uplink channel resource and is indicated by the first target signaling, includes power control parameter set indication information. The power control parameter set indication information indicates at least one power control parameter set through the groups of the power control parameter sets. The above step 202 includes: in the groups of power control parameter sets indicated by the power control parameter set indication information, determining power control parameter sets used to determine the transmission power of the uplink channel resource.

At this point, based on the groups of power control parameter sets indicated by the first target signaling, the terminal determines power control parameter sets used to determine the transmission power of the uplink channel resource, in the indicated groups of power control parameter sets. Optionally, the terminal selects at least one power control parameter set from power control parameter sets of the indicated group, and determines the transmission power of the uplink channel resource according to power control parameters in the selected power control parameter sets.

Optionally, the terminal determines the transmission power of the uplink channel resource by using power control parameter sets of all groups indicated by the first target signaling.

Optionally, when the network device indicates the group of power control parameter sets, the terminal can select, according to a set rule, at least one power control parameter set from power control parameter sets of the specified group. After the terminal selects at least one power control parameter set, the terminal may determine the transmission power of the uplink channel resource according to all power control parameters in the at least one power control parameter set, or may determine the transmission power of the uplink channel resource according to some power control parameters (such as a power control parameter with the smallest ID or a default power control parameter) which are selected, in accordance with a set rule, from the at least one power control parameter set.

For example, in case that the first target signaling (MAC-CE or DCI) indicates a first group of power control parameter sets, the terminal determines power control parameter sets used to determine the transmission power of the uplink channel resource, in the first group of power control parameter sets. The terminal may select, according to a set rule, at least one power control parameter set from the first group of power control parameter sets, and determines the transmission power of the uplink channel resource according to power control parameters in the selected power control parameter sets.

In the above manners 1.2 to 1.6, when the first target signaling indicates the number and group of power control parameters or the identification information, number and group of power control parameter sets, the terminal may select some power control parameters or power control parameter sets according to a certain method, and a method for selecting some power control parameters or power control parameter sets is described hereinafter.

Optionally, the information, which is used to determine the transmission power of the uplink channel resource and is indicated by the first target signaling, includes power control parameter indication information. The first target signaling indicates at least one power control parameter from any one of the following items 2.1-2.4.

2.1 default power control parameters in the power control parameter configuration of the uplink channel resource.

Optionally, when the first target signaling indicates identification information of the power control parameters, the first target signaling may indicate identification information of at least one power control parameter from a default power control parameter in the power control parameter configuration of the uplink channel resource. The terminal uses the default power control parameters corresponding to the indicated identification information to determine the transmission power of the uplink channel resource.

Optionally, when the first target signaling indicates the number of power control parameters, the terminal may select a corresponding number of default power control parameters from the default power control parameters in the power control parameter configuration of the uplink channel resource, to determine the transmission power of the uplink channel resource.

If the number of power control parameters indicated by the first target signaling is smaller than the number of default power control parameters included in the power control parameter configuration of the uplink channel resource, it may be agreed in the agreement that a default power control parameter with a smaller identifier is preferable.

For example, in case that the first target signaling (MAC-CE or DCI) indicates that the number of power control parameter sets is 1, the terminal selects one default power control parameter with a smallest identifier from the default power control parameters in the power control parameter configuration of the uplink channel resource to determine the transmission power of the uplink channel resource.

If the number of power control parameters indicated by the first target signaling is greater than the number of default power control parameters included in the power control parameter configuration of the uplink channel resource, it may be agreed in the agreement to reuse one or more default power control parameters, or add other specific power control parameter (such as a power control parameter with a smallest identifier or a power control parameter with an identifier of a specific value).

Optionally, when the first target signaling indicates a group of power control parameters, the terminal may select at least one default power control parameter from a default power control parameter in the indicated group of power control parameters to determine the transmission power of the uplink channel resource.

If the number of default power control parameters included in the group of power control parameters indicated by the first target signaling, is greater than the number of power control parameters used to determine the transmission power of the uplink channel resource, it may be agreed in the agreement that a default power control parameter with a smaller identifier is preferable.

For example, if the first target signaling (MAC-CE or DCI) indicates a first group of power control parameters, the terminal selects two default power control parameters with smaller identifiers from default power control parameters in the first group of power control parameters, to determine the transmission power of the uplink channel resource.

If the number of default power control parameters included in the group of power control parameters indicated by the first target signaling, is smaller than the number of power control parameters used to determine the transmission power of the uplink channel resource, it may be agreed in the agreement to reuse one or more default power control parameters, or add other specific power control parameter (such as a power control parameter with a smallest identifier or a power control parameter with an identifier of a specific value).

The default power control parameter may be configured by the network side, or may be specified in the agreement.

The default power control parameter may be a power control parameter with the smallest identifier, but is not limited thereto.

2.2 at least one power control parameter at first N positions or last N positions in the power control parameter configuration of the uplink channel resource; where N is an integer greater than or equal to 1, and the power control parameters are sorted according to sizes of values of identifiers or according to configuration sequence.

Optionally, when the first target signaling indicates identification information of power control parameters, the first target signaling indicates identification information of at least one power control parameters from at least one power control parameter at first N positions or last N positions in the power control parameter configuration of the uplink channel resource. Then the terminal uses the power control parameters corresponding to the indicated identification information to determine the transmission power of the uplink channel resource.

Optionally, when the first target signaling indicates the number of power control parameters, the terminal may select a corresponding number of power control parameters from at least one power control parameter at first N positions or last N positions in the power control parameter configuration of the uplink channel resource, to determine the transmission power of the uplink channel resource.

If the number of power control parameters indicated by the first target signaling is smaller than N, it may be agreed in the agreement that a power control parameter with a smaller identifier or a default power control parameter is preferable.

For example, in case that the first target signaling (MAC-CE or DCI) indicates that the number of power control parameters is 1, the terminal selects the first power control parameter with the smallest identifier from the first two power control parameters (N is equal to 2, and the power control parameters are sorted according to sizes of values of identifiers from small to large) in the power control parameter configuration of the uplink channel resource to determine the transmission power of the uplink channel resource.

If the number of power control parameters indicated by the first target signaling is greater than N, it may be agreed in the agreement to reuse at least one power control parameter, or add other specific power control parameter (such as a power control parameter with a smallest identifier or a power control parameter with an identifier of a specific value).

Optionally, when the first target signaling indicates a group of power control parameters, the terminal may select at least one power control parameter from power control parameters at first N positions or last N positions in the indicated group of power control parameters, to determine the transmission power of the uplink channel resource.

When the first target signaling indicates the group of power control parameters, if N is greater than the number of power control parameters used to determine the transmission power of the uplink channel resource, it may be agreed in the agreement that a power control parameter with a smaller identifier or a default power control parameter is preferable.

For example, if the first target signaling (MAC-CE or DCI) indicates the first group of power control parameters, the terminal may select the first power control parameter with the smallest identifier from the first two power control parameters (N is equal to 2, and the power control parameters are sorted according to sizes of values of identifiers from small to large) in the first group of power control parameters, to determine the transmission power of the uplink channel resource.

When the first target signaling indicates the group of power control parameters, if N is smaller than the number of power control parameters used to determine the transmission power of the uplink channel resource, it may be agreed in the agreement to reuse at least one power control parameter, or add other specific power control parameter (such as a power control parameter with a smallest identifier or a power control parameter with an identifier of a specific value).

2.3 default power control parameters in a power control parameter set included in the power control parameter configuration.

Optionally, when the first target signaling indicates identification information of the power control parameters, the first target signaling may indicate identification information of at least one power control parameter from a default power control parameter in a power control parameter set included in the power control parameter configuration of the uplink channel resource. The terminal uses the default power control parameters corresponding to the indicated identification information to determine the transmission power of the uplink channel resource.

Optionally, when the first target signaling indicates the number of power control parameters, the terminal may select a corresponding number of default power control parameters from default power control parameters in a power control parameter set included in the power control parameter configuration of the uplink channel resource, to determine the transmission power of the uplink channel resource.

If the number of power control parameters indicated by the first target signaling is smaller than the number of default power control parameters in a power control parameter set included in the power control parameter configuration of the uplink channel resource, it may be agreed in the agreement that a power control parameter with a smaller identifier is preferable.

For example, if the first target signaling (MAC-CE or DCI) indicates that the number of power control parameters is 2, the terminal selects two default power control parameters with smaller identifiers from default power control parameters in a power control parameter set included in the power control parameter configuration of the uplink channel resource, to determine the transmission power of the uplink channel resource.

If the number of power control parameters indicated by the first target signaling is greater than the number of default power control parameters in a power control parameter set included in the power control parameter configuration of the uplink channel resource, it may be agreed in the agreement to reuse at least one power control parameter, or add other specific power control parameter (such as a power control parameter with a smallest identifier or a power control parameter with an identifier of a specific value).

2.4 at least one power control parameter at first M positions or last M positions in a power control parameter set included in the power control parameter configuration of the uplink channel resource; where M is an integer greater than or equal to 1, and the power control parameters are sorted according to sizes of values of identifiers or according to configuration sequence.

Optionally, when the first target signaling indicates identification information of power control parameters, the first target signaling indicates identification information of at least one power control parameters from at least one power control parameter at first M positions or last M positions in a power control parameter set included in the power control parameter configuration of the uplink channel resource. Then the terminal uses default power control parameters corresponding to the indicated identification information to determine the transmission power of the uplink channel resource.

Optionally, when the first target signaling indicates the number of power control parameters, the terminal may select a corresponding number of power control parameters from at least one power control parameter at first M positions or last M positions in a power control parameter set included in the power control parameter configuration of the uplink channel resource, to determine the transmission power of the uplink channel resource.

If the number of power control parameters indicated by the first target signaling is smaller than M, it may be agreed in the agreement that a power control parameter with a smaller identifier or a default power control parameter is preferable.

For example, in case that the first target signaling (MAC-CE or DCI) indicates that the number of power control parameters is 2, the terminal selects first two power control parameters with smaller identifiers from first four power control parameters (M is equal to 4, and the power control parameters are sorted according to identifiers from small to large) in a power control parameter set included in the power control parameter configuration of the uplink channel resource to determine the transmission power of the uplink channel resource.

If the number of power control parameters indicated by the first target signaling is greater than M, it may be agreed in the agreement to reuse at least one power control parameter, or add other specific power control parameter (such as a power control parameter with a smallest identifier or a power control parameter with an identifier of a specific value).

Optionally, the information, which is used to determine the transmission power of the uplink channel resource and is indicated by the first target signaling, includes power control parameter set indication information. The first target signaling indicates at least one power control parameter set from any one of the following items 2.5-2.8.

2.5 power control parameter sets included in the power control parameter configuration of the uplink channel resource.

The above step 202 includes: determining the transmission power of the uplink channel resource according to default power control parameters in the indicated power control parameter sets.

Optionally, when the first target signaling indicates identification information of the power control parameter sets, the first target signaling may indicate identification information of at least one power control parameter set from a power control parameter set included in the power control parameter configuration of the uplink channel resource. The terminal uses default power control parameters in the indicated at least one power control parameter set to determine the transmission power of the uplink channel resource.

Optionally, when the first target signaling indicates the number of power control parameter sets, the terminal may select a corresponding number of power control parameter sets from the power control parameter sets included in the power control parameter configuration of the uplink channel resource. Default power control parameters in the corresponding number of power control parameter sets are used to determine the transmission power of the uplink channel resource.

If the number of power control parameters indicated by the first target signaling is smaller than the number of power control parameter sets included in the power control parameter configuration of the uplink channel resource, it may be agreed in the agreement that a power control parameter set with a smaller identifier or a default power control parameter set is preferable.

For example, in case that the first target signaling (MAC-CE or DCI) indicates that the number of power control parameter sets is 1, the terminal selects one power control parameter set with a smallest identifier from the power control parameter sets included in the power control parameter configuration of the uplink channel resource, and uses default power control parameters in the selected power control parameter set to determine the transmission power of the uplink channel resource.

If the number of power control parameters indicated by the first target signaling is greater than the number of power control parameter sets included in the power control parameter configuration of the uplink channel resource, it may be agreed in the agreement to reuse at least one power control parameter set, or add other specific power control parameter set (such as a power control parameter set with a smallest identifier or a power control parameter set with an identifier of a specific value).

Optionally, when the first target signaling indicates a group of power control parameter sets, the terminal selects at least one power control parameter set from power control parameter sets in the indicated group of power control parameter sets, and uses default power control parameters in the at least one power control parameter set to determine the transmission power of the uplink channel resource.

When the first target signaling indicates a group of power control parameter sets, if the number of power control parameter sets included in the indicated group of power control parameter sets, is greater than the number of power control parameter sets used to determine the transmission power of the uplink channel resource, it may be agreed in the agreement that a power control parameter set with a smaller identifier or a default power control parameter set is preferable.

For example, if the first target signaling (MAC-CE or DCI) indicates a first group of power control parameter sets, the terminal selects a power control parameter set with a smallest identifier from the first group of power control parameter sets, and uses one or more default power control parameters in the one selected power control parameter set to determine the transmission power of the uplink channel resource.

When the first target signaling indicates a group of power control parameter sets, if the number of power control parameter sets included in the indicated group of power control parameter sets, is smaller than the number of power control parameter sets used to determine the transmission power of the uplink channel resource, it may be agreed in the agreement to reuse at least one power control parameter set, or add other specific power control parameter set (such as a power control parameter set with a smallest identifier or a power control parameter set with an identifier of a specific value).

The default power control parameter set may be configured by the network side, or may be specified in the agreement.

The default power control parameter set may be a power control parameter set with the smallest identifier, but is not limited thereto.

2.6 power control parameter sets included in the power control parameter configuration of the uplink channel resource.

The above step 202 includes: determining the transmission power of the uplink channel resource according to power control parameters at first P positions or last P positions in the indicated power control parameter sets; where P is an integer greater than or equal to 1, and the power control parameters are sorted according to sizes of values of identifiers or according to configuration sequence.

Optionally, when the first target signaling indicates identification information of power control parameter sets, the first target signaling indicates identification information of at least one power control parameter set from a power control parameter set included in the power control parameter configuration of the uplink channel resource. Then the terminal uses power control parameters at first P positions or last P positions in the indicated at least one power control parameter set to determine the transmission power of the uplink channel resource.

Optionally, when the first target signaling indicates the number of power control parameter sets, the terminal selects a corresponding number of power control parameter sets from power control parameter sets included in the power control parameter configuration of the uplink channel resource, and uses power control parameters at first P positions or last P positions in the corresponding number of power control parameter sets to determine the transmission power of the uplink channel resource.

If the number of power control parameter sets indicated by the first target signaling is smaller than the number of power control parameter sets included in the power control parameter configuration of the uplink channel resource, it may be agreed in the agreement that a power control parameter with a smaller identifier or a default power control parameter is preferable.

For example, in case that the first target signaling (MAC-CE or DCI) indicates that the number of power control parameter set is 1, the terminal selects one power control parameter set with the smallest identifier from the power control parameter sets included in the power control parameter configuration of the uplink channel resource, and uses first two power control parameters with smaller identifiers in the one selected power control parameter set (P is equal to 2, and power control parameters are sorted according to identifiers from small to large) to determine the transmission power of the uplink channel resource.

If the number of power control parameter sets indicated by the first target signaling is greater than the number of power control parameter sets included in the power control parameter configuration of the uplink channel resource, it may be agreed in the agreement to reuse at least one power control parameter set, or add other specific power control parameter set (such as a power control parameter set with a smallest identifier or a power control parameter set with an identifier of a specific value).

Optionally, when the first target signaling indicates a group of power control parameter sets, the terminal may select at least one power control parameter set from the indicated group of power control parameter sets, and use power control parameters at first P positions or last P positions in the at least one power control parameter set to determine the transmission power of the uplink channel resource.

When the first target signaling indicates the group of power control parameter sets, if the number of power control parameter sets included in the indicated group of power control parameter sets, is greater than the number of power control parameter sets used to determine the transmission power of the uplink channel resource, it may be agreed in the agreement that a power control parameter set with a smaller identifier or a default power control parameter is preferable.

For example, if the first target signaling (MAC-CE or DCI) indicates the first group of power control parameter sets, the terminal selects a power control parameter set with a smallest identifier in the first group of power control parameter sets, and uses a first power control parameter with a smallest identifier (P is equal to 1, and the power control parameters are sorted according to identifiers from small to large) in the one selected power control parameter set to determine the transmission power of the uplink channel resource.

When the first target signaling indicates the group of power control parameter sets, if the number of power control parameter sets included in the indicated group of power control parameter sets, is smaller than the number of power control parameter sets used to determine the transmission power of the uplink channel resource, it may be agreed in the agreement to reuse at least one power control parameter set, or add other specific power control parameter set (such as a power control parameter set with a smallest identifier or a power control parameter set with an identifier of a specific value).

2.7 default power control parameter sets included in the power control parameter configuration of the uplink channel resource.

The above step 202 includes: determining the transmission power of the uplink channel resource according to default power control parameters in the indicated power control parameter sets.

Optionally, when the first target signaling indicates identification information of power control parameter sets, the first target signaling indicates identification information of at least one power control parameter set from a default power control parameter set included in the power control parameter configuration of the uplink channel resource. Then the terminal uses default power control parameters in the at least one power control parameter set corresponding to the identification information to determine the transmission power of the uplink channel resource.

Optionally, when the first target signaling indicates the number of power control parameter sets, the terminal selects a corresponding number of power control parameter sets from default power control parameter sets included in the power control parameter configuration of the uplink channel resource, and uses default power control parameters in the corresponding number of power control parameter sets to determine the transmission power of the uplink channel resource.

If the number of power control parameter sets indicated by the first target signaling is smaller than the number of default power control parameter sets included in the power control parameter configuration of the uplink channel resource, it may be agreed in the agreement that a power control parameter set with a smaller identifier is preferable.

For example, in case that the first target signaling (MAC-CE or DCI) indicates that the number of power control parameter set is 1, the terminal selects one default power control parameter set with the smallest identifier from default power control parameter sets included in the power control parameter configuration of the uplink channel resource, and uses default power control parameters in the one selected default power control parameter set to determine the transmission power of the uplink channel resource.

If the number of power control parameter sets indicated by the first target signaling is greater than the number of power control parameter sets included in the power control parameter configuration of the uplink channel resource, it may be agreed in the agreement to reuse at least one power control parameter set, or add other specific power control parameter set (such as a power control parameter set with a smallest identifier or a power control parameter set with an identifier of a specific value).

Optionally, when the first target signaling indicates a group of power control parameter sets, the terminal may select at least one power control parameter set from default power control parameter sets in the indicated group of power control parameter sets, and use default power control parameters in the at least one power control parameter set to determine the transmission power of the uplink channel resource.

When the first target signaling indicates the group of power control parameter sets, if the number of default power control parameter sets included in the indicated group of power control parameter sets, is greater than the number of power control parameter sets used to determine the transmission power of the uplink channel resource, it may be agreed in the agreement that a power control parameter set with a smaller identifier is preferable.

For example, if the first target signaling (MAC-CE or DCI) indicates a first group of power control parameter sets, the terminal selects first two default power control parameter sets from default power control parameter sets which are sorted according to identifiers from small to large in the first group of power control parameter sets, and uses default power control parameters in the two power control parameter sets to determine the transmission power of the uplink channel resource.

When the first target signaling indicates the group of power control parameter sets, if the number of power control parameter sets included in the indicated group of power control parameter sets, is smaller than the number of power control parameter sets used to determine the transmission power of the uplink channel resource, it may be agreed in the agreement to reuse at least one power control parameter set, or add other specific power control parameter set (such as a power control parameter set with a smallest identifier or a power control parameter set with an identifier of a specific value).

2.8 power control parameter sets at first Q positions or last Q positions in the power control parameter configuration of the uplink channel resource.

The above step 202 includes: determining the transmission power of the uplink channel resource according to default power control parameters in the indicated power control parameter sets; where Q is an integer greater than or equal to 1, and the power control parameter sets are sorted according to sizes of values of identifiers or according to configuration sequence.

Optionally, when the first target signaling indicates identification information of the power control parameter sets, the first target signaling may indicate identification information of at least one power control parameter set from power control parameter sets at first Q positions or last Q positions in the power control parameter configuration of the uplink channel resource. The terminal uses default power control parameters in the at least one power control parameter set corresponding to the identification information to determine the transmission power of the uplink channel resource.

Optionally, when the first target signaling indicates the number of power control parameter sets, the terminal may select a corresponding number of power control parameter sets from the power control parameter sets at first Q positions or last Q positions in the power control parameter configuration of the uplink channel resource. Default power control parameters in the corresponding number of power control parameter sets are used to determine the transmission power of the uplink channel resource.

If the number of power control parameter sets indicated by the first target signaling is smaller than Q, it may be agreed in the agreement that a power control parameter set with a smaller identifier or a default power control parameter set is preferable.

For example, in case that the first target signaling (MAC-CE or DCI) indicates that the number of power control parameter sets is 1, the terminal selects one power control parameter set with a smallest identifier from the first four power control parameter sets (Q is equal to 4 and the power control parameter sets are sorted according to sizes of values of identifiers) included in the power control parameter configuration of the uplink channel resource, and uses default power control parameters in the selected one power control parameter set to determine the transmission power of the uplink channel resource.

If the number of power control parameter sets indicated by the first target signaling is greater than Q, it may be agreed in the agreement to reuse at least one power control parameter set, or add other specific power control parameter set (such as a power control parameter set with a smallest identifier or a power control parameter set with an identifier of a specific value).

Optionally, when the first target signaling indicates a group of power control parameter sets, the terminal may select at least one power control parameter set from the power control parameter sets at first Q positions or last Q positions in the power control parameter configuration of the uplink channel resource. Default power control parameters in the at least one power control parameter set are used to determine the transmission power of the uplink channel resource.

When the first target signaling indicates the group of power control parameter sets, if the number of power control parameter sets included in the indicated group of power control parameter sets, is greater than Q, it may be agreed in the agreement that a power control parameter set with a smaller identifier or a default power control parameter set is preferable.

For example, if the first target signaling (MAC-CE or DCI) indicates a first group of power control parameter sets, the terminal selects one power control parameter set with a smallest identifier from first two power control parameter sets (Q is equal to 2 and the power control parameter sets are sorted according to sizes of values of identifiers) included in the first group of power control parameter sets, and uses default power control parameters in the selected one power control parameter set to determine the transmission power of the uplink channel resource.

When the first target signaling indicates the group of power control parameter sets, if the number of power control parameter sets included in the indicated group of power control parameter sets, is smaller than Q, it may be agreed in the agreement to reuse at least one power control parameter set, or add other specific power control parameter set (such as a power control parameter set with a smallest identifier or a power control parameter set with an identifier of a specific value).

In the embodiments of the present disclosure, the power control parameter or the power control parameter set used to determine the transmission power of the uplink channel resource may be flexibly determined through the above various ways.

In the embodiment of the present disclosure, when determining the transmission power of uplink channel resources under M-TRP, it is also necessary to determine corresponding relationship between repetitions of uplink channel resources and power control parameters or power control parameter sets. This corresponding relationship may be indicated by the network device, or may be specified in the agreement. The following describes how to determine the corresponding relationship between repetitions of uplink channel resources and power control parameters or power control parameter sets.

Optionally, the above step 202 includes:

determining a first power control parameter based on first preset information;

using the first power control parameter to determine a transmission power of a first repetition of the uplink channel resource.

Here, the terminal may determine the first power control parameter based on the first preset information, and use the first power control parameter to determine the transmission power of the first repetition of the uplink channel resource.

When the corresponding relationship between repetitions of uplink channel resources and power control parameters or power control parameter sets is specified in an agreement, it may be agreed in the agreement that the terminal determines the first power control parameter based on the first preset information. When the corresponding relationship between repetitions of uplink channel resources and power control parameters or power control parameter sets is indicated by the network device, if the network device indicates a corresponding relationship between groups of power control parameters and repetitions of uplink channel resources, or the network device indicates a corresponding relationship between repetitions of uplink channel resources and identification information and groups of power control parameter sets, it may also be agreed in the agreement that the terminal determines the first power control parameter based on the first preset information. The foregoing will be introduced hereinafter respectively.

When the corresponding relationship between repetitions of uplink channel resources and power control parameters or power control parameter sets is specified in an agreement, it includes but not limited to the following agreed manners.

Manner 3.1: in case that the network device indicates identification information of power control parameters through the first target signaling, it may be agreed in the agreement that based on first preset information, the terminal determines a first power control parameter in power control parameters corresponding to the identification information.

Manner 3.2: in case that the network device indicates the number of power control parameters through the first target signaling, after the terminal selects a corresponding number of power control parameters in the foregoing ways, it may be agreed in the agreement that based on first preset information, the terminal determines a first power control parameter in the corresponding number of power control parameters.

Manner 3.3: in case that the network device indicates a group of power control parameters through the first target signaling, it may be agreed in the agreement that based on first preset information, the terminal determines a first power control parameter in the indicated group of power control parameters.

Manner 32.4: in case that the network device indicates multiple groups of power control parameters through the first target signaling, it may be agreed in the agreement that based on first preset information, the terminal selects one group of power control parameters from the indicated multiple groups of power control parameters, and determines a first power control parameter in the selected one group of power control parameters based on first preset information, where the first preset information used twice may be the same or different indicators.

Manner 3.5: in case that the network device indicates identification information of one power control parameter set through the first target signaling, it may be agreed in the agreement that based on first preset information, the terminal selects at least one power control parameters in the one power control parameter set as a first power control parameter; or, it may be agreed in the agreement that the terminal uses all power control parameters in the one power control parameter set as the first power control parameter.

Manner 3.6: in case that the network device indicates identification information of multiple power control parameter sets through the first target signaling, it may be agreed in the agreement that based on first preset information, the terminal selects at least one power control parameter set from the multiple power control parameter sets, and continues to select, based on first preset information, at least one power control parameter from the at least one power control parameter set as the first power control parameter, where the first preset information used twice may be the same or different indicators; or, it may be agreed in the agreement that after the terminal selects at least one power control parameter set from the multiple power control parameter sets based on first preset information, the terminal uses all power control parameters in the at least one power control parameter set as the first power control parameter.

Manner 3.7: in case that the network device indicates the number of power control parameter sets is 1 through the first target signaling, after the terminal selects one power control parameter set according to the foregoing indication ways, it may be agreed in the agreement that based on first preset information, the terminal selects at least one power control parameters in the one power control parameter set as a first power control parameter; or, it may be agreed in the agreement that the terminal uses all power control parameters in the one power control parameter set as the first power control parameter.

Manner 3.8: in case that the network device indicates the number of power control parameter sets is multiple through the first target signaling, after the terminal selects multiple power control parameter sets according to the foregoing indication ways, it may be agreed in the agreement that based on first preset information, the terminal selects at least one power control parameter set from the multiple power control parameter sets, and continues to select, based on first preset information, at least one power control parameter from the at least one power control parameter set as the first power control parameter, where the first preset information used twice may be the same or different indicators; or, it may be agreed in the agreement that after the terminal selects at least one power control parameter set from the multiple power control parameter sets based on first preset information, the terminal uses all power control parameters in the at least one power control parameter set as the first power control parameter.

Manner 3.9: in case that the network device indicates a group of power control parameter sets through the first target signaling, it may be agreed in the agreement that based on first preset information, the terminal selects at least one power control parameter set from the group of power control parameter sets, and continues to select, based on first preset information, at least one power control parameter from the at least one power control parameter set as the first power control parameter, where the first preset information used twice may be the same or different indicators; or, it may be agreed in the agreement that the terminal selects at least one power control parameter set from the group of power control parameter sets based on first preset information, and uses all power control parameters in the at least one power control parameter set as the first power control parameter.

Manner 3.10: in case that the network device indicates multiple groups of power control parameter sets through the first target signaling, it may be agreed in the agreement that based on first preset information, the terminal selects one group of power control parameter sets from the multiple groups of power control parameter sets, and then continues to select, based on first preset information, at least one power control parameter set from the one group of power control parameter sets, and then continues to select, based on first preset information, at least one power control parameter in the at least one power control parameter set as the first power control parameter, where the first preset information used three times may be the same or different indicators; or, it may be agreed in the agreement that based on first preset information, the terminal selects one group of power control parameter sets from the multiple groups of power control parameter sets, then continues to select, based on first preset information, at least one power control parameter set in the one group of power control parameter sets, and then uses all power control parameters in the at least one power control parameter set as the first power control parameter, where the first preset information used twice may be the same or different indicators.

When the corresponding relationship between repetitions of uplink channel resources and power control parameters or power control parameter sets is indicated by the network device, it includes but not limited to the following agreed manners.

Manner 4.1: in case that the network device indicates a corresponding relationship between a group of power control parameters and a first repetition of an uplink channel resource, after the terminal determines a group of power control parameters corresponding to the first repetition according to the corresponding relationship, it may be agreed in the agreement that based on first preset information, the terminal selects at least one power control parameter from the group of power control parameters corresponding to the first repetition as the first power control parameter.

Manner 4.2: in case that the network device indicates a corresponding relationship between identification information of power control parameter sets and a first repetition of an uplink channel resource, after the terminal determines a power control parameter set corresponding to the first repetition according to the corresponding relationship, it may be agreed in the agreement that based on first preset information, the terminal selects at least one power control parameter from the power control parameter set corresponding to the first repetition, as the first power control parameter; or, it may be agreed in the agreement that the terminal uses all power control parameters in the power control parameter set corresponding to the first repetition as the first power control parameter.

Manner 4.3: in case that the network device indicates a corresponding relationship between a group of power control parameter sets and a first repetition of an uplink channel resource, after the terminal determines a group of power control parameter sets corresponding to the first repetition according to the corresponding relationship, it may be agreed in the agreement that based on first preset information, the terminal selects at least one power control parameter set from the group of power control parameter sets corresponding to the first repetition, and continues to select, based on first preset information, at least one power control parameter from the at least one power control parameter set as the first power control parameter, where the first preset information used twice may be the same or different indicators; or, it may be agreed in the agreement that based on first preset information, the terminal selects at least one power control parameter set from the group of power control parameter sets corresponding to the first repetition, and uses all power control parameters in the at least one power control parameter set as the first power control parameter.

In the embodiment of the present disclosure, the first power control parameter corresponding to the first repetition of the uplink channel resource may be determined through the above-mentioned various manners. Optionally, for other repetitions of the uplink channel resource, one repetition belonging to the same group as the first repetition can use the same power control parameters as the first repetition; one repetition that does not belong to the same group as the first repetition can use power control parameters different from those of the first repetition.

The first repetition of the uplink channel resource refers to an initial transmission repetition of the uplink channel resource.

In the embodiments of the present disclosure, the network device may indicate to the terminal, through the first target signaling or a second target signaling, the corresponding relationship between the power control parameter or the power control parameter set and the repetition of the uplink channel resource. Optionally, the above step 202 includes any one of the following:

- according to information of a corresponding relationship between repetitions of the uplink channel resource and identification information or group of power control parameters, which is indicated by the first target signaling or the second target signaling, determining power control parameters used to determine the transmission power of the first repetition of the uplink channel resource;
- according to information of a corresponding relationship between repetitions of the uplink channel resource and identification information or group of power control parameter sets, which is indicated by the first target signaling or the second target signaling, determining power control parameters used to determine the transmission power of the first repetition of the uplink channel resource;
- where the second target signaling is different from the first target signaling.

At this point, the network device may use the second target signaling to indicate information of a corresponding relationship between identification information or group of power control parameters or power control parameter sets and repetitions of the uplink channel resource; or the network device may also use the first target signaling to carry information indicating a corresponding relationship between identification information or group of power control parameters or power control parameter sets and repetitions of the uplink channel resource; and the terminal determines power control parameters corresponding to the repetition of the uplink channel resource, according to the information of the corresponding relationship between identification information or group of power control parameters or power control parameter sets and repetitions of the uplink channel resource indicated by the first target signaling or the second target signaling.

In case that the first target signaling or the second target signaling indicates information of a corresponding relationship between identification information of power control parameters and a first repetition of the uplink channel resource, the terminal can directly use the power control parameters corresponding to the identification information corresponding to the first repetition of the uplink channel resource as the first power control parameter for determining a transmission power of the uplink channel resource. For other repetitions, one repetition belonging to the same group as the first repetition can use the same power control parameters as the first repetition; one repetition that does not belong to the same group as the first repetition can use power control parameters different from those of the first repetition.

For example, the network device uses the first target signaling to indicate a power control parameter with an identifier (ID) of 3 and a power control parameter with an ID of 4, and uses the first target signaling to indicate information of a corresponding relationship between the power control parameter with the identifier of 3 and a first repetition of the uplink channel resource, the terminal uses the power control parameter with the ID of 3 to determine transmission power of the first repetition and repetitions belonging to the same group as the first repetition; and the terminal uses the power control parameter with the ID of 4 to determine transmission power of repetitions that do not belong to the same group as the first repetition.

Of course, the first target signaling or the second target signaling may also indicate information of a corresponding relationship between identification information of power control parameters and multiple repetitions of the uplink channel resource. When the corresponding relationship of multiple repetitions is indicated, each repetition uses power control parameters in the power control parameters corresponding to the identification information corresponding to the each repetition, to determine its transmission power.

When the first target signaling or the second target signaling indicates information of a corresponding relationship between a first repetition of the uplink channel resource and a group of power control parameters or identification information or group of power control parameter sets, a first power control parameter used for the first repetition of the uplink channel resource can be determined based on first preset information according to the above manners 4.1-4.3.

Of course, the first target signaling or the second target signaling may also simultaneously indicate information of corresponding relationship between multiple repetitions of the uplink channel resource and a group of power control parameters or identification information or group of power control parameter sets. When the corresponding relationship of multiple repetitions is indicated, each repetition uses its corresponding power control parameters or power control parameter sets, to determine its transmission power according to the above manners 4.1-4.3, which will not be repeated here.

As discussed above, the first target signaling may be MAC-CE or DCI.

The second target signaling may be downlink control information (DCI); and a transmit power control (TPC) field of DCI can be used to indicate information of a corresponding relationship between the repetition of the uplink channel resource and the identification information or group of power control parameters, or information of a corresponding relationship between the repetition of the uplink channel resource and the identification information or group of power control parameter sets.

At this point, the network device uses the TPC field in the DCI to indicate information of a corresponding relationship between the repetition of the uplink channel resource and the identification information or group of power control parameters, or information of a corresponding relationship between the repetition of the uplink channel resource and the identification information or group of power control parameter sets.

For example, the network device uses MAC-CE to indicate that the number of power control parameter sets of the uplink channel resource is 1, and uses TPC field in DCI to indicate that a power control parameter set corresponding to the repetition (which applies to all repetitions by default when no repetition is specified) of the uplink channel resource is a first power control parameter set (the first power control parameter set may be any one in power control parameter set configuration of the uplink channel resource, or the first power control parameter set is a first one of power control parameter sets arranged according to configuration sequence in the power control parameter set configuration of the uplink channel resource), and the terminal uses power control parameters in the first power control parameter set to determine a transmission power of the repetition of the uplink channel resource.

For another example, the network device uses MAC-CE to indicate that the number of power control parameter sets of the uplink channel resource is 2, and uses TPC field in DCI to indicate that a power control parameter set corresponding to the repetition (which applies to all repetitions by default when no repetition is specified) of the uplink channel resource is a first power control parameter set (the first power control parameter set may be any one in power control parameter set configuration of the uplink channel resource, or the first power control parameter set is a first one of power control parameter sets arranged according to configuration sequence in the power control parameter set configuration of the uplink channel resource); at this point, when the number of power control parameter sets indicated by the MAC-CE is different from the number of power control parameter sets indicated by the TPC field in the DCI, the terminal may determine an open-loop power control parameter (P0, path loss reference signal, closed-loop power control parameters, etc.) of the uplink channel resource according to the two power control parameter sets, and perform closed-loop power control adjustment, according to the first power control parameter set, on a repetition of the uplink channel resource corresponding to the first power control parameter set.

The first preset information in the embodiments of the present disclosure will be introduced hereinafter.

Optionally, the first preset information includes, but is not limited to, any one of a default power control parameter, a value of an identifier of a power control parameter, a size of a value of an identifier of a power control parameter, an information field of a first target signaling, a sequence of power control parameters indicated by a first target signaling and a code sequence corresponding to power control parameters indicated by a first target signaling; and/or, a valid state of a power control parameter indicated by a first target signaling; and/or, sorting of groups of power control parameters; and/or, the first preset information includes, but is not limited to, any one of a default power control parameter set, a value of an identifier of a power control parameter set, a size of a value of an identifier of a power control parameter set, a sequence of power control parameter sets indicated by a first target signaling and a code sequence corresponding to power control parameter sets indicated by a first target signaling; and/or, a valid state of a power control parameter set indicated by a first target signaling; and/or, sorting of groups of power control parameter sets.

The default power control parameter or power control parameter set may be configured by the network side, or may be specified in the agreement. The default power control parameter or power control parameter set may be a power control parameter or power control parameter set with the smallest identifier (ID).

At this point, the terminal may use the default power control parameter or power control parameter set as an indicator for selecting the first power control parameter.

For example, the network device indicates a first group of power control parameters through a first target signaling, and the terminal may select a default power control parameter in the first group of power control parameters as a first power control parameter used for the first repetition.

The value of the identifier (such as ID) itself represents a value defined by the identifier, while the size of the identifier represents the size compared with other identifiers. For example, for a power control parameter with an ID equal to 5, its value of the ID itself is 5; compared with a power control parameter with an ID equal to 0, the power control parameter with the ID equal to 5 has a larger identifier; and compared with a power control parameter with an ID equal to 7, the power control parameter with the ID equal to 5 has a smaller identifier.

Optionally, the step of determining the first power control parameter based on the first preset information, includes:

determining the first power control parameter according to a power control parameter with an identifier whose value is a first preset value;

determining the first power control parameter according to power control parameters in a power control parameter set with an identifier whose value is a second preset value;

determining the first power control parameter according to a power control parameter with an identifier whose value is of a size at a first preset level;

determining the first power control parameter according to a power control parameter in a power control parameter set with an identifier whose value is of a size at a second preset level;

where the size of the value of the identifier at the first preset level or the size of the value of the identifier at the second preset level includes any one of the following: a size of a value of an identifier is the smallest, a size of a value of an identifier is the largest, a size of a value of an identifier is at an intermediate value, which are not limited thereto.

At this point, it may be agreed in the agreement that in the power control parameters or power control parameter sets indicated by the first target signaling, the terminal determines the first power control parameter used for the first repetition according to the value of the identifier (a power control parameter with an identifier whose value is a first preset value, or a power control parameter set with an identifier whose value is a second preset value) or sizes of values of identifiers (a power control parameter or power control parameter set with a smallest identifier, or with a largest identifier or with an identifier which is at an intermediate value).

Specifically, a power control parameter with an identifier whose value is a first preset value can be determined as the first power control parameter; or, a power control parameter in a power control parameter set with an identifier whose value is a second preset value, can be determined as the first power control parameter; or, a power control parameter with an identifier whose value is of a size at a first preset level, can be determined as the first power control parameter; or, a power control parameter in a power control parameter set with an identifier whose value is of a size at a second preset level, can be determined as the first power control parameter.

For example, the network device uses the first target signaling to indicate a power control parameter with ID of 1 and a power control parameter with ID of 2; based on the sizes of values of identifiers, the terminal selects the power control parameter with the smallest ID, i.e., the power control parameter with ID of 1, as the first power control parameter used for the first repetition.

For another example, the network device uses the first target signaling to indicate that the number of power control parameters is 2; the terminal selects 2 power control parameters through the aforementioned method, and then, based on sizes of values of identifiers, the terminal selects one power control parameter with the smallest ID from the 2 power control parameters as the first power control parameter used for the first repetition.

For another example, the network device uses the first target signaling to indicate that a first group of power control parameters. The first group of power control parameters includes multiple power control parameters. Based on sizes of values of identifiers, the terminal selects one power control parameter with the smallest ID from the first group of power control parameters as the first power control parameter used for the first repetition.

For another example, the network device uses the first target signaling to indicate a power control parameter set with ID of 1 and a power control parameter set with ID of 2; and the terminal may use all power control parameters in the power control parameter set with ID of 1 as the first power control parameter used for the first repetition; or, the terminal may use a power control parameter with the smallest ID or a default power control parameter in the power control parameter set with ID of 1 as the first power control parameter used for the first repetition.

For another example, the network device uses the first target signaling to indicate that the number of power control parameter sets is 1, and the terminal may use power control parameters in a power control parameter set with a smallest ID as the first power control parameter used for the first repetition.

For another example, the network device uses the first target signaling to indicate a first group of power control parameter sets; and the terminal may use all power control parameters or default power control parameters in a power control parameter set with a smallest ID in the first group of power control parameter sets as the first power control parameter used for the first repetition.

Optionally, the first target signaling includes one or more information fields used to indicate power control parameters and/or power control parameter sets. At least part of the information fields are provided with indication information for indicating whether power control parameters and/or power control parameter sets corresponding to the information fields are valid.

For example, at least part of the information fields includes 1-bit indication information for indicating whether power control parameters and/or power control parameter sets corresponding to the information fields are valid. If indicating it is valid, power control parameters and/or power control parameter sets corresponding to the information field can be used to determine the transmission power of the uplink channel resource; if indicating it is invalid, power control parameters and/or power control parameter sets corresponding to the information field are not used to determine the transmission power of the uplink channel resource.

As mentioned above, the first target signaling may be MAC-CE or DCI. Optionally, the MAC-CE is MAC-CE signaling used to indicate spatial relation information SpatialRelationInfo of the uplink channel resource. The MAC-CE includes information of whether a spatial reference signal indicated by the spatial relation information SpatialRelationInfo is invalid. The spatial reference signal is a reference signal for determining a spatial filter coefficient of an uplink channel resource. When indicating that the spatial reference signal indicated by SpatialRelationInfo is invalid, the terminal does not use the spatial reference signal indicated by SpatialRelationInfo to determine the spatial filter coefficient of the uplink channel resource.

Optionally, the first target signaling is DCI and includes 1 bit which is used to indicate whether the uplink channel resource is associated with one group of power control parameters or associated with two groups of power control parameters.

Optionally, the first target signaling is DCI and includes 1 bit which is used to indicate whether the uplink channel resource is associated with one group of power control parameter sets or associated with two groups of power control parameter sets.

Optionally, the first target signaling is DCI and includes 2 bits which are used to indicate whether the uplink channel resource is associated with one group of power control parameters or associated with two groups of power control parameters, and to simultaneously indicate which group of power control parameters is associated with the first repetition in case of indicating that the uplink channel resource is associated with one group of power control parameters.

Optionally, the first target signaling is DCI and includes 1 bit which is used to indicate whether the uplink channel resource is associated with one group of power control parameter sets or associated with two groups of power control parameter sets, and to simultaneously indicate which group of power control parameters is associated with the first repetition in case of indicating that the uplink channel resource is associated with one group of power control parameter sets.

Optionally, the step of determining the first power control parameter based on the first preset information, includes:

determining the first power control parameter according to a power control parameter indicated by an information field at a first preset position according to sequence of multiple information fields for indicating power control parameters in the first target signaling; or, determining the first power control parameter according to a power control parameter in a power control parameter set indicated by an information field at a second preset position according to sequence of multiple information fields for indicating power control parameter sets in the first target signaling;

where the information field at the first preset position or the information field at the second preset position includes any one of the following: a first information field, a last information field, and an information field at a middle position, which are not limited to thereto.

Specifically, a power control parameter indicated by an information field at a first preset position according to sequence of multiple information fields for indicating power control parameters in the first target signaling, can be determined as the first power control parameter; or, a power control parameter in a power control parameter set indicated by an information field at a second preset position according to sequence of multiple information fields for indicating power control parameter sets in the first target signaling, can be determined as the first power control parameter.

For example, the network device uses 4 information fields to indicate 4 power control parameters; based on the sequence of information fields, the terminal may select a power control parameter indicated by the first information field as a first power control parameter; or, based on the sequence of information fields and valid states of the power control parameters, the terminal selects a power control parameter indicated by a first information field when valid power control parameters are arranged in the order of the information fields.

The sequence of the power control parameters/power control parameter sets indicated by the first target signaling means a sequence of simultaneously indicating multiple power control parameters/power control parameter sets when the first target signaling indicates multiple power control parameters/power control parameter sets.

Optionally, the step of determining the first power control parameter based on the first preset information, includes:

determining the first power control parameter according to a power control parameter at a fifth preset position in power control parameters indicated by the first target signaling; or, determining the first power control parameter according to a power control parameter in a power control parameter set at a sixth preset position in power control parameters indicated by the first target signaling;

where the fifth preset position or the sixth preset position includes any one of the following: a first position, a last position, and a position in the middle, which are not limited thereto.

Specifically, a power control parameter at a fifth preset position in power control parameters indicated by the first target signaling can be determined as the first power control parameter; or, a power control parameter in a power control parameter set at a sixth preset position in power control parameters indicated by the first target signaling, can be determined as the first power control parameter.

For example, the first target signaling indicates a power control parameter with ID of 1 and a power control parameter with ID of 2; meanwhile, the power control parameter with ID of 1 is ranked first and the power control parameter with ID of 2 is ranked last (or, the power control parameter with ID of 2 is ranked first and the power control parameter with ID of 1 is ranked last), the terminal may use the power control parameter whose ID is at a first position as the first power control parameter; or, based on the sequence of power control parameters and valid states of the power control parameters, the terminal selects a first valid power control parameter from indicated power control parameters as the first power control parameter.

Optionally, the first target signaling includes an information field used to indicate power control parameters and/or power control parameter sets, where the information field is greater than or equal to $\lceil \log_2(2^K-1) \rceil$ bit, and K is the number of power control parameters or power control parameter sets indicated by the first target signaling.

Optionally, the first target signaling includes an information field used to indicate power control parameters and/or power control parameter sets. The information field also indicates a sequence of the power control parameters and/or the power control parameter sets. The information field is greater than or equal to $$\left\lceil \log_2\left(\sum_{k=1}^{K} A_K^k\right) \right\rceil$$

bit, and K is the number of power control parameters or power control parameter sets indicated by the first target signaling, and $$A_K^k$$

represents the number of permutations and combination for selecting k numbers from K numbers.

A code sequence corresponding to power control parameters/power control parameter sets indicated by the first target signaling means a code bit sequence of the power control parameters/power control parameter sets indicated by the first target signaling. The terminal may use power control parameters/power control parameter sets corresponding to a specific bit to determine the first power control parameter.

Optionally, the step of determining the first power control parameter based on the first preset information, includes:

determining the first power control parameter according to a power control parameter corresponding to a code at a seventh preset position in a code sequence corresponding to the power control parameters indicated by the first target signaling; or, determining the first power control parameter according to a power control parameter corresponding to a code at an eighth preset position in a code sequence corresponding to the power control parameter sets indicated by the first target signaling;

where the seventh preset position or the eighth preset position includes any one of the following: most significant bit (MSB) and least significant bit (LSB).

Specifically, a power control parameter corresponding to a code at a seventh preset position in a code sequence corresponding to the power control parameters indicated by the first target signaling, can be determined as the first power control parameter; or, a power control parameter corresponding to a code at an eighth preset position in a code sequence corresponding to the power control parameter sets indicated by the first target signaling, can be determined as the first power control parameter.

For example, in a code sequence corresponding to power control parameter sets indicated by the first target signaling, the most significant bit is corresponding to a power control parameter with an ID of 2, and the terminal may use the power control parameter with then ID of 2 as the first power control parameter.

The valid state of the power control parameter/power control parameter set indicated by the first target signaling refers to a valid state determined by the indication information, which is in the information field of the first target signaling and is used for indicating whether power control parameters and/or power control parameter sets corresponding to the information field are valid; or, a valid state directly indicated by the first target signaling. The valid state of the power control parameter/power control parameter set indicated by the first target signaling may be judged in combination with any of indicators mentioned above.

Optionally, the step of determining the first power control parameter based on the first preset information, includes:

determining the first power control parameter according to a power control parameter at a third preset position according to sequence of valid power control parameters indicated by the first target signaling; or, determining the first power control parameter according to a power control parameter in a power control parameter set at a fourth preset position according to sequence of valid power control parameter sets indicated by the first target signaling;

where the third preset position or the fourth preset position includes any one of the following: a first valid position, a last valid position, and a middle valid position, which are not limited thereto.

Specifically, a power control parameter at a third preset position when valid power control parameters indicated by the first target signaling are arranged in sequence, can be determined as the first power control parameter; or, a power control parameter in a power control parameter set at a fourth preset position according to sequence of valid power control parameter sets indicated by the first target signaling, can be determined as the first power control parameter.

For example, the first target signaling indicates a power control parameter with an ID of 1 and a power control parameter with an ID of 2, and meanwhile, indicates that the power control parameter with then ID of 1 is invalid and the power control parameter with the ID 2 of is valid; then, the terminal can use a first valid power control parameter, i.e., the power control parameter with the ID of 2, as the first power control parameter.

The sorting of groups of power control parameters means that multiple groups of power control parameters are sorted according to specific rules (such as group number sizes); and the sorting of groups of power control parameter sets means that multiple groups of power control parameter sets are sorted according to specific rules (such as group number sizes). The terminal may determine the first power control parameter based on the sorting of groups of power control parameters or power control parameter sets in combination with any of the aforementioned indicators; or, the terminal may determine the first power control parameter only based on the sorting of groups of power control parameters or power control parameter sets.

Optionally, the step of determining the first power control parameter based on the first preset information, includes:

determining the first power control parameter according to a power control parameter in a group at a ninth preset position according to sequence of multiple groups of power control parameters of the uplink channel resource; or, determining the first power control parameter according to a power control parameter in a group of power control parameter set at a tenth preset position according to sequence of multiple groups of power control parameter sets of the uplink channel resource;

where the group at a ninth preset position or the group at a tenth preset position includes any one of the following: a first group, a last group, and a group in a middle position, which are not limited thereto.

Specifically, a power control parameter in a group at a ninth preset position according to sequence of multiple groups of power control parameters of the uplink channel resource, can be determined as the first power control parameter; or, a power control parameter in a group of power control parameter set at a tenth preset position according to sequence of multiple groups of power control parameter sets of the uplink channel resource, can be determined as the first power control parameter.

For example, the first target signaling indicates a first group of power control parameters and a second group of power control parameters; the terminal may select the first group of power control parameters based on the sorting of groups of power control parameters, and select, based on sizes of values of identifiers, a power control parameter with a smallest identifier from the first group of power control parameters as the first power control parameter used for the first repetition.

In the embodiments of the present disclosure, the terminal may determine a first power control parameter based on any one of the following: a default power control parameter or power control parameter set, a value of an identifier of a power control parameter or power control parameter set, sizes of values of identifiers, information field of a first target signaling, a sequence of power control parameters or power control parameter sets indicated by a first target signaling and a code sequence corresponding to power control parameters or power control parameter sets indicated by a first target signaling; or, the terminal may determine a first power control parameter based on a valid state of a power control parameter or power control parameter set indicated by a first target signaling; or, the terminal may determine a first power control parameter based on sorting of multiple groups of power control parameters or groups of power control parameter sets indicated by a first target signaling; or, the terminal may determine a first power control parameter based on combination of multiple ones of the above parameters. The ways for determining the first power control parameter are flexible and highly operable.

Optionally, the power control parameter indication information indicates multiple types of power control parameters, or, the power control parameter set indicated by the power control parameter set indication information is a power control parameter set including multiple types of power control parameters.

Optionally, the step of determining the first power control parameter based on the first preset information, includes:

using the same or different preset indicators to determine first power control parameters corresponding to different types of power control parameters.

At this point, in case that the first target signaling indicates multiple types of power control parameters, or indicates a power control parameter set including multiple types of power control parameters, first power control parameters corresponding to different types of power control parameters may be determined by using the same or different first preset information.

For example, the first target signaling indicates two reference signals including $P_0$ and path loss reference signal. $P_0$ can use sizes of values of identifiers to determine power control parameters used for the first repetition of the uplink channel resource. The path loss reference signal can use the value of the identifier to determine power control parameters used for the first repetition of the uplink channel resource.

Optionally, the network device uses other signaling to indicate closed-loop power control parameters.

Optionally, the network device may configure at least one group of common power control parameters applicable to all dedicated uplink channel resources; or, the network device may configure at least one group of common power control parameters applicable to all dedicated uplink channel resources, and configure, for the uplink channel resources, at least one group of dedicated power control parameters dedicated to the uplink channel resources.

Here, the network device may configure at least one group of power control parameters for the uplink channel resources through RRC signaling. One possible configuration mode is that the network device configures multiple groups of power control parameters in a dedicated uplink channel resource configuration, and the configured power control parameters are applicable to all dedicated uplink channel resources. Another possible configuration mode is that the network device configures one group of uplink channel resource power control parameters in a dedicated uplink channel resource configuration, and the configured power control parameters are applicable to all dedicated uplink channel resources; and the network device configures at least one group of power control parameters in uplink channel resource configuration information, and the power control parameters are applicable to uplink channel resources that are only available for scheduling.

Optionally, when configuring at least one group of common power control parameters and configuring at least one group of dedicated power control parameters, the foregoing step 202 includes:

using the first target signaling to indicate information for determining the transmission power of the uplink channel resource from the common power control parameters and the dedicated power control parameters.

At this point, for an uplink channel resource, if the network device does not configure a dedicated power control parameter for the uplink channel resource, the common power control parameter is used to determine the transmission power of the uplink channel resource. For an uplink channel resource, if the network device configures a dedicated power control parameter for the uplink channel resource, the common power control parameter and dedicated power control parameter are used jointly to determine the transmission power of the uplink channel resource.

Optionally, one uplink channel resource is configured with multiple repetitions, some of the repetitions use common power control parameters to determine their transmission powers; and the rest of the repetitions use dedicated power control parameters to determine their transmission powers.

Optionally, each group of power control parameters configured by the RRC signaling includes at least one power control parameter. A power control parameter with the smallest ID in each group of power control parameters is a default power control parameter.

Optionally, the power control parameters include but are not limited to at least one of the following: $P_0$, a path loss reference signal, and a closed-loop parameter (closeloopIndex).

Optionally, the above step 202 includes:

in case that the first target signaling carries identifiers of one or more uplink channel resources; according to the first target signaling, determining a transmission power of any uplink channel resource whose identifier is carried in the first target signaling.

At this point, the network device may simultaneously indicate power control parameters or power control parameter sets available for multiple uplink channel resources.

In addition to using MAC-CE/DCI to configure power control parameters or power control parameter sets used to determine the transmission power of uplink channel resources, optionally, the network device may also use RRC signaling to independently indicate for each uplink channel resource, an association relationship between the uplink channel resource and power control parameters or power control parameter sets, which, for example, is indicated in PUCCH-resource.

Optionally, the network device may group uplink channel resources of the terminal. For any group of uplink channel resources, the first target signaling is used to indicate information used for determining transmission power of the uplink channel resources from power control configuration pre-configured for the group of uplink channel resources.

Here, the network device may divide the uplink channel resources into some groups, and indicate for each group respectively, an association relationship between the uplink channel resource group and the power control parameters or power control parameter sets, and the association relationship is available for all uplink channel resources in the uplink channel resource group. The specific way may refer to the ways described above, where the "uplink channel resources" is replaced with "uplink channel resource group".

Embodiments of the present disclosure are applicable to PUCCH and PUSCH, but are not limited thereto.

Optionally, the uplink channel resource is an uplink shared channel (PUSCH) resource, and the first repetition is a nominal repetition with an earliest transmission moment.

Here, when PUSCH repetition type is Type B, the repetition is a nominal repetition.

Optionally, the uplink channel resource is an uplink control channel (PUCCH) resource, and the first repetition is an actual repetition with an earliest transmission moment, or the first repetition is a repetition opportunity with an earliest transmission moment.

Here, for repetition opportunities of the uplink channel resources, if some repetition opportunities of the uplink channel resources cannot be transmitted due to conflict with DL symbols, some repetition opportunities of the uplink channel resources are discarded.

Optionally, this embodiment of the present disclosure may be used when the network device does not configure spatial relation information (that is, PUCCH-SpatialRelationInfo) for the terminal but configures pathlossReferenceRS.

Optionally, when the network device does not configure pathlossReferenceRS for the terminal, the terminal can use a reference signal obtained through an SS/PBCH block with the same index number as an SS/PBCH block through which the terminal obtains MIB, as a path loss reference signal for all repetitions of uplink channel resources.

Optionally, before the terminal is configured with power control parameters, the terminal uses a reference signal obtained through an SS/PBCH block with the same index number as an SS/PBCH block through which the terminal obtains MIB, as a path loss reference signal for all repetitions of uplink channel resources.

In the embodiments of the present disclosure, for uplink channel resources dedicated to the terminal and cell-common uplink channel resources, there is slight difference.

When the uplink channel resource is configured as an uplink channel resource dedicated to the terminal, the power control parameters may include $P_0$, a path loss reference signal parameter, and a closed-loop parameter.

When the uplink channel resource is configured as a cell-common uplink channel resource, the power control parameters may include $P_0$.

In the uplink channel power control method according to the embodiment of the present disclosure, the network device uses the first target signaling to dynamically indicate the information used to determine the transmission power of the uplink channel resource. The terminal can determine the transmission power of the uplink channel resource based on the information dynamically indicated by the first target signaling, so that in case that the network device does not configure the spatial setup signaling for the terminal, the network device and the terminal can also have a consistent understanding of the transmission power of uplink channel resources, thereby ensuring normal operation of M-TRP uplink channel transmission. The terminal can determine the transmission power based on various ways such as the identification information, number, group of the power control parameters, and indication information of the power control parameter set. The method is flexible and highly operable.

The uplink channel power control method provided in the embodiments of the present disclosure is described above, and an uplink channel power control apparatus, terminal, and network device provided in the embodiments of the present disclosure will be described hereinafter with reference to the accompanying drawings.

Referring to FIG. 3, one embodiment of the present disclosure further provides an uplink channel power control apparatus 300, which is applied to a network device. The apparatus includes:

an indication module 301 configured to indicate information used to determine a transmission power of an uplink channel resource, by using a first target signaling; where the information, which is used to determine the transmission power of the uplink channel resource and is indicated by the first target signaling, includes at least one of power control parameter indication information and power control parameter set indication information;

a transmission module 302 configured to transmit the first target signaling to a terminal, where the first target signaling is used by the terminal to determine the transmission power of the uplink channel resource.

According to the uplink channel power control apparatus 300 provided in the embodiments of the present disclosure, the first target signaling is used to dynamically indicate the information used to determine the transmission power of the uplink channel resource, so that in case that the network device does not configure the spatial setup signaling for the terminal, the network device and the terminal can also have a consistent understanding of the transmission power of uplink channel resources, thereby ensuring normal operation of M-TRP uplink channel transmission.

Optionally, the power control parameter indication information may indicate at least one power control parameter through at least one of the following: identification information of a power control parameter, the number of power control parameters and groups of power control parameters.

Optionally, the power control parameter set indication information may indicate at least one power control parameter set through at least one of the following: identification information of a power control parameter set, the number of power control parameter sets and groups of power control parameter sets.

Optionally, a power control parameter used to determine a transmission power of a first repetition of the uplink channel resource is a first power control parameter, and the first power control parameter is a power control parameter determined based on first preset information.

Optionally, the first preset information includes any one of a default power control parameter, a value of an identifier of a power control parameter, a size of a value of an identifier of a power control parameter, an information field of a first target signaling, a sequence of power control parameters indicated by a first target signaling and a code sequence corresponding to power control parameters indicated by a first target signaling; and/or, a valid state of a power control parameter indicated by a first target signaling; and/or, sorting of groups of power control parameters; and/or, the first preset information includes any one of a default power control parameter set, a value of an identifier of a power control parameter set, a size of a value of an identifier of a power control parameter set, a sequence of power control parameter sets indicated by a first target signaling and a code sequence corresponding to power control parameter sets indicated by a first target signaling; and/or, a valid state of a power control parameter set indicated by a first target signaling; and/or, sorting of groups of power control parameter sets.

Optionally, the power control parameter indication information indicates multiple types of power control parameters, or, the power control parameter set indicated by the power control parameter set indication information is a power control parameter set including multiple types of power control parameters. The first power control parameters, which are corresponding to different types of power control parameters, are determined by using the same or different first preset information.

Optionally, the indication module 301 is further configured for any one of the following:

- indicating through a second target signaling, information of a corresponding relationship between repetitions of the uplink channel resource and identification information or group of power control parameters;
- indicating through a second target signaling, information of a corresponding relationship between repetitions of the uplink channel resource and identification information or group of power control parameter sets;
- using the first target signaling to carry information of a corresponding relationship between repetitions of the uplink channel resource and identification information or group of power control parameters;
- using the first target signaling to carry information of a corresponding relationship between repetitions of the uplink channel resource and identification information or group of power control parameter sets;
- where the second target signaling is different from the first target signaling.

Optionally, the information, which is used to determine the transmission power of the uplink channel resource and is indicated by the first target signaling, includes power control parameter indication information; and the indication module 301 is further configured for any one of the following:

- using the first target signaling to indicate at least one power control parameter from a default power control parameter in the power control parameter configuration of the uplink channel resource;
- using the first target signaling to indicate at least one power control parameter from at least one power control parameter at first N positions or last N positions in the power control parameter configuration of the uplink channel resource; where N is an integer greater than or equal to 1, and the power control parameters are sorted according to sizes of values of identifiers or according to configuration sequence;
- using the first target signaling to indicate at least one power control parameter from a default power control parameter in a power control parameter set included in the power control parameter configuration;
- using the first target signaling to indicate at least one power control parameter from at least one power control parameter at first M positions or last M positions in a power control parameter set included in the power control parameter configuration of the uplink channel resource; where M is an integer greater than or equal to 1, and the power control parameters are sorted according to sizes of values of identifiers or according to configuration sequence.

Optionally, the information, which is used to determine the transmission power of the uplink channel resource and is indicated by the first target signaling, includes power control parameter set indication information; and the indication module 301 is further configured for any one of the following:

- using the first target signaling to indicate at least one power control parameter set from a power control parameter set included in the power control parameter configuration of the uplink channel resource; where default power control parameters, which are in the power control parameter sets indicated by the first target signaling, are power control parameters used to determine the transmission power of the uplink channel resource;
- using the first target signaling to indicate at least one power control parameter set from a power control parameter set included in the power control parameter configuration of the uplink channel resource; where power control parameters at first P positions or last P positions in the power control parameter sets indicated by the first target signaling are power control parameters used to determine the transmission power of the uplink channel resource, and P is an integer greater than or equal to 1, and the power control parameters are sorted according to sizes of values of identifiers or according to configuration sequence;
- using the first target signaling to indicate at least one power control parameter set from a default power control parameter set included in the power control parameter configuration of the uplink channel resource; where default power control parameters in the at least one power control parameter set indicated by the first target signaling are power control parameters used to determine the transmission power of the uplink channel resource;
- using the first target signaling to indicate at least one power control parameter set from power control parameter sets at first Q positions or last Q positions in the power control parameter configuration of the uplink channel resource; where default power control parameters, which are in the power control parameter sets indicated by the first target signaling, are power control parameters used to determine the transmission power of the uplink channel resource, and Q is an integer greater than or equal to 1, and the power control parameter sets are sorted according to sizes of values of identifiers or according to configuration sequence.

Optionally, the information, which is used to determine the transmission power of the uplink channel resource and is indicated by the first target signaling, includes power control parameter indication information. The power control parameter indication information indicates at least one power control parameter through the number of the power control parameters. The number of power control parameters used to determine the transmission power of the uplink channel resource is equal to the number indicated by the power control parameter indication information; or, Optionally, the information, which is used to determine the transmission power of the uplink channel resource and is indicated by the first target signaling, includes power control parameter set indication information. The power control parameter set indication information indicates at least one power control parameter set through the number of the power control parameter sets. The number of power control parameter sets used to determine the transmission power of the uplink channel resource is equal to the number indicated by the power control parameter set indication information; or, Optionally, the information, which is used to determine the transmission power of the uplink channel resource and is indicated by the first target signaling, includes power control parameter indication information. The power control parameter indication information indicates at least one group of power control parameters through the groups of the power control parameters. Power control parameters used to determine the transmission power of the uplink channel resource are power control parameters in the groups of power control parameters indicated by the power control parameter indication information; or, Optionally, the information, which is used to determine the transmission power of the uplink channel resource and is indicated by the first target signaling, includes power control parameter set indication information. The power control parameter set indication information indicates at least one group of power control parameter sets through the groups of the power control parameter sets. Power control parameter sets used to determine the transmission power of the uplink channel resource are power control parameter sets in the groups of power control parameter sets indicated by the power control parameter set indication information.

Optionally, the first power control parameter includes any one of the following:

- the first power control parameter is a power control parameter with an identifier whose value is a first preset value;
- the first power control parameter is a power control parameter in a power control parameter set with an identifier whose value is a second preset value;
- the first power control parameter is a power control parameter with an identifier whose value is of a size at a first preset level;
- the first power control parameter is a power control parameter in a power control parameter set with an identifier whose value is of a size at a second preset level;
- where the size of the value of the identifier at the first preset level or the size of the value of the identifier at the second preset level includes any one of the following: a size of a value of an identifier is the smallest, a size of a value of an identifier is the largest, a size of a value of an identifier is at an intermediate value.

Optionally, the first power control parameter is a power control parameter indicated by an information field at a first preset position according to sequence of multiple information fields for indicating power control parameters in the first target signaling; or,

- the first power control parameter is a power control parameter in a power control parameter set indicated by an information field at a second preset position according to sequence of multiple information fields for indicating power control parameter sets in the first target signaling;
- where the information field at the first preset position or the information field at the second preset position includes any one of the following: a first information field, a last information field, and an information field at a middle position.

Optionally, the first power control parameter is a power control parameter at a third preset position according to sequence of valid power control parameters indicated by the first target signaling; or,

- the first power control parameter is a power control parameter in a power control parameter set at a fourth preset position according to sequence of valid power control parameter sets indicated by the first target signaling;
- where the third preset position or the fourth preset position includes any one of the following: a first valid position, a last valid position, and a middle valid position.

Optionally, the first power control parameter is a power control parameter at a fifth preset position in power control parameters indicated by the first target signaling; or,

- the first power control parameter is a power control parameter in a power control parameter set at a sixth preset position in power control parameters indicated by the first target signaling;
- where the fifth preset position or the sixth preset position includes any one of the following: a first position, a last position, and a position in the middle.

Optionally, the first power control parameter is a power control parameter corresponding to a code at a seventh preset position in a code sequence corresponding to the power control parameters indicated by the first target signaling; or,

- the first power control parameter is a power control parameter corresponding to a code at an eighth preset position in a code sequence corresponding to the power control parameter sets indicated by the first target signaling;
- where the seventh preset position or the eighth preset position includes any one of the following: most significant bit (MSB) and least significant bit (LSB).

Optionally, the first power control parameter is a power control parameter in a group at a ninth preset position according to sequence of multiple groups of power control parameters of the uplink channel resource; or,

- the first power control parameter is a power control parameter in a group of power control parameter set at a tenth preset position according to sequence of multiple groups of power control parameter sets of the uplink channel resource;
- where the group at a ninth preset position or the group at a tenth preset position includes any one of the following: a first group, a last group, and a group in a middle position, which are not limited thereto.

Optionally, the first target signaling includes an information field used to indicate power control parameters and/or power control parameter sets, where the information field is greater than or equal to $\lceil \log_2 (2^K-1) \rceil$ bit, and K is the number of power control parameters or power control parameter sets indicated by the first target signaling.

Optionally, the first target signaling includes an information field used to indicate power control parameters and/or power control parameter sets. The information field also indicates a sequence of the power control parameters and/or the power control parameter sets. The information field is greater than or equal to $$\left\lceil \log_2\left(\sum_{k=1}^{K} A_K^k\right)\right\rceil$$

bit, and K is the number of power control parameters or power control parameter sets indicated by the first target signaling, and $$A_K^k$$

represents the number of permutations and combination for selecting k numbers from K numbers.

Optionally, the first target signaling includes one or more information fields used to indicate power control parameters and/or power control parameter sets. At least part of the information fields are provided with indication information for indicating whether power control parameters and/or power control parameter sets corresponding to the information fields are valid.

Optionally, the apparatus further includes:

a configuration module configured to configure at least one group of common power control parameters applicable to all dedicated uplink channel resources; or, configure at least one group of common power control parameters applicable to all dedicated uplink channel resources, and configure, for the uplink channel resource, at least one group of dedicated power control parameters dedicated to the uplink channel resource.

Optionally, when configuring at least one group of common power control parameters and configuring at least one group of dedicated power control parameters, the indication module 30 is specifically configured to, use the first target signaling to indicate information for determining the transmission power of the uplink channel resource from the common power control parameters and the dedicated power control parameters.

Optionally, the first target signaling is medium access control-control element (MAC-CE) signaling or downlink control information (DCI).

Optionally, the MAC-CE is MAC-CE signaling used to indicate spatial relation information of the uplink channel resource. The MAC-CE includes information of whether a spatial reference signal indicated by the spatial relation information is invalid.

Optionally, the second target signaling may be downlink control information (DCI); and a transmit power control (TPC) field of DCI can be used to indicate information of a corresponding relationship between the repetition of the uplink channel resource and the identification information or group of power control parameters, or information of a corresponding relationship between the repetition of the uplink channel resource and the identification information or group of power control parameter sets.

Optionally, the apparatus further includes:

an identification module configured to carry identifiers of one or more uplink channel resources in the first target signaling, where the information used for determining the transmission power of the uplink channel resource indicated in the first target signaling is applicable to any uplink channel resource whose identifier is carried in the first target signaling.

Optionally, the apparatus further includes:

a grouping module configured to group uplink channel resources of the terminal.

The indication module 301 is specifically configured to, for any group of uplink channel resources, use the first target signaling to indicate information used for determining transmission power of the uplink channel resources from power control configuration pre-configured for the group of uplink channel resources.

Optionally, one repetition belonging to the same group as the first repetition can use the same power control parameters as the first repetition;

one repetition that does not belong to the same group as the first repetition can use power control parameters different from those of the first repetition.

Optionally, the uplink channel resource is an uplink shared channel (PUSCH) resource, and the first repetition is a nominal repetition with an earliest transmission moment; or, the uplink channel resource is an uplink control channel (PUCCH) resource, and the first repetition is an actual repetition with an earliest transmission moment, or the first repetition is a repetition opportunity with an earliest transmission moment.

The uplink channel power control apparatus 300 according to the embodiment of the present disclosure uses the first target signaling to dynamically indicate the information used to determine the transmission power of the uplink channel resource, so that in case that the network device does not configure the spatial setup signaling for the terminal, the network device and the terminal can also have a consistent understanding of the transmission power of uplink channel resources, thereby ensuring normal operation of M-TRP uplink channel transmission. The information used to determine the transmission power of the uplink channel resource may be indicated by the network device in various indication ways such as identification information, number and group of the power control parameters, and power control parameter set indication information, which are flexible and highly operable.

Figure 4:
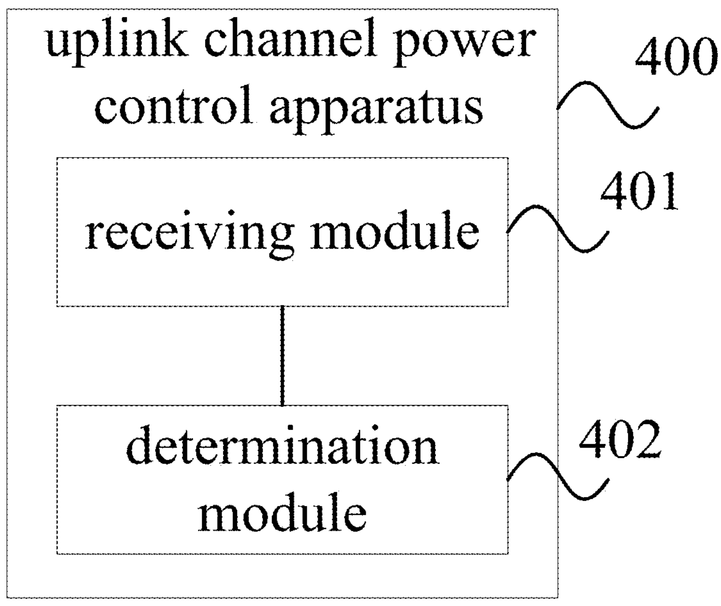
FIG. 4 is a schematic block diagram of an uplink channel power control apparatus applied to a terminal according to an embodiment of the present disclosure.

Referring to FIG. 4, one embodiment of the present disclosure further provides an uplink channel power control apparatus 400, which is applied to a terminal. The apparatus includes:

a receiving module 401 configured to receive a first target signaling; where the first target signaling indicates information used to determine a transmission power of an uplink channel resource; the information, which is used to determine the transmission power of the uplink channel resource and is indicated by the first target signaling, includes at least one of power control parameter indication information and power control parameter set indication information;

a determination module 402 configured to determine the transmission power of the uplink channel resource according to the first target signaling.

In the uplink channel power control apparatus of the embodiment of the present disclosure, the network device uses the first target signaling to dynamically indicate the information used to determine the transmission power of the uplink channel resource, and the terminal can determine the transmission power of the uplink channel resource based on the information dynamically indicated by the first target signaling, so that in case that the network device does not configure the spatial setup signaling for the terminal, the network device and the terminal can also have a consistent understanding of the transmission power of uplink channel resources, thereby ensuring normal operation of M-TRP uplink channel transmission.

Optionally, the power control parameter indication information may indicate at least one power control parameter through at least one of the following: identification information of a power control parameter, the number of power control parameters and groups of power control parameters.

Optionally, the power control parameter set indication information may indicate at least one power control parameter set through at least one of the following: identification information of a power control parameter set, the number of power control parameter sets and groups of power control parameter sets.

Optionally, the determination module 402 includes:

a first determination submodule configured to determine a first power control parameter based on first preset information;

a second determination submodule configured to determine a transmission power of a first repetition of the uplink channel resource by using the first power control parameter.

Optionally, the first preset information includes any one of a default power control parameter, a value of an identifier of a power control parameter, a size of a value of an identifier of a power control parameter, an information field of a first target signaling, a sequence of power control parameters indicated by a first target signaling and a code sequence corresponding to power control parameters indicated by a first target signaling; and/or, a valid state of a power control parameter indicated by a first target signaling; and/or, sorting of groups of power control parameters; and/or, the first preset information includes any one of a default power control parameter set, a value of an identifier of a power control parameter set, a size of a value of an identifier of a power control parameter set, a sequence of power control parameter sets indicated by a first target signaling and a code sequence corresponding to power control parameter sets indicated by a first target signaling; and/or, a valid state of a power control parameter set indicated by a first target signaling; and/or, sorting of groups of power control parameter sets.

Optionally, the power control parameter indication information indicates multiple types of power control parameters, or, the power control parameter set indicated by the power control parameter set indication information is a power control parameter set including multiple types of power control parameters.

The first determination submodule includes:

a first determination unit configured to determine first power control parameters corresponding to different types of power control parameters, by using the same or different preset indicators.

Optionally, the determination module 402 is specifically configured for any one of the following:

according to information of a corresponding relationship between repetitions of the uplink channel resource and identification information or group of power control parameters, which is indicated by the first target signaling or the second target signaling, determining power control parameters used to determine the transmission power of the first repetition of the uplink channel resource;

according to information of a corresponding relationship between repetitions of the uplink channel resource and identification information or group of power control parameter sets, which is indicated by the first target signaling or the second target signaling, determining power control parameters used to determine the transmission power of the first repetition of the uplink channel resource;

where the second target signaling is different from the first target signaling.

Optionally, the information, which is used to determine the transmission power of the uplink channel resource and is indicated by the first target signaling, includes power control parameter indication information. The first target signaling indicates at least one power control parameter from any one of the following items:

default power control parameters in the power control parameter configuration of the uplink channel resource;

at least one power control parameter at first N positions or last N positions in the power control parameter configuration of the uplink channel resource;

where N is an integer greater than or equal to 1, and the power control parameters are sorted according to sizes of values of identifiers or according to configuration sequence;

default power control parameters in a power control parameter set included in the power control parameter configuration;

at least one power control parameter at first M positions or last M positions in a power control parameter set included in the power control parameter configuration of the uplink channel resource; where M is an integer greater than or equal to 1, and the power control parameters are sorted according to sizes of values of identifiers or according to configuration sequence.

Optionally, the information, which is used to determine the transmission power of the uplink channel resource and is indicated by the first target signaling, includes power control parameter set indication information, the first target signaling indicates at least one power control parameter set from a power control parameter set included in the power control parameter configuration of the uplink channel resource; and the step of determining the transmission power of the uplink channel resource according to the first target signaling, includes: determining the transmission power of the uplink channel resource according to the default power control parameters in the indicated power control parameter set; or, the first target signaling indicates at least one power control parameter set from a power control parameter set included in the power control parameter configuration of the uplink channel resource; and the step of determining the transmission power of the uplink channel resource according to the first target signaling, includes: determining the transmission power of the uplink channel resource according to power control parameters at first P positions or last P positions in the indicated power control parameter sets; where P is an integer greater than or equal to 1, and the power control parameters are sorted according to sizes of values of identifiers or according to configuration sequence; or, the first target signaling indicates at least one power control parameter set from a default power control parameter set included in the power control parameter configuration of the uplink channel resource; and the step of determining the transmission power of the uplink channel resource according to the first target signaling, includes: determining the transmission power of the uplink channel resource according to default power control parameters in the indicated power control parameter sets; or, the first target signaling indicates at least one power control parameter set from power control parameter sets at first Q positions or last Q positions in the power control parameter configuration of the uplink channel resource; and the step of determining the transmission power of the uplink channel resource according to the first target signaling, includes: determining the transmission power of the uplink channel resource according to default power control parameters in the indicated power control parameter sets; where Q is an integer greater than or equal to 1, and the power control parameter sets are sorted according to sizes of values of identifiers or according to configuration sequence.

Optionally, the information, which is used to determine the transmission power of the uplink channel resource and is indicated by the first target signaling, includes power control parameter indication information; the power control parameter indication information indicates at least one power control parameter through the number of the power control parameters; the determination module 402 is specifically configured to determine the number of power control parameters used to determine the transmission power of the uplink channel resource according to the number indicated by the power control parameter indication information; or, the information, which is used to determine the transmission power of the uplink channel resource and is indicated by the first target signaling, includes power control parameter set indication information; the power control parameter set indication information indicates at least one power control parameter set through the number of the power control parameter sets; the determination module 402 is specifically configured to determine the number of power control parameter sets used to determine the transmission power of the uplink channel resource according to the number indicated by the power control parameter set indication information; or, the information, which is used to determine the transmission power of the uplink channel resource and is indicated by the first target signaling, includes power control parameter indication information; the power control parameter indication information indicates at least one group of power control parameters through the groups of the power control parameters; the determination module 402 is specifically configured to determine power control parameters used to determine the transmission power of the uplink channel resource in the groups of power control parameters indicated by the power control parameter indication information; or, the information, which is used to determine the transmission power of the uplink channel resource and is indicated by the first target signaling, includes power control parameter set indication information; the power control parameter set indication information indicates at least one group of power control parameter sets through the groups of the power control parameter sets; the determination module 402 is specifically configured to determine power control parameter sets used to determine the transmission power of the uplink channel resource in the groups of power control parameter sets indicated by the power control parameter set indication information.

Optionally, the first determination submodule is specifically configured for any one of the following:

determining the first power control parameter according to a power control parameter with an identifier whose value is a first preset value;

determining the first power control parameter according to power control parameters in a power control parameter set with an identifier whose value is a second preset value;

determining the first power control parameter according to a power control parameter with an identifier whose value is of a size at a first preset level;

determining the first power control parameter according to a power control parameter in a power control parameter set with an identifier whose value is of a size at a second preset level;

where the size of the value of the identifier at the first preset level or the size of the value of the identifier at the second preset level includes any one of the following: a size of a value of an identifier is the smallest, a size of a value of an identifier is the largest, a size of a value of an identifier is at an intermediate value.

Optionally, the first determination submodule is specifically configured to:

determine the first power control parameter according to a power control parameter indicated by an information field at a first preset position according to sequence of multiple information fields for indicating power control parameters in the first target signaling; or, determine the first power control parameter according to a power control parameter in a power control parameter set indicated by an information field at a second preset position according to sequence of multiple information fields for indicating power control parameter sets in the first target signaling;

where the information field at the first preset position or the information field at the second preset position includes any one of the following: a first information field, a last information field, and an information field at a middle position.

Optionally, the first determination submodule is specifically configured to:

determine the first power control parameter according to a power control parameter at a third preset position according to sequence of valid power control parameters indicated by the first target signaling; or, determine the first power control parameter according to a power control parameter in a power control parameter set at a fourth preset position according to sequence of valid power control parameter sets indicated by the first target signaling;

where the third preset position or the fourth preset position includes any one of the following: a first valid position, a last valid position, and a middle valid position.

Optionally, the first determination submodule is specifically configured to:

determine the first power control parameter according to a power control parameter at a fifth preset position in power control parameters indicated by the first target signaling; or, determine the first power control parameter according to a power control parameter in a power control parameter set at a sixth preset position in power control parameters indicated by the first target signaling;

where the fifth preset position or the sixth preset position includes any one of the following: a first position, a last position, and a position in the middle.

Optionally, the first determination submodule is specifically configured to:

determine the first power control parameter according to a power control parameter corresponding to a code at a seventh preset position in a code sequence corresponding to the power control parameters indicated by the first target signaling; or, determine the first power control parameter according to a power control parameter corresponding to a code at an eighth preset position in a code sequence corresponding to the power control parameter sets indicated by the first target signaling;

where the seventh preset position or the eighth preset position includes any one of the following: most significant bit (MSB) and least significant bit (LSB).

Optionally, the first determination submodule is specifically configured to:

determine the first power control parameter according to a power control parameter in a group at a ninth preset position according to sequence of multiple groups of power control parameters of the uplink channel resource; or, determine the first power control parameter according to a power control parameter in a group of power control parameter set at a tenth preset position according to sequence of multiple groups of power control parameter sets of the uplink channel resource;

where the group at a ninth preset position or the group at a tenth preset position includes any one of the following: a first group, a last group, and a group in a middle position.

Optionally, the first target signaling is medium access control-control element (MAC-CE) signaling or downlink control information (DCI).

Optionally, the MAC-CE is MAC-CE signaling used to indicate spatial relation information of the uplink channel resource. The MAC-CE includes information of whether a spatial reference signal indicated by the spatial relation information is invalid.

Optionally, the second target signaling may be downlink control information (DCI); and a transmit power control (TPC) field of DCI can be used to indicate information of a corresponding relationship between the repetition of the uplink channel resource and the identification information or group of power control parameters, or information of a corresponding relationship between the repetition of the uplink channel resource and the identification information or group of power control parameter sets.

Optionally, the determination module 402 is specifically configured to, when the first target signaling carries identifiers of one or more uplink channel resources, determine a transmission power of any uplink channel resource whose identifier is carried in the first target signaling, according to the first target signaling.

Optionally, the determination module 402 is specifically configured to, enable one repetition belonging to the same group as the first repetition to use the same power control parameters as the first repetition;

enable one repetition that does not belong to the same group as the first repetition to use power control parameters different from those of the first repetition.

Optionally, the uplink channel resource is an uplink shared channel (PUSCH) resource, and the first repetition is a nominal repetition with an earliest transmission moment; or, the uplink channel resource is an uplink control channel (PUCCH) resource, and the first repetition is an actual repetition with an earliest transmission moment, or the first repetition is a repetition opportunity with an earliest transmission moment.

In the uplink channel power control apparatus according to the embodiment of the present disclosure, the network device uses the first target signaling to dynamically indicate the information used to determine the transmission power of the uplink channel resource. The terminal can determine the transmission power of the uplink channel resource based on the information dynamically indicated by the first target signaling, so that in case that the network device does not configure the spatial setup signaling for the terminal, the network device and the terminal can also have a consistent understanding of the transmission power of uplink channel resources, thereby ensuring normal operation of M-TRP uplink channel transmission. The terminal can determine the transmission power based on various ways such as the identification information, number, group of the power control parameters, and indication information of the power control parameter set, which is flexible and highly operable.

Figure 5:
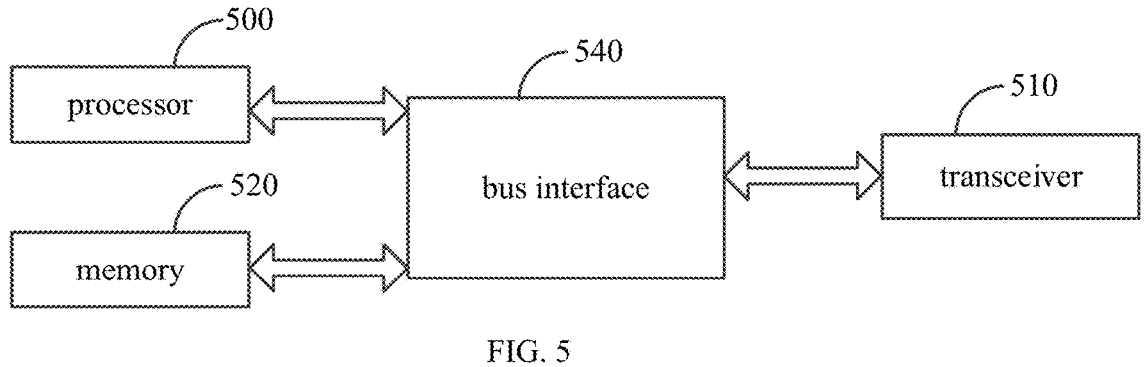
FIG. 5 is a schematic block diagram of a network device according to an embodiment of the present disclosure.

Referring to FIG. 5, one embodiment of the present disclosure provides a network device, which includes a memory 520, a transceiver 510, and a processor 500.

The memory 520 is configured to store a computer program. The transceiver 510 is configured to transmit and receive data under the control of the processor 500. The processor 500 is configured to read the computer program in the memory 520 and perform the following operations:

indicating information used to determine a transmission power of an uplink channel resource, by using a first target signaling; where the information, which is used to determine the transmission power of the uplink channel resource and is indicated by the first target signaling, includes at least one of power control parameter indication information and power control parameter set indication information;

transmitting the first target signaling to a terminal, where the first target signaling is used by the terminal to determine the transmission power of the uplink channel resource.

Optionally, the power control parameter indication information may indicate at least one power control parameter through at least one of the following: identification information of a power control parameter, the number of power control parameters and groups of power control parameters.

Optionally, the power control parameter set indication information may indicate at least one power control parameter set through at least one of the following: identification information of a power control parameter set, the number of power control parameter sets and groups of power control parameter sets.

Optionally, a power control parameter used to determine a transmission power of a first repetition of the uplink channel resource is a first power control parameter, and the first power control parameter is a power control parameter determined based on first preset information.

Optionally, the first preset information includes any one of a default power control parameter, a value of an identifier of a power control parameter, a size of a value of an identifier of a power control parameter, an information field of a first target signaling, a sequence of power control parameters indicated by a first target signaling and a code sequence corresponding to power control parameters indicated by a first target signaling; and/or, a valid state of a power control parameter indicated by a first target signaling; and/or, sorting of groups of power control parameters; and/or, the first preset information includes any one of a default power control parameter set, a value of an identifier of a power control parameter set, a size of a value of an identifier of a power control parameter set, a sequence of power control parameter sets indicated by a first target signaling and a code sequence corresponding to power control parameter sets indicated by a first target signaling; and/or, a valid state of a power control parameter set indicated by a first target signaling; and/or, sorting of groups of power control parameter sets.

Optionally, the power control parameter indication information indicates multiple types of power control parameters, or, the power control parameter set indicated by the power control parameter set indication information is a power control parameter set including multiple types of power control parameters. The first power control parameters, which are corresponding to different types of power control parameters, are determined by using the same or different first preset information.

Optionally, the processor 500 is further configured for any one of the following:

indicating through a second target signaling, information of a corresponding relationship between repetitions of the uplink channel resource and identification information or group of power control parameters;

indicating through a second target signaling, information of a corresponding relationship between repetitions of the uplink channel resource and identification information or group of power control parameter sets;

using the first target signaling to carry information of a corresponding relationship between repetitions of the uplink channel resource and identification information or group of power control parameters;

using the first target signaling to carry information of a corresponding relationship between repetitions of the uplink channel resource and identification information or group of power control parameter sets;

where the second target signaling is different from the first target signaling.

Optionally, the information, which is used to determine the transmission power of the uplink channel resource and is indicated by the first target signaling, includes power control parameter indication information; and the processor 500 is further configured for any one of the following:

using the first target signaling to indicate at least one power control parameter from a default power control parameter in the power control parameter configuration of the uplink channel resource;

using the first target signaling to indicate at least one power control parameter from at least one power control parameter at first N positions or last N positions in the power control parameter configuration of the uplink channel resource; where N is an integer greater than or equal to 1, and the power control parameters are sorted according to sizes of values of identifiers or according to configuration sequence;

using the first target signaling to indicate at least one power control parameter from a default power control parameter in a power control parameter set included in the power control parameter configuration;

using the first target signaling to indicate at least one power control parameter from at least one power control parameter at first M positions or last M positions in a power control parameter set included in the power control parameter configuration of the uplink channel resource; where M is an integer greater than or equal to 1, and the power control parameters are sorted according to sizes of values of identifiers or according to configuration sequence.

Optionally, the information, which is used to determine the transmission power of the uplink channel resource and is indicated by the first target signaling, includes power control parameter set indication information; and the step of indicating information used to determine a transmission power of an uplink channel resource, by using a first target signaling, includes any one of the following:

using the first target signaling to indicate at least one power control parameter set from a power control parameter set included in the power control parameter configuration of the uplink channel resource; where default power control parameters, which are in the power control parameter sets indicated by the first target signaling, are power control parameters used to determine the transmission power of the uplink channel resource;

using the first target signaling to indicate at least one power control parameter set from a power control parameter set included in the power control parameter configuration of the uplink channel resource; where power control parameters at first P positions or last P positions in the power control parameter sets indicated by the first target signaling are power control parameters used to determine the transmission power of the uplink channel resource, and P is an integer greater than or equal to 1, and the power control parameters are sorted according to sizes of values of identifiers or according to configuration sequence;

using the first target signaling to indicate at least one power control parameter set from a default power control parameter set included in the power control parameter configuration of the uplink channel resource; where default power control parameters in the at least one power control parameter set indicated by the first target signaling are power control parameters used to determine the transmission power of the uplink channel resource;

using the first target signaling to indicate at least one power control parameter set from power control parameter sets at first Q positions or last Q positions in the power control parameter configuration of the uplink channel resource; where default power control parameters, which are in the power control parameter sets indicated by the first target signaling, are power control parameters used to determine the transmission power of the uplink channel resource, and Q is an integer greater than or equal to 1, and the power control parameter sets are sorted according to sizes of values of identifiers or according to configuration sequence.

Optionally, the information, which is used to determine the transmission power of the uplink channel resource and is indicated by the first target signaling, includes power control parameter indication information. The power control parameter indication information indicates at least one power control parameter through the number of the power control parameters. The number of power control parameters used to determine the transmission power of the uplink channel resource is equal to the number indicated by the power control parameter indication information; or, Optionally, the information, which is used to determine the transmission power of the uplink channel resource and is indicated by the first target signaling, includes power control parameter set indication information. The power control parameter set indication information indicates at least one power control parameter set through the number of the power control parameter sets. The number of power control parameter sets used to determine the transmission power of the uplink channel resource is equal to the number indicated by the power control parameter set indication information; or, Optionally, the information, which is used to determine the transmission power of the uplink channel resource and is indicated by the first target signaling, includes power control parameter indication information. The power control parameter indication information indicates at least one group of power control parameters through the groups of the power control parameters. Power control parameters used to determine the transmission power of the uplink channel resource are power control parameters in the groups of power control parameters indicated by the power control parameter indication information; or, Optionally, the information, which is used to determine the transmission power of the uplink channel resource and is indicated by the first target signaling, includes power control parameter set indication information. The power control parameter set indication information indicates at least one group of power control parameter sets through the groups of the power control parameter sets. Power control parameter sets used to determine the transmission power of the uplink channel resource are power control parameter sets in the groups of power control parameter sets indicated by the power control parameter set indication information.

Optionally, the first power control parameter includes any one of the following:

- the first power control parameter is a power control parameter with an identifier whose value is a first preset value;
- the first power control parameter is a power control parameter in a power control parameter set with an identifier whose value is a second preset value;
- the first power control parameter is a power control parameter with an identifier whose value is of a size at a first preset level;
- the first power control parameter is a power control parameter in a power control parameter set with an identifier whose value is of a size at a second preset level;
- where the size of the value of the identifier at the first preset level or the size of the value of the identifier at the second preset level includes any one of the following: a size of a value of an identifier is the smallest, a size of a value of an identifier is the largest, a size of a value of an identifier is at an intermediate value.

Optionally, the first power control parameter is a power control parameter indicated by an information field at a first preset position according to sequence of multiple information fields for indicating power control parameters in the first target signaling; or,

- the first power control parameter is a power control parameter in a power control parameter set indicated by an information field at a second preset position according to sequence of multiple information fields for indicating power control parameter sets in the first target signaling;
- where the information field at the first preset position or the information field at the second preset position includes any one of the following: a first information field, a last information field, and an information field at a middle position.

Optionally, the first power control parameter is a power control parameter at a third preset position according to sequence of valid power control parameters indicated by the first target signaling; or,

- the first power control parameter is a power control parameter in a power control parameter set at a fourth preset position according to sequence of valid power control parameter sets indicated by the first target signaling;
- where the third preset position or the fourth preset position includes any one of the following: a first valid position, a last valid position, and a middle valid position.

Optionally, the first power control parameter is a power control parameter at a fifth preset position in power control parameters indicated by the first target signaling; or,

- the first power control parameter is a power control parameter in a power control parameter set at a sixth preset position in power control parameters indicated by the first target signaling;
- where the fifth preset position or the sixth preset position includes any one of the following: a first position, a last position, and a position in the middle.

Optionally, the first power control parameter is a power control parameter corresponding to a code at a seventh preset position in a code sequence corresponding to the power control parameters indicated by the first target signaling; or,

- the first power control parameter is a power control parameter corresponding to a code at an eighth preset position in a code sequence corresponding to the power control parameter sets indicated by the first target signaling;
- where the seventh preset position or the eighth preset position includes any one of the following: most significant bit (MSB) and least significant bit (LSB).

Optionally, the first power control parameter is a power control parameter in a group at a ninth preset position according to sequence of multiple groups of power control parameters of the uplink channel resource; or,

- the first power control parameter is a power control parameter in a group of power control parameter set at a tenth preset position according to sequence of multiple groups of power control parameter sets of the uplink channel resource;
- where the group at a ninth preset position or the group at a tenth preset position includes any one of the following: a first group, a last group, and a group in a middle position, which are not limited thereto.

Optionally, the first target signaling includes an information field used to indicate power control parameters and/or power control parameter sets, where the information field is greater than or equal to $\lceil \log_2(2^K-1) \rceil$ bit, and K is the number of power control parameters or power control parameter sets indicated by the first target signaling.

Optionally, the first target signaling includes an information field used to indicate power control parameters and/or power control parameter sets. The information field also indicates a sequence of the power control parameters and/or the power control parameter sets. The information field is greater than or equal to $$\left\lceil \log_2\left(\sum_{k=1}^{K} A_K^k\right) \right\rceil$$

bit, and K is the number of power control parameters or power control parameter sets indicated by the first target signaling, and $$A_K^k$$

represents the number of permutations and combination for selecting k numbers from K numbers.

Optionally, the first target signaling includes one or more information fields used to indicate power control parameters and/or power control parameter sets. At least part of the information fields are provided with indication information for indicating whether power control parameters and/or power control parameter sets corresponding to the information fields are valid.

Optionally, the processor 500 is further configured to configure at least one group of common power control parameters applicable to all dedicated uplink channel resources; or, configure at least one group of common power control parameters applicable to all dedicated uplink channel resources, and configure, for the uplink channel resources, at least one group of dedicated power control parameters dedicated to the uplink channel resources.

Optionally, when configuring at least one group of common power control parameters and configuring at least one group of dedicated power control parameters, the processor 500 is specifically configured to indicate information for determining the transmission power of the uplink channel resource from the common power control parameters and the dedicated power control parameters, by using the first target signaling.

Optionally, the first target signaling is medium access control-control element (MAC-CE) signaling or downlink control information (DCI).

Optionally, the MAC-CE is MAC-CE signaling used to indicate spatial relation information of the uplink channel resource. The MAC-CE includes information of whether a spatial reference signal indicated by the spatial relation information is invalid.

Optionally, the second target signaling may be downlink control information (DCI); and a transmit power control (TPC) field of DCI can be used to indicate information of a corresponding relationship between the repetition of the uplink channel resource and the identification information or group of power control parameters, or information of a corresponding relationship between the repetition of the uplink channel resource and the identification information or group of power control parameter sets.

Optionally, the processor 500 is further configured to carry identifiers of one or more uplink channel resources in the first target signaling, where the information used for determining the transmission power of the uplink channel resource indicated in the first target signaling is applicable to any uplink channel resource whose identifier is carried in the first target signaling.

Optionally, the processor 500 is further configured to group uplink channel resources of the terminal; for any group of uplink channel resources, use the first target signaling to indicate information used for determining transmission power of the uplink channel resources from power control configuration pre-configured for the group of uplink channel resources.

Optionally, one repetition belonging to the same group as the first repetition can use the same power control parameters as the first repetition;

one repetition that does not belong to the same group as the first repetition can use power control parameters different from those of the first repetition.

Optionally, the uplink channel resource is an uplink shared channel (PUSCH) resource, and the first repetition is a nominal repetition with an earliest transmission moment; or, the uplink channel resource is an uplink control channel (PUCCH) resource, and the first repetition is an actual repetition with an earliest transmission moment, or the first repetition is a repetition opportunity with an earliest transmission moment.

In FIG. 5, a bus architecture may include any number of interconnected bus and bridge. Specifically, various circuits of one or more processors, which are represented by the processor 500, and one or more memories, which are represented by the memory 520, are linked together. The bus architecture may link various other circuits, such as a peripheral device, voltage regulator and a power management circuit together. These features are well known in this field; therefore, this disclosure does not make further description on these features. The bus interface 540 provides an interface. The transceiver 510 may be multiple elements, including a transmitter and a receiver and provide units, which communicate with other devices on the transmission medium. The transmission medium includes wireless channels, wired channels, and optical cables. The processor 500 is responsible for managing the bus architecture and the normal processing. The memory 520 may be used to store data used by the processor 500 for performing operations.

Optionally, the processor 500 may be a central processing unit (CPU), an application specific integrated circuit (ASIC), a field-programmable gate array (FPGA) or a complex programmable logic device (CPLD). The processor may also adopt multi-core architecture.

In the embodiment of the present disclosure, the first target signaling is used to dynamically indicate the information used to determine the transmission power of the uplink channel resource, so that in case that the network device does not configure the spatial setup signaling for the terminal, the network device and the terminal can also have a consistent understanding of the transmission power of uplink channel resources, thereby ensuring normal operation of M-TRP uplink channel transmission. The information used to determine the transmission power of the uplink channel resource may be indicated by the network device in various indication ways such as identification information, number and group of the power control parameters, and power control parameter set indication information, which are flexible and highly operable.

Figure 6:
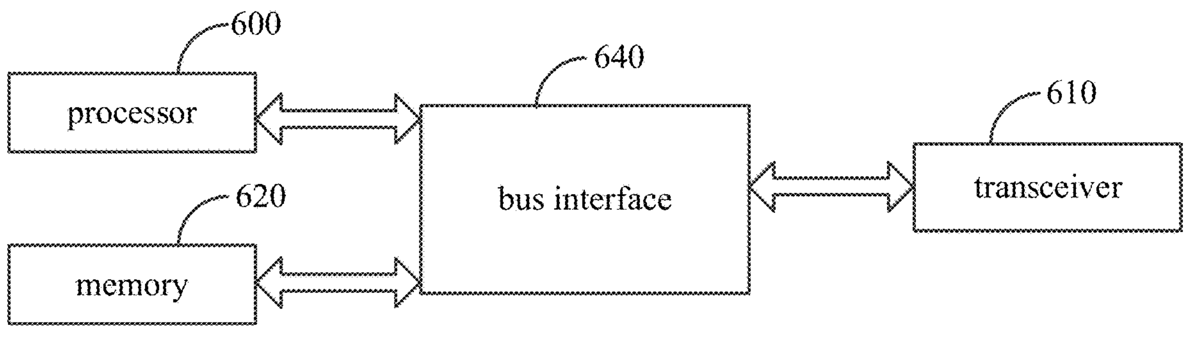
FIG. 6 is a schematic block diagram of a terminal according to an embodiment of the present disclosure.

Referring to FIG. 6, one embodiment of the present disclosure provides a terminal, which includes a memory 620, a transceiver 610, and a processor 600.

The memory 620 is configured to store a computer program. The transceiver 610 is configured to transmit and receive data under the control of the processor 600. The processor 600 is configured to read the computer program in the memory 620 and perform the following operations:

receiving a first target signaling; where the first target signaling indicates information used to determine a transmission power of an uplink channel resource; the information, which is used to determine the transmission power of the uplink channel resource and is indicated by the first target signaling, includes at least one of power control parameter indication information and power control parameter set indication information;

determining the transmission power of the uplink channel resource according to the first target signaling.

Optionally, the power control parameter indication information may indicate at least one power control parameter through at least one of the following: identification information of a power control parameter, the number of power control parameters and groups of power control parameters.

Optionally, the power control parameter set indication information may indicate at least one power control parameter set through at least one of the following: identification information of a power control parameter set, the number of power control parameter sets and groups of power control parameter sets.

Optionally, the processor 600 is further configured to determine a first power control parameter based on first preset information; and determine a transmission power of a first repetition of the uplink channel resource by using the first power control parameter.

Optionally, the first preset information includes any one of a default power control parameter, a value of an identifier of a power control parameter, a size of a value of an identifier of a power control parameter, an information field of a first target signaling, a sequence of power control parameters indicated by a first target signaling and a code sequence corresponding to power control parameters indicated by a first target signaling; and/or, a valid state of a power control parameter indicated by a first target signaling; and/or, sorting of groups of power control parameters; and/or, the first preset information includes any one of a default power control parameter set, a value of an identifier of a power control parameter set, a size of a value of an identifier of a power control parameter set, a sequence of power control parameter sets indicated by a first target signaling and a code sequence corresponding to power control parameter sets indicated by a first target signaling; and/or, a valid state of a power control parameter set indicated by a first target signaling; and/or, sorting of groups of power control parameter sets.

Optionally, the power control parameter indication information indicates multiple types of power control parameters, or, the power control parameter set indicated by the power control parameter set indication information is a power control parameter set including multiple types of power control parameters. The processor 600 is further configured to determine first power control parameters corresponding to different types of power control parameters, by using the same or different preset indicators.

Optionally, the processor 600 is specifically configured for any one of the following:

according to information of a corresponding relationship between repetitions of the uplink channel resource and identification information or group of power control parameters, which is indicated by the first target signaling or the second target signaling, determining power control parameters used to determine the transmission power of the first repetition of the uplink channel resource;

according to information of a corresponding relationship between repetitions of the uplink channel resource and identification information or group of power control parameter sets, which is indicated by the first target signaling or the second target signaling, determining power control parameters used to determine the transmission power of the first repetition of the uplink channel resource;

where the second target signaling is different from the first target signaling.

Optionally, the information, which is used to determine the transmission power of the uplink channel resource and is indicated by the first target signaling, includes power control parameter indication information. The first target signaling indicates at least one power control parameter from any one of the following items:

default power control parameters in the power control parameter configuration of the uplink channel resource;

at least one power control parameter at first N positions or last N positions in the power control parameter configuration of the uplink channel resource;

where N is an integer greater than or equal to 1, and the power control parameters are sorted according to sizes of values of identifiers or according to configuration sequence;

default power control parameters in a power control parameter set included in the power control parameter configuration;

at least one power control parameter at first M positions or last M positions in a power control parameter set included in the power control parameter configuration of the uplink channel resource; where M is an integer greater than or equal to 1, and the power control parameters are sorted according to sizes of values of identifiers or according to configuration sequence.

Optionally, the information, which is used to determine the transmission power of the uplink channel resource and is indicated by the first target signaling, includes power control parameter set indication information, the first target signaling indicates at least one power control parameter set from a power control parameter set included in the power control parameter configuration of the uplink channel resource; and the step of determining the transmission power of the uplink channel resource according to the first target signaling, includes: determining the transmission power of the uplink channel resource according to the default power control parameters in the indicated power control parameter set; or, the first target signaling indicates at least one power control parameter set from a power control parameter set included in the power control parameter configuration of the uplink channel resource; and the step of determining the transmission power of the uplink channel resource according to the first target signaling, includes: determining the transmission power of the uplink channel resource according to power control parameters at first P positions or last P positions in the indicated power control parameter sets; where P is an integer greater than or equal to 1, and the power control parameters are sorted according to sizes of values of identifiers or according to configuration sequence; or, the first target signaling indicates at least one power control parameter set from a default power control parameter set included in the power control parameter configuration of the uplink channel resource; and the step of determining the transmission power of the uplink channel resource according to the first target signaling, includes: determining the transmission power of the uplink channel resource according to default power control parameters in the indicated power control parameter sets; or, the first target signaling indicates at least one power control parameter set from power control parameter sets at first Q positions or last Q positions in the power control parameter configuration of the uplink channel resource; and the step of determining the transmission power of the uplink channel resource according to the first target signaling, includes: determining the transmission power of the uplink channel resource according to default power control parameters in the indicated power control parameter sets; where Q is an integer greater than or equal to 1, and the power control parameter sets are sorted according to sizes of values of identifiers or according to configuration sequence.

Optionally, the information, which is used to determine the transmission power of the uplink channel resource and is indicated by the first target signaling, includes power control parameter indication information; the power control parameter indication information indicates at least one power control parameter through the number of the power control parameters; the processor 600 is specifically configured to determine the number of power control parameter sets used to determine the transmission power of the uplink channel resource according to the number indicated by the power control parameter indication information; or, the information, which is used to determine the transmission power of the uplink channel resource and is indicated by the first target signaling, includes power control parameter set indication information; the power control parameter set indication information indicates at least one power control parameter set through the number of the power control parameter sets; the processor 600 is specifically configured to determine the number of power control parameter sets used to determine the transmission power of the uplink channel resource according to the number indicated by the power control parameter set indication information; or, the information, which is used to determine the transmission power of the uplink channel resource and is indicated by the first target signaling, includes power control parameter indication information; the power control parameter indication information indicates at least one group of power control parameters through the groups of the power control parameters; the processor 600 is specifically configured to determine power control parameters used to determine the transmission power of the uplink channel resource in the groups of power control parameters indicated by the power control parameter indication information; or, the information, which is used to determine the transmission power of the uplink channel resource and is indicated by the first target signaling, includes power control parameter set indication information; the power control parameter set indication information indicates at least one group of power control parameter sets through the groups of the power control parameter sets; the processor 600 is specifically configured to determine power control parameter sets used to determine the transmission power of the uplink channel resource in the groups of power control parameter sets indicated by the power control parameter set indication information.

Optionally, the first determination submodule is specifically configured for any one of the following:

determining the first power control parameter according to a power control parameter with an identifier whose value is a first preset value;

determining the first power control parameter according to power control parameters in a power control parameter set with an identifier whose value is a second preset value;

determining the first power control parameter according to a power control parameter with an identifier whose value is of a size at a first preset level;

determining the first power control parameter according to a power control parameter in a power control parameter set with an identifier whose value is of a size at a second preset level;

where the size of the value of the identifier at the first preset level or the size of the value of the identifier at the second preset level includes any one of the following: a size of a value of an identifier is the smallest, a size of a value of an identifier is the largest, a size of a value of an identifier is at an intermediate value.

Optionally, the first determination submodule is specifically configured to:

determine the first power control parameter according to a power control parameter indicated by an information field at a first preset position according to sequence of multiple information fields for indicating power control parameters in the first target signaling; or, determine the first power control parameter according to a power control parameter in a power control parameter set indicated by an information field at a second preset position according to sequence of multiple information fields for indicating power control parameter sets in the first target signaling;

where the information field at the first preset position or the information field at the second preset position includes any one of the following: a first information field, a last information field, and an information field at a middle position.

Optionally, the first determination submodule is specifically configured to:

determine the first power control parameter according to a power control parameter at a third preset position according to sequence of valid power control parameters indicated by the first target signaling; or, determine the first power control parameter according to a power control parameter in a power control parameter set at a fourth preset position according to sequence of valid power control parameter sets indicated by the first target signaling;

where the third preset position or the fourth preset position includes any one of the following: a first valid position, a last valid position, and a middle valid position.

Optionally, the first determination submodule is specifically configured to:

determine the first power control parameter according to a power control parameter at a fifth preset position in power control parameters indicated by the first target signaling; or, determine the first power control parameter according to a power control parameter in a power control parameter set at a sixth preset position in power control parameters indicated by the first target signaling;

where the fifth preset position or the sixth preset position includes any one of the following: a first position, a last position, and a position in the middle.

Optionally, the first determination submodule is specifically configured to:

determine the first power control parameter according to a power control parameter corresponding to a code at a seventh preset position in a code sequence corresponding to the power control parameters indicated by the first target signaling; or, determine the first power control parameter according to a power control parameter corresponding to a code at an eighth preset position in a code sequence corresponding to the power control parameter sets indicated by the first target signaling;

where the seventh preset position or the eighth preset position includes any one of the following: most significant bit (MSB) and least significant bit (LSB).

Optionally, the first determination submodule is specifically configured to:

determine the first power control parameter according to a power control parameter in a group at a ninth preset position according to sequence of multiple groups of power control parameters of the uplink channel resource; or, determine the first power control parameter according to a power control parameter in a group of power control parameter set at a tenth preset position according to sequence of multiple groups of power control parameter sets of the uplink channel resource;

where the group at a ninth preset position or the group at a tenth preset position includes any one of the following: a first group, a last group, and a group in a middle position.

Optionally, the first target signaling is medium access control-control element (MAC-CE) signaling or downlink control information (DCI).

Optionally, the MAC-CE is MAC-CE signaling used to indicate spatial relation information of the uplink channel resource. The MAC-CE includes information of whether a spatial reference signal indicated by the spatial relation information is invalid.

Optionally, the second target signaling may be downlink control information (DCI); and a transmit power control (TPC) field of DCI can be used to indicate information of a corresponding relationship between the repetition of the uplink channel resource and the identification information or group of power control parameters, or information of a corresponding relationship between the repetition of the uplink channel resource and the identification information or group of power control parameter sets.

Optionally, the processor 600 is specifically configured to, when the first target signaling carries identifiers of one or more uplink channel resources, determine a transmission power of any uplink channel resource whose identifier is carried in the first target signaling, according to the first target signaling.

Optionally, the processor 600 is specifically configured to, enable one repetition belonging to the same group as the first repetition to use the same power control parameters as the first repetition; enable one repetition that does not belong to the same group as the first repetition to use power control parameters different from those of the first repetition.

Optionally, the uplink channel resource is an uplink shared channel (PUSCH) resource, and the first repetition is a nominal repetition with an earliest transmission moment; or, the uplink channel resource is an uplink control channel (PUCCH) resource, and the first repetition is an actual repetition with an earliest transmission moment, or the first repetition is a repetition opportunity with an earliest transmission moment.

In FIG. 6, a bus architecture may include any number of interconnected bus and bridge. Specifically, various circuits of one or more processors, which are represented by the processor 600, and one or more memories, which are represented by the memory 620, are linked together. The bus architecture may link various other circuits, such as a peripheral device, voltage regulator and a power management circuit together. These features are well known in this field; therefore, this disclosure does not make further description on these features. The bus interface 640 provides an interface. The transceiver 610 may be multiple elements, including a transmitter and a receiver and provide units, which communicate with other devices on the transmission medium. The transmission medium includes wireless channels, wired channels, and optical cables. The processor 600 is responsible for managing the bus architecture and the normal processing. The memory 620 may be used to store data used by the processor 600 for performing operations.

Optionally, the processor 600 may be a central processing unit (CPU), an application specific integrated circuit (ASIC), a field-programmable gate array (FPGA) or a complex programmable logic device (CPLD). The processor may also adopt multi-core architecture.

In the embodiment of the present disclosure, the network device uses the first target signaling to dynamically indicate the information used to determine the transmission power of the uplink channel resource. The terminal can determine the transmission power of the uplink channel resource based on the information dynamically indicated by the first target signaling, so that in case that the network device does not configure the spatial setup signaling for the terminal, the network device and the terminal can also have a consistent understanding of the transmission power of uplink channel resources, thereby ensuring normal operation of M-TRP uplink channel transmission. The terminal can determine the transmission power based on various ways such as the identification information, number, group of the power control parameters, and indication information of the power control parameter set, which is flexible and highly operable.

It is to be noted that division of units in the embodiment of the present disclosure is exemplary, and is only a logical function division, and there may be another division manner in actual implementation. In addition, each functional unit in each embodiment of the present application may be integrated into one processing unit, each unit may exist separately physically, or two or more units may be integrated into one unit. The foregoing integrated units may be implemented in the form of hardware or in the form of software functional units.

If the integrated units are realized in the form of software function units and sold or used as independent products, they may be stored in a processor-readable storage medium. Based on this understanding, the essence of the technical solution of the present disclosure or the part that contributes to the related art or the part of the technical solution may be embodied in the form of a software product. The computer software product is stored in a storage medium, includes several instructions which enables a computer device (which may be a personal computer, a server, or a network device, etc.) or a processor to execute all or part of the steps of the methods described in various embodiments of the present disclosure. The storage medium includes various media capable of storing program codes such as U disk, mobile hard disk, ROM, RAM, magnetic disk or optical disk.

It is to be noted that the foregoing apparatus, terminal, and network device provided in the embodiments of the present disclosure can perform all the method steps performed in the foregoing method embodiments, and can achieve the same technical effect. The parts and beneficial effects in this embodiment that are the same as those in the method embodiment will not be described in detail here.

One embodiment of the present disclosure further provides a processor-readable storage medium, which includes a computer program stored thereon. The computer program is used to cause a processor to execute the foregoing uplink channel power control method.

The processor-readable storage medium may be any available medium or data storage device that can be accessed by a processor, including but not limited to magnetic storage (such as floppy disk, hard disk, magnetic tape, magneto-optical disk (MO)), optical storage (such as CD, DVD, BD, HVD), and semiconductor memory (such as ROM, EPROM, EEPROM, non-volatile memory (Nand flash), solid-state drive (SSD)).

Those skilled in the art should understand that the embodiments of the present application may be provided as methods, systems, or computer program products. Accordingly, in this application, an entirely hardware embodiment, an entirely software embodiment, or an embodiment combining software and hardware aspects may be adopted. Further, this application may adopt the form of a computer program product implemented on one or more computer available storage media (including but not limited to disk memory and optical memory) including computer available program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions assigned in one or more work flows in the flow chart and/or one or more blocks in the block diagram.

These processor-executable instructions may also be stored in a processor-readable storage that may guide the computer or the other programmable data process devices to function in a certain way, so that the instructions stored in the processor-readable storage may create a product including an instruction unit which achieves the functions assigned in one or more flows in the flow chart and/or one or more blocks in the block diagram.

These processor-executable instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

The device embodiments described above are only an example. The units described as separate components may or may not be physically separated, and components shown as units may or may not be physical units, that is, they may be located in one place, or may be distributed to multiple network units. Part or all of the units may be selected according to actual needs to achieve the purpose of the solutions of the embodiments of the present disclosure. It can be understood and implemented by those skilled in the art without any creative efforts.

The various embodiments of the present disclosure may be implemented by hardware, or by software modules running on one or more processors, or in a combination thereof. Those skilled in the art should understand that a microprocessor or a digital signal processor (DSP) may be used in practice to implement some or all functions of some or all components in a computing processing device according to the embodiments of the present disclosure. The present disclosure may also be implemented as a device or apparatus program (such as computer program and computer program product) for performing a part or all of the methods described herein. Such a program realizing the present disclosure may be stored on a computer-readable medium, or may have the form of one or more signals. Such a signal may be downloaded from an internet site, or provided on a carrier signal, or provided in any other form.

Figure 7:
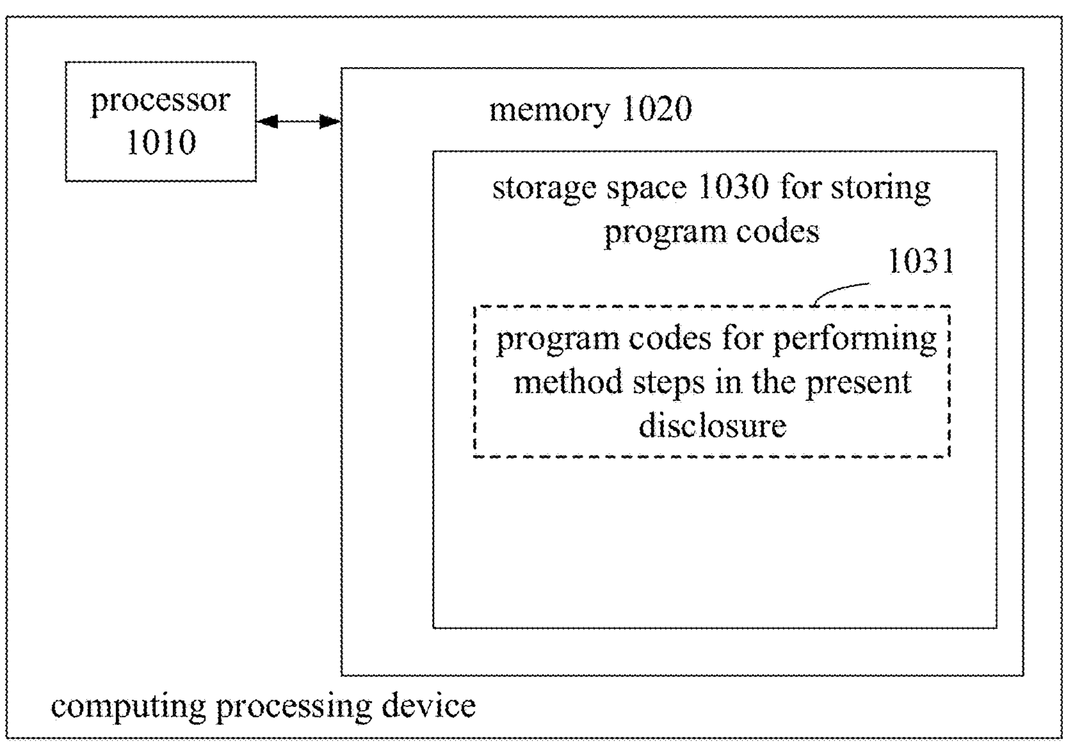
FIG. 7 is a schematic block diagram of a computing processing device for performing a method according to the present disclosure.
Figure 8:
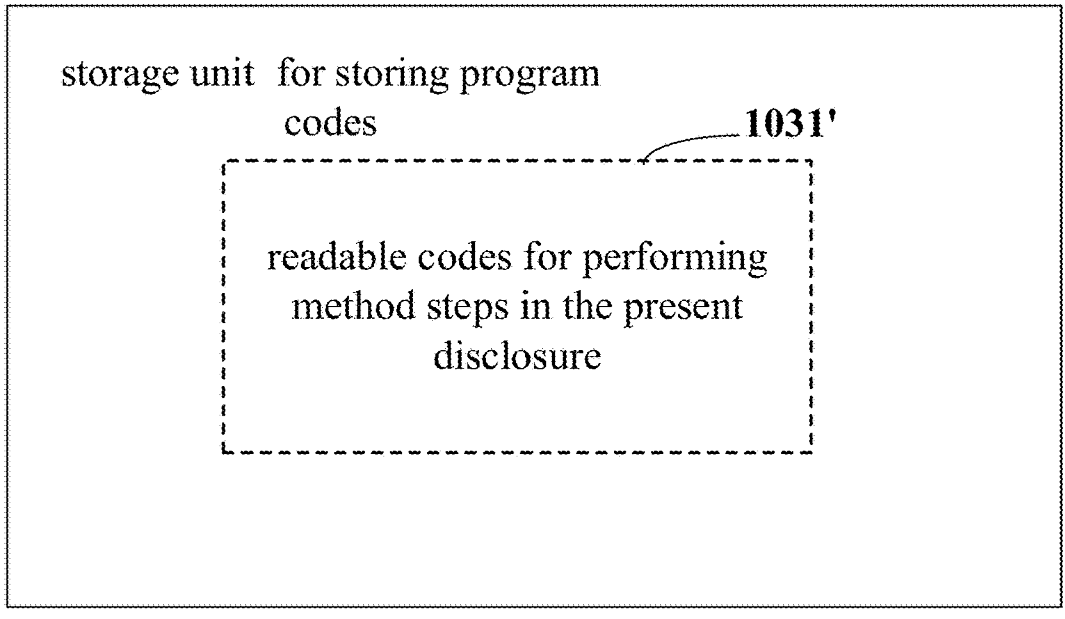
FIG. 8 schematically shows a storage unit for holding or carrying program codes for realizing a method according to the present disclosure.

For example, FIG. 7 shows a computing processing device that can implement methods according to the present disclosure. The computing processing device generally includes a processor 1010 and a computer program product or computer-readable medium in the form of memory 1020. The memory 1020 may be an electronic memory such as flash memory, EEPROM, EPROM, hard disk, or ROM. The memory 1020 has a storage space 1030 for storing program codes 1031 for performing any method steps in the methods described above. For example, the storage space 1030 for storing program codes may include respective program codes 1031 for respectively implementing various steps in the above methods. These program codes may be read from or written into one or more computer program products. These computer program products include program code carriers such as hard disks, compact disks (CDs), memory cards or floppy disks. Such a computer program product is typically a portable or fixed storage unit as shown in FIG. 8. The storage unit may have storage segments, storage spaces, etc. arranged similarly to the memory 1020 in the computing processing device of FIG. 7. The program code can, for example, be compressed in a suitable form. Typically, the storage unit includes computer readable codes 1031', i.e., codes readable by, for example, a processor such as the processor 1010. Theses codes, when executed by the computing processing device, cause the computing processing device to perform the steps of the methods described above.

"One embodiment", "an embodiment", or "one or more embodiments" involved in the present disclosure means that a particular feature, structure, or characteristic described in conjunction with an embodiment is included in at least one embodiment of the present disclosure. Additionally, it is to be noted that examples of the terms "in one embodiment" herein do not necessarily all refer to the same embodiment.

In the description provided herein, numerous specific details are provided. However, it is to be understood that embodiments of the present disclosure may be practiced without these specific details. In some instances, well-known methods, structures and techniques have not been shown in detail, in order not to obscure the understanding of this description.

In the claims, any reference signs placed between parentheses shall not be construed as limiting the claim. The word "comprising" does not exclude the presence of elements or steps not listed in a claim. The word "a" or "an" preceding an element does not exclude the presence of a plurality of such elements. The present disclosure may be implemented by means of hardware including several distinct elements, and by means of a suitably programmed computer. In a unit claim enumerating several devices, several of these devices may be embodied by one hardware. The use of the words such as first, second, and third, does not indicate any order. These words may be interpreted as names.

Finally, it is to be noted that: the above embodiments are only used to illustrate the technical solutions of the present disclosure rather than to limit the present disclosure; although the present disclosure has been described in detail with reference to the foregoing embodiments, persons having ordinary skill in the art may still modify the technical solutions described in the foregoing embodiments, or perform equivalent replacements for some of the technical features; and these modifications or replacements do not make the essence of the corresponding technical solutions deviate from the spirit and scope of the technical solutions of the various embodiments of the present disclosure.

What is claimed is:

1. An uplink channel power control method, performed by a network device, comprising:

indicating information used to determine a transmission power of an uplink channel resource, by using a first target signaling; wherein the information, which is used to determine the transmission power of the uplink channel resource and is indicated by the first target signaling, includes at least one of power control parameter indication information or power control parameter set indication information; and transmitting the first target signaling to a terminal; wherein the first target signaling is used by the terminal to determine the transmission power of the uplink channel resource;

wherein the transmission power of the uplink channel resource includes a transmission power of a first repetition of the uplink channel resource; the transmission power of the first repetition of the uplink channel resource is determined according to a first power control parameter, and the first power control parameter is a power control parameter determined based on first preset information;

wherein the first preset information includes any one of a default power control parameter, a value of an identifier of a power control parameter, a size of a value of an identifier of a power control parameter, an information field of a first target signaling, an order of power control parameters indicated by a first target signaling or a code sequence corresponding to power control parameters indicated by a first target signaling; and/or, a valid state of a power control parameter indicated by a first target signaling; and/or, sorting of groups of power control parameters; and/or, the first preset information includes any one of a default power control parameter set, a value of an identifier of a power control parameter set, a size of a value of an identifier of a power control parameter set, an order of power control parameter sets indicated by a first target signaling or a code sequence corresponding to power control parameter sets indicated by a first target signaling; and/or, a valid state of a power control parameter set indicated by a first target signaling; and/or, sorting of groups of power control parameter sets.

2. The method according to claim 1, wherein the power control parameter indication information indicates at least one power control parameter through at least one of the following: identification information of power control parameters, the number of power control parameters or groups of power control parameters;

and/or, wherein the power control parameter set indication information indicates at least one power control parameter set through at least one of the following:

identification information of power control parameter sets, the number of power control parameter sets or groups of power control parameter sets.

3. The method according to claim 1, wherein the method further includes any one of the following:

indicating through a second target signaling, information of a corresponding relationship between repetitions of the uplink channel resource and identification information or group of power control parameters;

indicating through a second target signaling, information of a corresponding relationship between repetitions of the uplink channel resource and identification information or group of power control parameter sets;

carrying information of a corresponding relationship between repetitions of the uplink channel resource and identification information or group of power control parameters, in the first target signaling; or carrying information of a corresponding relationship between repetitions of the uplink channel resource and identification information or group of power control parameter sets, in the first target signaling;

wherein the second target signaling is different from the first target signaling.

4. The method according to claim 1, wherein the information, which is used to determine the transmission power of the uplink channel resource and is indicated by the first target signaling, includes power control parameter indication information; and the step of indicating information used to determine a transmission power of an uplink channel resource, by using a first target signaling, includes any one of the following:

indicating at least one power control parameter from a default power control parameter in a power control parameter configuration of the uplink channel resource, by using the first target signaling;

indicating at least one power control parameter from at least one power control parameter at first N positions or last N positions in the power control parameter configuration of the uplink channel resource, by using the first target signaling; wherein N is an integer greater than or equal to 1, and the power control parameters are sorted according to sizes of values of identifiers or according to configuration sequence;

indicating at least one power control parameter from a default power control parameter in a power control parameter set included in the power control parameter configuration of the uplink channel resource, by using the first target signaling; or indicating at least one power control parameter from at least one power control parameter at first M positions or last M positions in a power control parameter set included in the power control parameter configuration of the uplink channel resource, by using the first target signaling; wherein M is an integer greater than or equal to 1, and the power control parameters are sorted according to sizes of values of identifiers or according to configuration sequence;

or, wherein the information, which is used to determine the transmission power of the uplink channel resource and is indicated by the first target signaling, includes power control parameter set indication information; and the step of indicating information used to determine a transmission power of an uplink channel resource, by using a first target signaling, includes any one of the following:

indicating at least one power control parameter set from a power control parameter set included in a power control parameter configuration of the uplink channel resource, by using the first target signaling; wherein a default power control parameter, which is in the at least one power control parameter set indicated by the first target signaling, is a power control parameter used to determine the transmission power of the uplink channel resource;

indicating at least one power control parameter set from a power control parameter set included in the power control parameter configuration of the uplink channel resource, by using the first target signaling; wherein power control parameters at first P positions or last P positions in the at least one power control parameter set indicated by the first target signaling are power control parameters used to determine the transmission power of the uplink channel resource, and P is an integer greater than or equal to 1, and the power control parameters are sorted according to sizes of values of identifiers or according to configuration sequence;

indicating at least one power control parameter set from a default power control parameter set included in the power control parameter configuration of the uplink channel resource, by using the first target signaling; wherein a default power control parameter in the at least one power control parameter set indicated by the first target signaling is a power control parameter used to determine the transmission power of the uplink channel resource; or indicating at least one power control parameter set from power control parameter sets at first Q positions or last Q positions in the power control parameter configuration of the uplink channel resource, by using the first target signaling; wherein a default power control parameter, which is in the at least one power control parameter set indicated by the first target signaling, is a power control parameter used to determine the transmission power of the uplink channel resource, and Q is an integer greater than or equal to 1, and the power control parameter sets are sorted according to sizes of values of identifiers or according to configuration sequence;

or, wherein the information, which is used to determine the transmission power of the uplink channel resource and is indicated by the first target signaling, includes power control parameter indication information; the power control parameter indication information indicates at least one power control parameter through the number of the power control parameters; the number of power control parameters used to determine the transmission power of the uplink channel resource is equal to the number indicated by the power control parameter indication information; or, the information, which is used to determine the transmission power of the uplink channel resource and is indicated by the first target signaling, includes power control parameter set indication information; the power control parameter set indication information indicates at least one power control parameter set through the number of the power control parameter sets; the number of power control parameter sets used to determine the transmission power of the uplink channel resource is equal to the number indicated by the power control parameter set indication information; or, the information, which is used to determine the transmission power of the uplink channel resource and is indicated by the first target signaling, includes power control parameter indication information; the power control parameter indication information indicates at least one group of power control parameters through the groups of the power control parameters; power control parameters used to determine the transmission power of the uplink channel resource are power control parameters in the groups of power control parameters indicated by the power control parameter indication information; or, the information, which is used to determine the transmission power of the uplink channel resource and is indicated by the first target signaling, includes power control parameter set indication information; the power control parameter set indication information indicates at least one group of power control parameter sets through the groups of the power control parameter sets; power control parameter sets used to determine the transmission power of the uplink channel resource are power control parameter sets in the groups of power control parameter sets indicated by the power control parameter set indication information.

5. The method according to claim 2, wherein the first power control parameter includes any one of the following:

the first power control parameter is a power control parameter with an identifier whose value is a first preset value;

the first power control parameter is a power control parameter in a power control parameter set with an identifier whose value is a second preset value;

the first power control parameter is a power control parameter with an identifier whose value is of a size at a first preset level; or the first power control parameter is a power control parameter in a power control parameter set with an identifier whose value is of a size at a second preset level;

wherein the size of the value of the identifier at the first preset level or the size of the value of the identifier at the second preset level includes any one of the following: a size of a value of an identifier is the smallest, a size of a value of an identifier is the largest, or a size of a value of an identifier is at an intermediate value;

or, wherein the first power control parameter is a power control parameter indicated by an information field at a first preset position according to orders of multiple information fields for indicating power control parameters in the first target signaling; or, the first power control parameter is a power control parameter in a power control parameter set indicated by an information field at a second preset position according to orders of multiple information fields for indicating power control parameter sets in the first target signaling;

wherein the information field at the first preset position or the information field at the second preset position includes any one of the following: a first information field, a last information field, or an information field at a middle position;

or, wherein the first power control parameter is a power control parameter at a third preset position according to orders of valid power control parameters indicated by the first target signaling; or, the first power control parameter is a power control parameter in a power control parameter set at a fourth preset position according to orders of valid power control parameter sets indicated by the first target signaling;

wherein the third preset position or the fourth preset position includes any one of the following: a first valid position, a last valid position, or a middle valid position;

or, wherein the first power control parameter is a power control parameter at a fifth preset position in power control parameters indicated by the first target signaling; or, the first power control parameter is a power control parameter in a power control parameter set at a sixth preset position in power control parameters indicated by the first target signaling;

wherein the fifth preset position or the sixth preset position includes any one of the following: a first position, a last position, or a position in the middle;

or, wherein the first power control parameter is a power control parameter corresponding to a code at a seventh preset position in a code sequence corresponding to the power control parameters indicated by the first target signaling; or, the first power control parameter is a power control parameter corresponding to a code at an eighth preset position in a code sequence corresponding to the power control parameter sets indicated by the first target signaling;

wherein the seventh preset position or the eighth preset position includes any one of the following: most significant bit (MSB) or least significant bit (LSB);

or, wherein the first power control parameter is a power control parameter in a group at a ninth preset position according to orders of multiple groups of power control parameters of the uplink channel resource; or, the first power control parameter is a power control parameter in a group of power control parameter set at a tenth preset position according to orders of multiple groups of power control parameter sets of the uplink channel resource;

wherein the group at the ninth preset position or the group at the tenth preset position includes any one of the following: a first group, a last group, or a group in a middle position.

6. The method according to claim 1, wherein the first target signaling includes an information field used to indicate power control parameters and/or power control parameter sets, wherein the information field is greater than or equal to $\lceil \log_2(2^K-1) \rceil$ bit, and K is the number of power control parameters or power control parameter sets indicated by the first target signaling;

or, wherein the first target signaling includes an information field used to indicate power control parameters and/or power control parameter sets; the information field further indicates an order of the power control parameters and/or the power control parameter sets; the information field is greater than or equal to $$\left\lceil \log_2\left(\sum_{k=1}^{K} A_K^k\right) \right\rceil$$

bit, and K is the number of power control parameters or power control parameter sets indicated by the first target signaling, and $$A_K^k$$

represents the number of permutations and combination for selecting k numbers from K numbers.

7. The method according to claim 1, wherein the first target signaling includes one or more information fields used to indicate power control parameters and/or power control parameter sets; at least part of the information fields are provided with indication information for indicating whether power control parameters and/or power control parameter sets corresponding to the information fields are valid;

and/or, wherein the first target signaling is medium access control-control element (MAC-CE) signaling or downlink control information (DCI).

8. The method according to claim 1, wherein the method further includes:

configuring at least one group of common power control parameters applicable to all dedicated uplink channel resources; or, configuring at least one group of common power control parameters applicable to all dedicated uplink channel resources, and configuring, for the uplink channel resource, at least one group of dedicated power control parameters dedicated to the uplink channel resource.

9. The method according to claim 7, wherein the MAC-CE is MAC-CE signaling used to indicate spatial relation information of the uplink channel resource; the MAC-CE includes information of whether a spatial reference signal indicated by the spatial relation information is invalid.

10. The method according to claim 3, wherein the second target signaling is downlink control information (DCI); and a transmit power control (TPC) field of DCI is used to indicate information of a corresponding relationship between the repetition of the uplink channel resource and the identification information or group of power control parameters, or information of a corresponding relationship between the repetition of the uplink channel resource and the identification information or group of power control parameter sets.

11. The method according to claim 1, wherein before indicating information used to determine a transmission power of an uplink channel resource, by using a first target signaling, the method further includes: grouping uplink channel resources of the terminal;

the step of indicating information used to determine a transmission power of an uplink channel resource, by using a first target signaling, includes:

for any group of uplink channel resources, indicating information used for determining transmission power of the uplink channel resources from a power control configuration pre-configured for the group of uplink channel resources, by using the first target signaling.

12. A network device for performing the method according to claim 1, comprising: a memory, a transceiver, and a processor;

wherein the memory is configured to store a computer program; the transceiver is configured to transmit and receive data under the control of the processor; the processor is configured to read the computer program in the memory and perform the following steps:

indicating information used to determine a transmission power of an uplink channel resource, by using a first target signaling; wherein the information, which is used to determine the transmission power of the uplink channel resource and is indicated by the first target signaling, includes at least one of power control parameter indication information or power control parameter set indication information;

transmitting the first target signaling to a terminal, wherein the first target signaling is used by the terminal to determine the transmission power of the uplink channel resource;

wherein the transmission power of the uplink channel resource includes a transmission power of a first repetition of the uplink channel resource; the transmission power of the first repetition of the uplink channel resource is determined according to a first power control parameter, and the first power control parameter is a power control parameter determined based on first preset information;

wherein the first preset information includes any one of a default power control parameter, a value of an identifier of a power control parameter, a size of a value of an identifier of a power control parameter, an information field of a first target signaling, an order of power control parameters indicated by a first target signaling or a code sequence corresponding to power control parameters indicated by a first target signaling; and/or, a valid state of a power control parameter indicated by a first target signaling; and/or, sorting of groups of power control parameters; and/or, the first preset information includes any one of a default power control parameter set, a value of an identifier of a power control parameter set, a size of a value of an identifier of a power control parameter set, an order of power control parameter sets indicated by a first target signaling or a code sequence corresponding to power control parameter sets indicated by a first target signaling; and/or, a valid state of a power control parameter set indicated by a first target signaling; and/or, sorting of groups of power control parameter sets.

13. An uplink channel power control method, performed by a terminal, comprising:

receiving a first target signaling; wherein the first target signaling indicates information used to determine a transmission power of an uplink channel resource; the information, which is used to determine the transmission power of the uplink channel resource and is indicated by the first target signaling, includes at least one of power control parameter indication information or power control parameter set indication information; and determining the transmission power of the uplink channel resource according to the first target signaling;

wherein the determining the transmission power of the uplink channel resource according to the first target signaling, includes: determining a first power control parameter based on first preset information; determining a transmission power of a first repetition of the uplink channel resource by using the first power control parameter;

wherein the first preset information includes any one of a default power control parameter, a value of an identifier of a power control parameter, a size of a value of an identifier of a power control parameter, an information field of a first target signaling, an order of power control parameters indicated by a first target signaling or a code sequence corresponding to power control parameters indicated by a first target signaling; and/or, a valid state of a power control parameter indicated by a first target signaling; and/or, sorting of groups of power control parameters; and/or, the first preset information includes any one of a default power control parameter set, a value of an identifier of a power control parameter set, a size of a value of an identifier of a power control parameter set, an order of power control parameter sets indicated by a first target signaling or a code sequence corresponding to power control parameter sets indicated by a first target signaling; and/or, a valid state of a power control parameter set indicated by a first target signaling; and/or, sorting of groups of power control parameter sets.

14. The method according to claim 13, wherein the power control parameter indication information indicates at least one power control parameter through at least one of the following: identification information of power control parameters, the number of power control parameters or groups of power control parameters;

and/or, wherein the power control parameter set indication information indicates at least one power control parameter set through at least one of the following:

identification information of power control parameter sets, the number of power control parameter sets or groups of power control parameter sets.

15. The method according to claim 13, wherein the step of determining the transmission power of the uplink channel resource according to the first target signaling, includes any one of the following:

according to information of a corresponding relationship between repetitions of the uplink channel resource and identification information or group of power control parameters, which is indicated by the first target signaling or a second target signaling, determining power control parameters used to determine the transmission power of the first repetition of the uplink channel resource; or according to information of a corresponding relationship between repetitions of the uplink channel resource and identification information or group of power control parameter sets, which is indicated by the first target signaling or the second target signaling, determining power control parameters used to determine the transmission power of the first repetition of the uplink channel resource;

wherein the second target signaling is different from the first target signaling.

16. The method according to claim 13, wherein the information, which is used to determine the transmission power of the uplink channel resource and is indicated by the first target signaling, includes power control parameter indication information; the first target signaling indicates at least one power control parameter from any one of the following items:

a default power control parameter in a power control parameter configuration of the uplink channel resource;

at least one power control parameter at first N positions or last N positions in the power control parameter configuration of the uplink channel resource;

wherein N is an integer greater than or equal to 1, and the power control parameters are sorted according to sizes of values of identifiers or according to configuration sequence;

a default power control parameter in a power control parameter set included in the power control parameter configuration; or at least one power control parameter at first M positions or last M positions in a power control parameter set included in the power control parameter configuration of the uplink channel resource; wherein M is an integer greater than or equal to 1, and the power control parameters are sorted according to sizes of values of identifiers or according to configuration sequence;

or, wherein the information, which is used to determine the transmission power of the uplink channel resource and is indicated by the first target signaling, includes power control parameter set indication information, the first target signaling indicates at least one power control parameter set from a power control parameter set included in a power control parameter configuration of the uplink channel resource; and the step of determining the transmission power of the uplink channel resource according to the first target signaling, includes: determining the transmission power of the uplink channel resource according to a default power control parameter in the indicated power control parameter set; or, the first target signaling indicates at least one power control parameter set from a power control parameter set included in the power control parameter configuration of the uplink channel resource; and the step of determining the transmission power of the uplink channel resource according to the first target signaling, includes: determining the transmission power of the uplink channel resource according to power control parameters at first P positions or last P positions in the indicated power control parameter sets; wherein P is an integer greater than or equal to 1, and the power control parameters are sorted according to sizes of values of identifiers or according to configuration sequence; or, the first target signaling indicates at least one power control parameter set from a default power control parameter set included in the power control parameter configuration of the uplink channel resource; and the step of determining the transmission power of the uplink channel resource according to the first target signaling, includes: determining the transmission power of the uplink channel resource according to a default power control parameter in the indicated power control parameter sets; or, the first target signaling indicates at least one power control parameter set from power control parameter sets at first Q positions or last Q positions in the power control parameter configuration of the uplink channel resource; and the step of determining the transmission power of the uplink channel resource according to the first target signaling, includes: determining the transmission power of the uplink channel resource according to default power control parameters in the indicated power control parameter sets; wherein Q is an integer greater than or equal to 1, and the power control parameter sets are sorted according to sizes of values of identifiers or according to configuration sequence;

or, wherein the information, which is used to determine the transmission power of the uplink channel resource and is indicated by the first target signaling, includes power control parameter indication information; the power control parameter indication information indicates at least one power control parameter through the number of the power control parameters; and the step of determining the transmission power of the uplink channel resource according to the first target signaling, includes: determining the number of power control parameters used to determine the transmission power of the uplink channel resource, according to the number indicated by the power control parameter indication information; or, the information, which is used to determine the transmission power of the uplink channel resource and is indicated by the first target signaling, includes power control parameter set indication information; the power control parameter set indication information indicates at least one power control parameter set through the number of the power control parameter sets; and the step of determining the transmission power of the uplink channel resource according to the first target signaling, includes: determining the number of power control parameter sets used to determine the transmission power of the uplink channel resource, according to the number indicated by the power control parameter set indication information; or, the information, which is used to determine the transmission power of the uplink channel resource and is indicated by the first target signaling, includes power control parameter indication information; the power control parameter indication information indicates at least one group of power control parameters through the groups of the power control parameters; and the step of determining the transmission power of the uplink channel resource according to the first target signaling, includes: determining power control parameters used to determine the transmission power of the uplink channel resource in the groups of power control parameters indicated by the power control parameter indication information; or, the information, which is used to determine the transmission power of the uplink channel resource and is indicated by the first target signaling, includes power control parameter set indication information; the power control parameter set indication information indicates at least one group of power control parameter sets through the groups of the power control parameter sets; and the step of determining the transmission power of the uplink channel resource according to the first target signaling, includes: determining power control parameter sets used to determine the transmission power of the uplink channel resource in the groups of power control parameter sets indicated by the power control parameter set indication information.

17. The method according to claim 13, wherein the step of determining a first power control parameter based on first preset information, includes any one of the following:

determining the first power control parameter according to a power control parameter with an identifier whose value is a first preset value;

determining the first power control parameter according to power control parameters in a power control parameter set with an identifier whose value is a second preset value;

determining the first power control parameter according to a power control parameter with an identifier whose value is of a size at a first preset level; or determining the first power control parameter according to a power control parameter in a power control parameter set with an identifier whose value is of a size at a second preset level;

wherein the size of the value of the identifier at the first preset level or the size of the value of the identifier at the second preset level includes any one of the following: a size of a value of an identifier is the smallest, a size of a value of an identifier is the largest, or a size of a value of an identifier is at an intermediate value;

or, wherein the step of determining a first power control parameter based on first preset information, includes any one of the following:

determining the first power control parameter according to a power control parameter indicated by an information field at a first preset position according to orders of multiple information fields for indicating power control parameters in the first target signaling; or, determining the first power control parameter according to a power control parameter in a power control parameter set indicated by an information field at a second preset position according to orders of multiple information fields for indicating power control parameter sets in the first target signaling;

wherein the information field at the first preset position or the information field at the second preset position includes any one of the following: a first information field, a last information field, or an information field at a middle position;

or, wherein the step of determining a first power control parameter based on first preset information, includes any one of the following:

determining the first power control parameter according to a power control parameter at a third preset position according to orders of valid power control parameters indicated by the first target signaling; or, determining the first power control parameter according to a power control parameter in a power control parameter set at a fourth preset position according to orders of valid power control parameter sets indicated by the first target signaling;

wherein the third preset position or the fourth preset position includes any one of the following: a first valid position, a last valid position, and or a middle valid position;

or, wherein the step of determining a first power control parameter based on first preset information, includes any one of the following:

determining the first power control parameter according to a power control parameter at a fifth preset position in power control parameters indicated by the first target signaling; or, determining the first power control parameter according to a power control parameter in a power control parameter set at a sixth preset position in power control parameters indicated by the first target signaling;

wherein the fifth preset position or the sixth preset position includes any one of the following: a first position, a last position, or a position in the middle;

or, wherein the step of determining a first power control parameter based on first preset information, includes any one of the following:

determining the first power control parameter according to a power control parameter corresponding to a code at a seventh preset position in a code sequence corresponding to the power control parameters indicated by the first target signaling; or, determining the first power control parameter according to a power control parameter corresponding to a code at an eighth preset position in a code sequence corresponding to the power control parameter sets indicated by the first target signaling;

wherein the seventh preset position or the eighth preset position includes any one of the following: most significant bit (MSB) or least significant bit (LSB);

or, wherein the step of determining a first power control parameter based on first preset information, includes any one of the following:

determining the first power control parameter according to a power control parameter in a group at a ninth preset position according to orders of multiple groups of power control parameters of the uplink channel resource; or, determining the first power control parameter according to a power control parameter in a group of power control parameter set at a tenth preset position according to orders of multiple groups of power control parameter sets of the uplink channel resource;

wherein the group at a ninth preset position or the group at a tenth preset position includes any one of the following: a first group, a last group, or a group in a middle position.

18. The method according to claim 13, wherein the first target signaling is medium access control-control element (MAC-CE) signaling or downlink control information (DCI).

19. The method according to claim 18, wherein the MAC-CE is MAC-CE signaling used to indicate spatial relation information of the uplink channel resource; and the MAC-CE includes information of whether a spatial reference signal indicated by the spatial relation information is invalid.

20. The method according to claim 15, wherein the second target signaling is downlink control information (DCI); and a transmit power control (TPC) field of DCI is used to indicate information of a corresponding relationship between the repetition of the uplink channel resource and the identification information or group of power control parameters, or information of a corresponding relationship between the repetition of the uplink channel resource and the identification information or group of power control parameter sets.

21. A terminal, comprising: a memory, a transceiver, and a processor;

wherein the memory is configured to store a computer program; the transceiver is configured to transmit and receive data under the control of the processor; the processor is configured to read the computer program in the memory and perform the following operations:

receiving a first target signaling; wherein the first target signaling indicates information used to determine a transmission power of an uplink channel resource; the information, which is used to determine the transmission power of the uplink channel resource and is indicated by the first target signaling, includes at least one of power control parameter indication information and-or power control parameter set indication information;

determining the transmission power of the uplink channel resource according to the first target signaling;

wherein the determining the transmission power of the uplink channel resource according to the first target signaling, includes: determining a first power control parameter based on first preset information; determining a transmission power of a first repetition of the uplink channel resource by using the first power control parameter;

wherein the first preset information includes any one of a default power control parameter, a value of an identifier of a power control parameter, a size of a value of an identifier of a power control parameter, an information field of a first target signaling, an order of power control parameters indicated by a first target signaling or a code sequence corresponding to power control parameters indicated by a first target signaling; and/or, a valid state of a power control parameter indicated by a first target signaling; and/or, sorting of groups of power control parameters; and/or, the first preset information includes any one of a default power control parameter set, a value of an identifier of a power control parameter set, a size of a value of an identifier of a power control parameter set, an order of power control parameter sets indicated by a first target signaling or a code sequence corresponding to power control parameter sets indicated by a first target signaling; and/or, a valid state of a power control parameter set indicated by a first target signaling; and/or, sorting of groups of power control parameter sets.

* * * * *